(12) United States Patent
Waldern et al.

(10) Patent No.: US 12,399,326 B2
(45) Date of Patent: Aug. 26, 2025

(54) GRATING STRUCTURES FOR COLOR WAVEGUIDES

(71) Applicant: DigiLens Inc., Sunnyvale, CA (US)

(72) Inventors: Jonathan David Waldern, Diablo, CA (US); Alastair John Grant, San Jose, CA (US); Milan Momcilo Popovich, Leicester (GB)

(73) Assignee: DigiLens Inc., Sunnyvale, CA (US)

( * ) Notice: Subject to any disclaimer, the term of this patent is extended or adjusted under 35 U.S.C. 154(b) by 557 days.

(21) Appl. No.: 17/647,408

(22) Filed: Jan. 7, 2022

(65) Prior Publication Data

US 2022/0214503 A1    Jul. 7, 2022

Related U.S. Application Data

(60) Provisional application No. 63/134,898, filed on Jan. 7, 2021.

(51) Int. Cl.
*G02B 6/34* (2006.01)
*F21V 8/00* (2006.01)
*G02B 6/35* (2006.01)

(52) U.S. Cl.
CPC .............. *G02B 6/34* (2013.01); *G02B 6/0011* (2013.01); *G02B 6/3522* (2013.01)

(58) Field of Classification Search
CPC .................................................. G02B 6/0011
See application file for complete search history.

(56) References Cited

U.S. PATENT DOCUMENTS

| | | | |
|---|---|---|---|
| 1,043,938 | A | 11/1912 | Huttenlocher |
| 2,141,884 | A | 12/1938 | Sonnefeld |
| 3,482,498 | A | 12/1969 | Becker |
| 3,620,601 | A | 11/1971 | Leonard et al. |
| 3,741,716 | A | 6/1973 | Johne et al. |
| 3,804,496 | A | 4/1974 | Crane et al. |
| 3,843,231 | A | 10/1974 | Borel et al. |

(Continued)

FOREIGN PATENT DOCUMENTS

| | | |
|---|---|---|
| BR | PI0720469 A2 | 1/2014 |
| CA | 2889727 A1 | 6/2014 |

(Continued)

OTHER PUBLICATIONS

International Preliminary Report on Patentability for International Application PCT/US2020/018686, Report issued Aug. 10, 2021, Mailed Aug. 26, 2021, 6 pgs.

(Continued)

*Primary Examiner* — Chad H Smith
(74) *Attorney, Agent, or Firm* — KPPB LLP

(57) ABSTRACT

Disclosed herein is a waveguide-based display comprising: a waveguide, a source of image modulated light projected over a field of view; an input coupler for coupling said light into a total internal reflection (TIR) path within the waveguide; and a grating structure for providing beam expansion of the TIR light in at least one direction and extracting the TIR light from the waveguide. The grating structure may include a plurality of grating elements having at least two different grating prescriptions and at least one surface relief grating formed by a phase separation process.

19 Claims, 37 Drawing Sheets
(11 of 37 Drawing Sheet(s) Filed in Color)

(56) References Cited

U.S. PATENT DOCUMENTS

| | | |
|---|---|---|
| 3,851,303 A | 11/1974 | Muller |
| 3,885,095 A | 5/1975 | Wolfson et al. |
| 3,940,204 A | 2/1976 | Withrington |
| 3,965,029 A | 6/1976 | Arora |
| 3,975,711 A | 8/1976 | McMahon |
| 4,028,725 A | 6/1977 | Lewis |
| 4,035,068 A | 7/1977 | Rawson |
| 4,038,110 A | 7/1977 | Feng |
| 4,066,334 A | 1/1978 | Fray et al. |
| 4,082,432 A | 4/1978 | Kirschner |
| 4,099,841 A | 7/1978 | Ellis |
| 4,133,152 A | 1/1979 | Penrose |
| 4,178,074 A | 12/1979 | Heller |
| 4,218,111 A | 8/1980 | Withrington et al. |
| 4,232,943 A | 11/1980 | Rogers |
| 4,248,093 A | 2/1981 | Andersson et al. |
| 4,251,137 A | 2/1981 | Knop et al. |
| 4,309,070 A | 1/1982 | St. Leger Searle |
| 4,322,163 A | 3/1982 | Schiller |
| 4,386,361 A | 5/1983 | Simmonds |
| 4,389,612 A | 6/1983 | Simmonds et al. |
| 4,403,189 A | 9/1983 | Simmonds |
| 4,418,993 A | 12/1983 | Lipton |
| 4,472,037 A | 9/1984 | Lipton |
| 4,523,226 A | 6/1985 | Lipton et al. |
| 4,544,267 A | 10/1985 | Schiller |
| 4,562,463 A | 12/1985 | Lipton |
| 4,566,758 A | 1/1986 | Bos et al. |
| 4,583,117 A | 4/1986 | Lipton et al. |
| 4,643,515 A | 2/1987 | Upatnieks |
| 4,647,967 A | 3/1987 | Kirschner et al. |
| 4,688,900 A | 8/1987 | Doane et al. |
| 4,711,512 A | 12/1987 | Upatnieks |
| 4,714,320 A | 12/1987 | Banbury |
| 4,728,547 A | 3/1988 | Vaz et al. |
| 4,729,640 A | 3/1988 | Sakata et al. |
| 4,741,926 A | 5/1988 | White et al. |
| 4,743,083 A | 5/1988 | Schimpe |
| 4,749,256 A | 6/1988 | Bell et al. |
| 4,765,703 A | 8/1988 | Suzuki et al. |
| 4,775,218 A | 10/1988 | Wood et al. |
| 4,791,788 A | 12/1988 | Simmonds et al. |
| 4,792,850 A | 12/1988 | Liptoh et al. |
| 4,794,021 A | 12/1988 | Potter |
| 4,799,765 A | 1/1989 | Ferrer |
| 4,811,414 A | 3/1989 | Fishbine et al. |
| 4,848,093 A | 7/1989 | Simmonds et al. |
| 4,852,988 A | 8/1989 | Velez et al. |
| 4,854,688 A | 8/1989 | Hayford et al. |
| 4,860,294 A | 8/1989 | Winzer et al. |
| 4,884,876 A | 12/1989 | Lipton et al. |
| 4,890,902 A | 1/1990 | Doane et al. |
| 4,928,301 A | 5/1990 | Smoot |
| 4,933,976 A | 6/1990 | Fishbine et al. |
| 4,938,568 A | 7/1990 | Margerum et al. |
| 4,946,245 A | 8/1990 | Chamberlin et al. |
| 4,960,311 A | 10/1990 | Moss et al. |
| 4,964,701 A | 10/1990 | Dorschner et al. |
| 4,967,268 A | 10/1990 | Lipton et al. |
| 4,970,129 A | 11/1990 | Ingwall et al. |
| 4,971,719 A | 11/1990 | Vaz et al. |
| 4,994,204 A | 2/1991 | Doane et al. |
| 5,004,323 A | 4/1991 | West |
| 5,007,711 A | 4/1991 | Wood et al. |
| 5,009,483 A | 4/1991 | Rockwell et al. |
| 5,011,624 A | 4/1991 | Yamagishi et al. |
| 5,016,953 A | 5/1991 | Moss et al. |
| 5,033,814 A | 7/1991 | Brown et al. |
| 5,035,734 A | 7/1991 | Honkanen et al. |
| 5,053,834 A | 10/1991 | Simmonds |
| 5,063,441 A | 11/1991 | Lipton et al. |
| 5,076,664 A | 12/1991 | Migozzi |
| 5,079,416 A | 1/1992 | Filipovich |
| 5,096,282 A | 3/1992 | Margerum et al. |
| 5,099,343 A | 3/1992 | Margerum et al. |
| 5,109,465 A | 4/1992 | Klopotek |
| 5,110,034 A | 5/1992 | Simmonds et al. |
| 5,117,285 A | 5/1992 | Nelson et al. |
| 5,117,302 A | 5/1992 | Lipton |
| 5,119,454 A | 6/1992 | McMahon et al. |
| 5,124,821 A | 6/1992 | Antier et al. |
| 5,138,687 A | 8/1992 | Horie et al. |
| 5,139,192 A | 8/1992 | Simmonds et al. |
| 5,142,357 A | 8/1992 | Lipton et al. |
| 5,142,644 A | 8/1992 | Vansteenkiste et al. |
| 5,148,302 A | 9/1992 | Nagano et al. |
| 5,150,234 A | 9/1992 | Takahashi et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,181,133 A | 1/1993 | Lipton |
| 5,183,545 A | 2/1993 | Branca et al. |
| 5,187,597 A | 2/1993 | Kato et al. |
| 5,193,000 A | 3/1993 | Lipton et al. |
| 5,198,912 A | 3/1993 | Ingwall et al. |
| 5,198,914 A | 3/1993 | Arns |
| 5,200,861 A | 4/1993 | Moskovich et al. |
| 5,210,624 A | 5/1993 | Matsumoto et al. |
| 5,210,801 A | 5/1993 | Fournier et al. |
| 5,218,360 A | 6/1993 | Goetz et al. |
| 5,218,480 A | 6/1993 | Moskovich et al. |
| 5,224,198 A | 6/1993 | Jachimowicz et al. |
| 5,225,918 A | 7/1993 | Taniguchi et al. |
| 5,239,372 A | 8/1993 | Lipton |
| 5,240,636 A | 8/1993 | Doane et al. |
| 5,241,337 A | 8/1993 | Betensky et al. |
| 5,242,476 A | 9/1993 | Bartel et al. |
| 5,243,413 A | 9/1993 | Gitlin et al. |
| 5,251,048 A | 10/1993 | Doane et al. |
| 5,264,950 A | 11/1993 | West et al. |
| 5,268,792 A | 12/1993 | Kreitzer et al. |
| 5,284,499 A | 2/1994 | Harvey et al. |
| 5,289,315 A | 2/1994 | Makita et al. |
| 5,295,208 A | 3/1994 | Caulfield et al. |
| 5,296,967 A | 3/1994 | Moskovich et al. |
| 5,299,289 A | 3/1994 | Omae et al. |
| 5,303,085 A | 4/1994 | Rallison |
| 5,306,923 A | 4/1994 | Kazmierski et al. |
| 5,309,283 A | 5/1994 | Kreitzer et al. |
| 5,313,330 A | 5/1994 | Betensky |
| 5,315,324 A | 5/1994 | Kubelik et al. |
| 5,315,419 A | 5/1994 | Saupe et al. |
| 5,315,440 A | 5/1994 | Betensky et al. |
| 5,317,405 A | 5/1994 | Kuriki et al. |
| 5,327,269 A | 7/1994 | Tilton et al. |
| 5,329,363 A | 7/1994 | Moskovich et al. |
| 5,341,230 A | 8/1994 | Smith |
| 5,343,147 A | 8/1994 | Sager et al. |
| 5,351,151 A | 9/1994 | Levy |
| 5,359,362 A | 10/1994 | Lewis et al. |
| 5,363,220 A | 11/1994 | Kuwayama et al. |
| 5,368,770 A | 11/1994 | Saupe et al. |
| 5,369,511 A | 11/1994 | Amos |
| 5,371,626 A | 12/1994 | Betensky |
| 5,400,069 A | 3/1995 | Braun et al. |
| 5,408,346 A | 4/1995 | Trissel et al. |
| 5,410,370 A | 4/1995 | Janssen |
| 5,410,376 A | 4/1995 | Cornsweet et al. |
| 5,416,510 A | 5/1995 | Lipton et al. |
| 5,416,514 A | 5/1995 | Janssen et al. |
| 5,418,584 A | 5/1995 | Larson |
| 5,418,871 A | 5/1995 | Revelli et al. |
| 5,428,480 A | 6/1995 | Betensky et al. |
| 5,437,811 A | 8/1995 | Doane et al. |
| 5,438,357 A | 8/1995 | McNelley |
| 5,452,385 A | 9/1995 | Izumi et al. |
| 5,453,863 A | 9/1995 | West et al. |
| 5,455,693 A | 10/1995 | Wreede et al. |
| 5,455,713 A | 10/1995 | Kreitzer et al. |
| 5,462,700 A | 10/1995 | Beeson et al. |
| 5,463,428 A | 10/1995 | Lipton et al. |
| 5,465,311 A | 11/1995 | Caulfield et al. |
| 5,471,326 A | 11/1995 | Hall et al. |

(56) References Cited

U.S. PATENT DOCUMENTS

| | | |
|---|---|---|
| 5,473,222 A | 12/1995 | Thoeny et al. |
| 5,476,611 A | 12/1995 | Nolan et al. |
| 5,481,321 A | 1/1996 | Lipton |
| 5,481,385 A | 1/1996 | Zimmerman et al. |
| 5,485,313 A | 1/1996 | Betensky |
| 5,493,430 A | 2/1996 | Lu et al. |
| 5,493,448 A | 2/1996 | Betensky et al. |
| 5,496,621 A | 3/1996 | Makita et al. |
| 5,499,140 A | 3/1996 | Betensky |
| 5,500,671 A | 3/1996 | Andersson et al. |
| 5,500,769 A | 3/1996 | Betensky |
| 5,510,913 A | 4/1996 | Hashimoto et al. |
| 5,515,184 A | 5/1996 | Caulfield et al. |
| 5,516,455 A | 5/1996 | Jacobine et al. |
| 5,524,272 A | 6/1996 | Podowski et al. |
| 5,528,720 A | 6/1996 | Winston et al. |
| 5,530,566 A | 6/1996 | Kumar |
| 5,532,736 A | 7/1996 | Kuriki et al. |
| 5,532,875 A | 7/1996 | Betemsky |
| 5,537,232 A | 7/1996 | Biles |
| RE35,310 E | 8/1996 | Moskovich |
| 5,543,950 A | 8/1996 | Lavrentovich et al. |
| 5,544,268 A | 8/1996 | Bischel et al. |
| 5,559,637 A | 9/1996 | Moskovich et al. |
| 5,572,248 A | 11/1996 | Allen et al. |
| 5,572,250 A | 11/1996 | Lipton et al. |
| 5,576,888 A | 11/1996 | Betensky |
| 5,579,026 A | 11/1996 | Tabata |
| 5,583,795 A | 12/1996 | Smyth |
| 5,585,035 A | 12/1996 | Nerad et al. |
| 5,593,615 A | 1/1997 | Nerad et al. |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,619,586 A | 4/1997 | Sibbald et al. |
| 5,621,529 A | 4/1997 | Gordon et al. |
| 5,621,552 A | 4/1997 | Coates et al. |
| 5,625,495 A | 4/1997 | Moskovich et al. |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,614 A | 9/1997 | Chien et al. |
| 5,668,907 A | 9/1997 | Veligdan |
| 5,677,797 A | 10/1997 | Betensky et al. |
| 5,680,231 A | 10/1997 | Grinberg et al. |
| 5,680,411 A | 10/1997 | Ramdane et al. |
| 5,682,255 A | 10/1997 | Friesem et al. |
| 5,686,931 A | 11/1997 | Fuenfschilling et al. |
| 5,686,975 A | 11/1997 | Lipton |
| 5,691,795 A | 11/1997 | Doane et al. |
| 5,694,230 A | 12/1997 | Welch |
| 5,695,682 A | 12/1997 | Doane et al. |
| 5,701,132 A | 12/1997 | Kollin et al. |
| 5,706,108 A | 1/1998 | Ando et al. |
| 5,706,136 A | 1/1998 | Okuyama et al. |
| 5,707,925 A | 1/1998 | Akada et al. |
| 5,710,645 A | 1/1998 | Phillips et al. |
| 5,724,189 A | 3/1998 | Ferrante |
| 5,724,463 A | 3/1998 | Deacon et al. |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,736,424 A | 4/1998 | Prybyla et al. |
| 5,742,262 A | 4/1998 | Tabata et al. |
| 5,745,266 A | 4/1998 | Smith et al. |
| 5,745,301 A | 4/1998 | Betensky et al. |
| 5,748,272 A | 5/1998 | Tanaka et al. |
| 5,748,277 A | 5/1998 | Huang et al. |
| 5,751,452 A | 5/1998 | Tanaka et al. |
| 5,757,546 A | 5/1998 | Lipton et al. |
| 5,760,931 A | 6/1998 | Saburi et al. |
| 5,760,960 A | 6/1998 | Lin et al. |
| 5,764,414 A | 6/1998 | King et al. |
| 5,771,320 A | 6/1998 | Stone |
| 5,790,288 A | 8/1998 | Jager et al. |
| 5,790,314 A | 8/1998 | Duck et al. |
| 5,798,641 A | 8/1998 | Spagna et al. |
| 5,804,609 A | 9/1998 | Ohnishi et al. |
| 5,808,804 A | 9/1998 | Moskovich |
| 5,812,608 A | 9/1998 | Valimaki et al. |
| 5,822,089 A | 10/1998 | Phillips et al. |
| 5,822,127 A | 10/1998 | Chen et al. |
| 5,825,448 A | 10/1998 | Bos et al. |
| 5,831,700 A | 11/1998 | Li et al. |
| 5,835,661 A | 11/1998 | Tai et al. |
| 5,841,507 A | 11/1998 | Barnes |
| 5,841,587 A | 11/1998 | Moskovich et al. |
| 5,847,787 A | 12/1998 | Fredley et al. |
| 5,856,842 A | 1/1999 | Tedesco |
| 5,857,043 A | 1/1999 | Cook et al. |
| 5,867,238 A | 2/1999 | Miller et al. |
| 5,867,618 A | 2/1999 | Ito et al. |
| 5,868,951 A | 2/1999 | Schuck, III et al. |
| 5,870,228 A | 2/1999 | Kreitzer et al. |
| 5,875,012 A | 2/1999 | Crawford et al. |
| 5,877,826 A | 3/1999 | Yang et al. |
| 5,886,822 A | 3/1999 | Spitzer |
| 5,892,598 A | 4/1999 | Asakawa et al. |
| 5,892,599 A | 4/1999 | Bahuguna |
| 5,898,511 A | 4/1999 | Mizutani et al. |
| 5,900,987 A | 5/1999 | Kreitzer et al. |
| 5,900,989 A | 5/1999 | Kreitzer |
| 5,903,395 A | 5/1999 | Rallison et al. |
| 5,903,396 A | 5/1999 | Rallison |
| 5,907,416 A | 5/1999 | Hegg et al. |
| 5,907,436 A | 5/1999 | Perry et al. |
| 5,911,018 A | 6/1999 | Bischel et al. |
| 5,917,459 A | 6/1999 | Son et al. |
| 5,926,147 A | 7/1999 | Sehm et al. |
| 5,929,946 A | 7/1999 | Sharp et al. |
| 5,929,960 A | 7/1999 | West et al. |
| 5,930,433 A | 7/1999 | Williamson et al. |
| 5,936,776 A | 8/1999 | Kreitzer |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,949,508 A | 9/1999 | Kumar et al. |
| 5,956,113 A | 9/1999 | Crawford |
| 5,962,147 A | 10/1999 | Shalhub et al. |
| 5,963,375 A | 10/1999 | Kreitzer |
| 5,966,223 A | 10/1999 | Friesem et al. |
| 5,969,874 A | 10/1999 | Moskovich |
| 5,969,876 A | 10/1999 | Kreitzer et al. |
| 5,973,727 A | 10/1999 | McGrew et al. |
| 5,974,162 A | 10/1999 | Metz et al. |
| 5,985,422 A | 11/1999 | Krauter |
| 5,986,746 A | 11/1999 | Metz et al. |
| 5,991,087 A | 11/1999 | Rallison |
| 5,999,089 A | 12/1999 | Carlson et al. |
| 5,999,282 A | 12/1999 | Suzuki et al. |
| 5,999,314 A | 12/1999 | Asakura et al. |
| 6,014,187 A | 1/2000 | Taketomi et al. |
| 6,023,375 A | 2/2000 | Kreitzer |
| 6,042,947 A | 3/2000 | Asakura et al. |
| 6,043,585 A | 3/2000 | Plessky et al. |
| 6,046,585 A | 4/2000 | Simmonds |
| 6,052,540 A | 4/2000 | Koyama |
| 6,061,107 A | 5/2000 | Yang |
| 6,061,463 A | 5/2000 | Metz et al. |
| 6,069,728 A | 5/2000 | Huignard et al. |
| 6,075,626 A | 6/2000 | Mizutani et al. |
| 6,078,427 A | 6/2000 | Fontaine et al. |
| 6,084,998 A | 7/2000 | Straayer |
| 6,094,311 A | 7/2000 | Moskovich |

(56) References Cited

U.S. PATENT DOCUMENTS

| | | |
|---|---|---|
| 6,097,551 A | 8/2000 | Kreitzer |
| 6,104,448 A | 8/2000 | Doane et al. |
| 6,107,943 A | 8/2000 | Schroeder |
| 6,115,152 A | 9/2000 | Popovich et al. |
| 6,118,908 A | 9/2000 | Bischel et al. |
| 6,121,899 A | 9/2000 | Theriault |
| 6,127,066 A | 10/2000 | Ueda et al. |
| 6,128,058 A | 10/2000 | Walton et al. |
| 6,133,971 A | 10/2000 | Silverstein et al. |
| 6,133,975 A | 10/2000 | Li et al. |
| 6,137,630 A | 10/2000 | Tsou et al. |
| 6,141,074 A | 10/2000 | Bos et al. |
| 6,141,154 A | 10/2000 | Kreitzer et al. |
| 6,151,142 A | 11/2000 | Phillips et al. |
| 6,154,190 A | 11/2000 | Yang et al. |
| 6,156,243 A | 12/2000 | Kosuga et al. |
| 6,167,169 A | 12/2000 | Brinkman et al. |
| 6,169,594 B1 | 1/2001 | Aye et al. |
| 6,169,613 B1 | 1/2001 | Amitai et al. |
| 6,169,636 B1 | 1/2001 | Kreitzer et al. |
| 6,172,792 B1 | 1/2001 | Jepsen et al. |
| 6,176,837 B1 | 1/2001 | Foxlin |
| 6,185,015 B1 | 2/2001 | Reinhorn et al. |
| 6,185,016 B1 | 2/2001 | Popovich |
| 6,188,462 B1 | 2/2001 | Lavrentovich et al. |
| 6,191,887 B1 | 2/2001 | Michaloski et al. |
| 6,195,206 B1 | 2/2001 | Yona et al. |
| 6,195,209 B1 | 2/2001 | Kreitzer et al. |
| 6,204,835 B1 | 3/2001 | Yang et al. |
| 6,211,976 B1 | 4/2001 | Popovich et al. |
| 6,218,316 B1 | 4/2001 | Marsh |
| 6,222,297 B1 | 4/2001 | Perdue |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,266,166 B1 | 7/2001 | Katsumata et al. |
| 6,268,839 B1 | 7/2001 | Yang et al. |
| 6,269,203 B1 | 7/2001 | Davies et al. |
| 6,275,031 B1 | 8/2001 | Simmonds et al. |
| 6,278,429 B1 | 8/2001 | Ruth et al. |
| 6,285,813 B1 | 9/2001 | Schultz et al. |
| 6,297,860 B1 | 10/2001 | Moskovich et al. |
| 6,301,056 B1 | 10/2001 | Kreitzer et al. |
| 6,301,057 B1 | 10/2001 | Kreitzer et al. |
| 6,317,083 B1 | 11/2001 | Johnson et al. |
| 6,317,227 B1 | 11/2001 | Mizutani et al. |
| 6,317,228 B2 | 11/2001 | Popovich et al. |
| 6,317,528 B1 | 11/2001 | Gadkaree et al. |
| 6,320,563 B1 | 11/2001 | Yang et al. |
| 6,321,069 B1 | 11/2001 | Piirainen |
| 6,323,970 B1 | 11/2001 | Popovich |
| 6,323,989 B1 | 11/2001 | Jacobson et al. |
| 6,324,014 B1 | 11/2001 | Moskovich et al. |
| 6,327,089 B1 | 12/2001 | Hosaki et al. |
| 6,330,109 B1 | 12/2001 | Ishii et al. |
| 6,333,819 B1 | 12/2001 | Svedenkrans |
| 6,339,486 B1 | 1/2002 | Popovich |
| 6,340,540 B1 | 1/2002 | Ueda et al. |
| 6,351,273 B1 | 2/2002 | Lemelson et al. |
| 6,351,333 B2 | 2/2002 | Araki et al. |
| 6,356,172 B1 | 3/2002 | Koivisto et al. |
| 6,356,674 B1 | 3/2002 | Davis et al. |
| 6,359,730 B2 | 3/2002 | Tervonen |
| 6,359,737 B1 | 3/2002 | Stringfellow |
| 6,366,281 B1 | 4/2002 | Lipton et al. |
| 6,366,369 B2 | 4/2002 | Ichikawa et al. |
| 6,366,378 B1 | 4/2002 | Tervonen et al. |
| 6,377,238 B1 | 4/2002 | McPheters |
| 6,377,321 B1 | 4/2002 | Khan et al. |
| 6,388,797 B1 | 5/2002 | Lipton et al. |
| 6,392,812 B1 | 5/2002 | Howard |
| 6,407,724 B2 | 6/2002 | Waldern et al. |
| 6,409,687 B1 | 6/2002 | Foxlin |
| 6,411,444 B1 | 6/2002 | Moskovich et al. |
| 6,414,760 B1 | 7/2002 | Lopez et al. |
| 6,417,971 B1 | 7/2002 | Moskovich et al. |
| 6,437,563 B1 | 8/2002 | Simmonds et al. |
| 6,445,512 B1 | 9/2002 | Moskovich et al. |
| 6,449,095 B1 | 9/2002 | Ohtaki et al. |
| 6,456,584 B1 | 9/2002 | Nagata et al. |
| 6,470,132 B1 | 10/2002 | Nousiainen et al. |
| 6,473,209 B1 | 10/2002 | Popovich |
| 6,476,974 B1 | 11/2002 | Kreitzer et al. |
| 6,483,303 B2 | 11/2002 | Simmonds et al. |
| 6,486,997 B1 | 11/2002 | Bruzzone et al. |
| 6,504,518 B1 | 1/2003 | Kuwayama et al. |
| 6,504,629 B1 | 1/2003 | Popovich et al. |
| 6,509,937 B1 | 1/2003 | Moskovich et al. |
| 6,510,263 B1 | 1/2003 | Maisenhoelder et al. |
| 6,518,747 B2 | 2/2003 | Sager et al. |
| 6,519,088 B1 | 2/2003 | Lipton |
| 6,522,794 B1 | 2/2003 | Bischel et al. |
| 6,522,795 B1 | 2/2003 | Jordan et al. |
| 6,524,771 B2 | 2/2003 | Maeda et al. |
| 6,529,336 B1 | 3/2003 | Kreitzer et al. |
| 6,534,977 B1 | 3/2003 | Duncan et al. |
| 6,545,778 B2 | 4/2003 | Ono et al. |
| 6,545,808 B1 | 4/2003 | Ehbets et al. |
| 6,550,949 B1 | 4/2003 | Bauer et al. |
| 6,552,789 B1 | 4/2003 | Modro |
| 6,557,413 B2 | 5/2003 | Nieminen et al. |
| 6,559,813 B1 | 5/2003 | DeLuca et al. |
| 6,560,019 B2 | 5/2003 | Nakai |
| 6,563,648 B2 | 5/2003 | Gleckman et al. |
| 6,563,650 B2 | 5/2003 | Moskovich et al. |
| 6,567,014 B1 | 5/2003 | Hansen et al. |
| 6,567,573 B1 | 5/2003 | Domash et al. |
| 6,577,411 B1 | 6/2003 | David et al. |
| 6,577,429 B1 | 6/2003 | Kurtz et al. |
| 6,580,529 B1 | 6/2003 | Amitai et al. |
| 6,583,838 B1 | 6/2003 | Hoke et al. |
| 6,583,873 B1 | 6/2003 | Goncharov et al. |
| 6,587,619 B1 | 7/2003 | Kinoshita |
| 6,594,090 B2 | 7/2003 | Kruschwitz et al. |
| 6,596,193 B2 | 7/2003 | Coates et al. |
| 6,597,176 B2 | 7/2003 | Simmonds et al. |
| 6,597,475 B1 | 7/2003 | Shirakura et al. |
| 6,598,987 B1 | 7/2003 | Parikka |
| 6,600,590 B2 | 7/2003 | Roddy et al. |
| 6,608,720 B1 | 8/2003 | Freeman |
| 6,611,253 B1 | 8/2003 | Cohen |
| 6,618,104 B1 | 9/2003 | Date et al. |
| 6,624,943 B2 | 9/2003 | Nakai et al. |
| 6,625,381 B2 | 9/2003 | Roddy et al. |
| 6,646,772 B1 | 11/2003 | Popovich et al. |
| 6,646,810 B2 | 11/2003 | Harter, Jr. et al. |
| 6,661,578 B2 | 12/2003 | Hedrick |
| 6,667,134 B1 | 12/2003 | Sutherland et al. |
| 6,674,578 B2 | 1/2004 | Sugiyama et al. |
| 6,677,086 B1 | 1/2004 | Sutehrland et al. |
| 6,678,093 B1 | 1/2004 | Scobey et al. |
| 6,686,815 B1 | 2/2004 | Mirshekarl-Syahkal et al. |
| 6,690,516 B2 | 2/2004 | Aritake et al. |
| 6,692,666 B2 | 2/2004 | Sutherland et al. |
| 6,699,407 B1 | 3/2004 | Sutehrland et al. |
| 6,706,086 B2 | 3/2004 | Emig et al. |
| 6,706,451 B1 | 3/2004 | Sutherland et al. |
| 6,721,096 B2 | 4/2004 | Bruzzone et al. |
| 6,730,442 B1 | 5/2004 | Sutherland et al. |
| 6,731,434 B1 | 5/2004 | Hua et al. |
| 6,738,105 B1 | 5/2004 | Hannah et al. |
| 6,741,189 B1 | 5/2004 | Gibbons, II et al. |
| 6,744,478 B1 | 6/2004 | Asakura et al. |
| 6,747,781 B2 | 6/2004 | Trisnadi et al. |
| 6,748,342 B1 | 6/2004 | Dickhaus |
| 6,750,941 B2 | 6/2004 | Satoh et al. |
| 6,750,995 B2 | 6/2004 | Dickson |
| 6,750,996 B2 | 6/2004 | Jagt et al. |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |

(56) References Cited

U.S. PATENT DOCUMENTS

| | | |
|---|---|---|
| 6,791,629 B2 | 9/2004 | Moskovich et al. |
| 6,791,739 B2 | 9/2004 | Ramanujan et al. |
| 6,804,066 B1 | 10/2004 | Ha et al. |
| 6,805,490 B2 | 10/2004 | Levola |
| 6,821,457 B1 | 11/2004 | Natarajan et al. |
| 6,822,713 B1 | 11/2004 | Yaroshchuk et al. |
| 6,825,987 B2 | 11/2004 | Repetto et al. |
| 6,829,095 B2 | 12/2004 | Amitai |
| 6,830,789 B2 | 12/2004 | Doane et al. |
| 6,833,955 B2 | 12/2004 | Niv |
| 6,836,369 B2 | 12/2004 | Fujikawa et al. |
| 6,842,563 B2 | 1/2005 | Zhang et al. |
| 6,844,212 B2 | 1/2005 | Bond et al. |
| 6,844,980 B2 | 1/2005 | He et al. |
| 6,844,989 B1 | 1/2005 | Jo et al. |
| 6,847,274 B2 | 1/2005 | Salmela et al. |
| 6,847,488 B2 | 1/2005 | Travis |
| 6,850,210 B1 | 2/2005 | Lipton et al. |
| 6,853,491 B1 | 2/2005 | Ruhle et al. |
| 6,853,493 B2 | 2/2005 | Kreitzer et al. |
| 6,861,107 B2 | 3/2005 | Klasen-Memmer et al. |
| 6,864,861 B2 | 3/2005 | Schehrer et al. |
| 6,864,927 B1 | 3/2005 | Cathey |
| 6,864,931 B1 | 3/2005 | Kumar et al. |
| 6,867,888 B2 | 3/2005 | Sutherland et al. |
| 6,873,443 B1 | 3/2005 | Joubert et al. |
| 6,876,791 B2 | 4/2005 | Murashima et al. |
| 6,878,494 B2 | 4/2005 | Sutehrland et al. |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,919,003 B2 | 7/2005 | Ikeda et al. |
| 6,922,267 B2 | 7/2005 | Endo et al. |
| 6,926,429 B2 | 8/2005 | Barlow et al. |
| 6,927,570 B2 | 8/2005 | Simmonds et al. |
| 6,927,694 B1 | 8/2005 | Smith et al. |
| 6,940,361 B1 | 9/2005 | Jokio et al. |
| 6,943,788 B2 | 9/2005 | Tomono |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,952,435 B2 | 10/2005 | Lai et al. |
| 6,958,662 B1 | 10/2005 | Salmela et al. |
| 6,958,868 B1 | 10/2005 | Pender |
| 6,963,454 B1 | 11/2005 | Martins et al. |
| 6,972,788 B1 | 12/2005 | Robertson et al. |
| 6,975,345 B1 | 12/2005 | Lipton et al. |
| 6,980,365 B2 | 12/2005 | Moskovich |
| 6,985,296 B2 | 1/2006 | Lipton et al. |
| 6,987,908 B2 | 1/2006 | Bond et al. |
| 6,999,239 B1 | 2/2006 | Martins et al. |
| 7,002,618 B2 | 2/2006 | Lipton et al. |
| 7,002,753 B2 | 2/2006 | Moskovich et al. |
| 7,003,075 B2 | 2/2006 | Miyake et al. |
| 7,003,187 B2 | 2/2006 | Frick et al. |
| 7,006,732 B2 | 2/2006 | Gunn, III et al. |
| 7,009,773 B2 | 3/2006 | Chaoulov et al. |
| 7,018,563 B1 | 3/2006 | Sutherland et al. |
| 7,018,686 B2 | 3/2006 | Sutehrland et al. |
| 7,018,744 B2 | 3/2006 | Otaki et al. |
| 7,019,793 B2 | 3/2006 | Moskovich et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,046,439 B2 | 5/2006 | Kaminsky et al. |
| 7,050,674 B2 | 5/2006 | Lee et al. |
| 7,053,735 B2 | 5/2006 | Salmela et al. |
| 7,053,991 B2 | 5/2006 | Sandusky |
| 7,054,045 B2 | 5/2006 | McPheters et al. |
| 7,058,434 B2 | 6/2006 | Wang et al. |
| 7,068,405 B2 | 6/2006 | Sutherland et al. |
| 7,068,898 B2 | 6/2006 | Buretea et al. |
| 7,072,020 B1 | 7/2006 | Sutherland et al. |
| 7,075,273 B2 | 7/2006 | O'Gorman et al. |
| 7,077,984 B1 | 7/2006 | Natarajan et al. |
| 7,081,215 B2 | 7/2006 | Natarajan et al. |
| 7,088,457 B1 | 8/2006 | Zou et al. |
| 7,088,515 B2 | 8/2006 | Lipton |
| 7,095,562 B1 | 8/2006 | Peng et al. |
| 7,099,080 B2 | 8/2006 | Lipton et al. |
| 7,101,048 B2 | 9/2006 | Travis |
| 7,108,383 B1 | 9/2006 | Mitchell et al. |
| 7,110,184 B1 | 9/2006 | Yona et al. |
| 7,119,965 B1 | 10/2006 | Rolland et al. |
| 7,123,418 B2 | 10/2006 | Weber et al. |
| 7,123,421 B1 | 10/2006 | Moskovich et al. |
| 7,126,418 B2 | 10/2006 | Hunton et al. |
| 7,126,583 B1 | 10/2006 | Breed |
| 7,132,200 B1 | 11/2006 | Ueda et al. |
| 7,133,084 B2 | 11/2006 | Moskovich et al. |
| 7,139,109 B2 | 11/2006 | Mukawa |
| RE39,424 E | 12/2006 | Moskovich |
| 7,145,729 B2 | 12/2006 | Kreitzer et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,167,286 B2 | 1/2007 | Anderson et al. |
| 7,167,616 B2 | 1/2007 | Ling et al. |
| 7,175,780 B1 | 2/2007 | Sutherland et al. |
| 7,181,105 B2 | 2/2007 | Teramura et al. |
| 7,181,108 B2 | 2/2007 | Levola |
| 7,184,002 B2 | 2/2007 | Lipton et al. |
| 7,184,615 B2 | 2/2007 | Levola |
| 7,186,567 B1 | 3/2007 | Sutherland et al. |
| 7,190,849 B2 | 3/2007 | Katase |
| 7,198,737 B2 | 4/2007 | Natarajan et al. |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,212,175 B1 | 5/2007 | Magee et al. |
| 7,218,817 B2 | 5/2007 | Magnusson et al. |
| 7,230,767 B2 | 6/2007 | Walck et al. |
| 7,230,770 B2 | 6/2007 | Kreitzer et al. |
| 7,242,527 B2 | 7/2007 | Spitzer et al. |
| 7,248,128 B2 | 7/2007 | Mattila et al. |
| 7,248,765 B2 | 7/2007 | Lee et al. |
| 7,256,915 B2 | 8/2007 | Sutherland et al. |
| 7,259,906 B1 | 8/2007 | Islam |
| 7,265,882 B2 | 9/2007 | Sutherland et al. |
| 7,265,903 B2 | 9/2007 | Sutherland et al. |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| RE39,911 E | 11/2007 | Moskovich |
| 7,299,983 B2 | 11/2007 | Piikivi |
| 7,301,601 B2 | 11/2007 | Lin et al. |
| 7,312,906 B2 | 12/2007 | Sutherland et al. |
| 7,313,291 B2 | 12/2007 | Okhotnikov et al. |
| D559,250 S | 1/2008 | Pombo |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,333,685 B2 | 2/2008 | Stone et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,349,612 B2 | 3/2008 | Nishii et al. |
| 7,356,218 B2 | 4/2008 | Kato et al. |
| 7,356,224 B2 | 4/2008 | Levner et al. |
| 7,369,911 B1 | 5/2008 | Volant et al. |
| 7,375,870 B2 | 5/2008 | Schorpp |
| 7,375,886 B2 | 5/2008 | Lipton et al. |
| 7,376,068 B1 | 5/2008 | Khoury |
| 7,376,307 B2 | 5/2008 | Singh et al. |
| 7,391,573 B2 | 6/2008 | Amitai |
| 7,394,865 B2 | 7/2008 | Borran et al. |
| 7,394,961 B2 | 7/2008 | Kornilovich et al. |
| 7,395,181 B2 | 7/2008 | Foxlin |
| 7,397,606 B1 | 7/2008 | Peng et al. |

(56) References Cited

U.S. PATENT DOCUMENTS

| | | |
|---|---|---|
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,413,678 B1 | 8/2008 | Natarajan et al. |
| 7,413,679 B1 | 8/2008 | Sutherland et al. |
| 7,415,173 B2 | 8/2008 | Kassamakov et al. |
| 7,416,818 B2 | 8/2008 | Sutherland et al. |
| 7,418,170 B2 | 8/2008 | Mukawa et al. |
| 7,420,733 B1 | 9/2008 | Natarajan et al. |
| 7,433,116 B1 | 10/2008 | Islam |
| 7,436,568 B1 | 10/2008 | Kuykendall, Jr. |
| D581,447 S | 11/2008 | Yee |
| 7,447,967 B2 | 11/2008 | Onggosanusi et al. |
| 7,453,612 B2 | 11/2008 | Mukawa |
| 7,454,103 B2 | 11/2008 | Parriaux |
| 7,457,040 B2 | 11/2008 | Amitai |
| 7,466,994 B2 | 12/2008 | Pihlaja et al. |
| 7,477,206 B2 | 1/2009 | Cowan et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,499,217 B2 | 3/2009 | Cakmakci et al. |
| 7,500,104 B2 | 3/2009 | Goland |
| 7,511,891 B2 | 3/2009 | Messerschmidt |
| 7,513,668 B1 | 4/2009 | Peng et al. |
| 7,522,344 B1 | 4/2009 | Curatu et al. |
| 7,525,448 B1 | 4/2009 | Wilson et al. |
| 7,528,385 B2 | 5/2009 | Volodin et al. |
| 7,542,210 B2 | 6/2009 | Chirieleison |
| 7,545,429 B2 | 6/2009 | Travis |
| 7,550,234 B2 | 6/2009 | Otaki et al. |
| 7,558,446 B2 | 7/2009 | Wimberger-Friedl et al. |
| 7,567,372 B2 | 7/2009 | Schorpp |
| 7,570,322 B1 | 8/2009 | Sutherland et al. |
| 7,570,405 B1 | 8/2009 | Sutherland et al. |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,583,423 B2 | 9/2009 | Sutherland et al. |
| 7,587,110 B2 | 9/2009 | Singh et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,605,719 B1 | 10/2009 | Wenger et al. |
| 7,605,774 B1 | 10/2009 | Brandt et al. |
| 7,605,882 B1 | 10/2009 | Sutherland et al. |
| 7,616,270 B2 | 11/2009 | Hirabayashi et al. |
| 7,617,022 B1 | 11/2009 | Wood et al. |
| 7,618,750 B2 | 11/2009 | Ueda et al. |
| 7,619,739 B1 | 11/2009 | Sutherland et al. |
| 7,619,825 B1 | 11/2009 | Peng et al. |
| 7,629,086 B2 | 12/2009 | Otaki et al. |
| 7,639,208 B1 | 12/2009 | Ha et al. |
| 7,639,911 B2 | 12/2009 | Lee et al. |
| 7,643,214 B2 | 1/2010 | Amitai |
| 7,643,225 B1 | 1/2010 | Tsai |
| 7,656,585 B1 | 2/2010 | Powell et al. |
| 7,660,047 B1 | 2/2010 | Travis et al. |
| 7,672,024 B2 | 3/2010 | Kuan |
| 7,672,055 B2 | 3/2010 | Amitai |
| 7,672,549 B2 | 3/2010 | Ghosh et al. |
| 7,675,021 B2 | 3/2010 | Lapstun |
| 7,675,684 B1 | 3/2010 | Weissman et al. |
| 7,691,248 B2 | 4/2010 | Ikeda et al. |
| 7,710,622 B2 | 5/2010 | Takabayashi et al. |
| 7,710,654 B2 | 5/2010 | Ashkenazi et al. |
| 7,711,228 B2 | 5/2010 | Noda et al. |
| 7,724,441 B2 | 5/2010 | Amitai |
| 7,724,442 B2 | 5/2010 | Amitai |
| 7,724,443 B2 | 5/2010 | Amitai |
| 7,733,571 B1 | 6/2010 | Li |
| 7,733,572 B1 | 6/2010 | Brown et al. |
| 7,740,387 B2 | 6/2010 | Schultz et al. |
| 7,747,113 B2 | 6/2010 | Mukawa et al. |
| 7,751,122 B2 | 7/2010 | Amitai |
| 7,751,662 B2 | 7/2010 | Kleemann et al. |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,843,642 B2 | 11/2010 | Shaoulov et al. |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,866,869 B2 | 1/2011 | Karakawa |
| 7,872,707 B1 | 1/2011 | Sutherland et al. |
| 7,872,804 B2 | 1/2011 | Moon et al. |
| 7,884,593 B2 | 2/2011 | Simmonds et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,928,862 B1 | 4/2011 | Matthews |
| 7,936,513 B2 | 5/2011 | Wu et al. |
| 7,936,519 B2 | 5/2011 | Mukawa et al. |
| 7,944,428 B2 | 5/2011 | Travis |
| 7,944,616 B2 | 5/2011 | Mukawa |
| 7,949,214 B2 | 5/2011 | DeJong et al. |
| D640,310 S | 6/2011 | Suzuki et al. |
| 7,961,117 B1 | 6/2011 | Zimmerman et al. |
| 7,969,644 B2 | 6/2011 | Tilleman et al. |
| 7,969,657 B2 | 6/2011 | Cakmakci et al. |
| 7,970,246 B2 | 6/2011 | Travis et al. |
| 7,976,208 B2 | 7/2011 | Travis |
| 7,984,884 B1 | 7/2011 | Iliev et al. |
| 7,999,982 B2 | 8/2011 | Endo et al. |
| 8,000,020 B2 | 8/2011 | Amitai et al. |
| 8,000,491 B2 | 8/2011 | Brodkin et al. |
| 8,004,765 B2 | 8/2011 | Amitai |
| 8,014,050 B2 | 9/2011 | McGrew |
| 8,016,475 B2 | 9/2011 | Travis |
| 8,018,579 B1 | 9/2011 | Krah |
| 8,022,942 B2 | 9/2011 | Bathiche et al. |
| 8,023,783 B2 | 9/2011 | Mukawa et al. |
| RE42,992 E | 12/2011 | David |
| 8,073,296 B2 | 12/2011 | Mukawa et al. |
| 8,077,274 B2 | 12/2011 | Sutherland et al. |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,093,451 B2 | 1/2012 | Spangenberg et al. |
| 8,098,439 B2 | 1/2012 | Amitai et al. |
| 8,107,023 B2 | 1/2012 | Simmonds et al. |
| 8,107,780 B2 | 1/2012 | Simmonds |
| 8,120,548 B1 | 2/2012 | Barber |
| 8,120,848 B2 | 2/2012 | Isano |
| 8,132,948 B2 | 3/2012 | Owen et al. |
| 8,132,976 B2 | 3/2012 | Odell et al. |
| 8,134,434 B2 | 3/2012 | Diederichs et al. |
| 8,136,690 B2 | 3/2012 | Fang et al. |
| 8,137,981 B2 | 3/2012 | Andrew et al. |
| 8,142,016 B2 | 3/2012 | Legerton et al. |
| 8,149,086 B2 | 4/2012 | Klein et al. |
| 8,152,315 B2 | 4/2012 | Travis et al. |
| 8,152,353 B2 | 4/2012 | Yang et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |

(56) References Cited

U.S. PATENT DOCUMENTS

| | | |
|---|---|---|
| D659,137 S | 5/2012 | Matsumoto |
| 8,167,173 B1 | 5/2012 | Simmonds et al. |
| 8,186,874 B2 | 5/2012 | Sinbar et al. |
| 8,188,925 B2 | 5/2012 | DeJean |
| 8,189,263 B1 | 5/2012 | Wang et al. |
| 8,189,973 B2 | 5/2012 | Travis et al. |
| D661,334 S | 6/2012 | Cho et al. |
| D661,335 S | 6/2012 | Jeon |
| 8,194,325 B2 | 6/2012 | Levola et al. |
| 8,199,803 B2 | 6/2012 | Hauske et al. |
| 8,213,065 B2 | 7/2012 | Mukawa |
| 8,213,755 B2 | 7/2012 | Mukawa et al. |
| 8,220,966 B2 | 7/2012 | Mukawa |
| 8,224,133 B2 | 7/2012 | Popovich et al. |
| 8,233,204 B1 | 7/2012 | Robbins et al. |
| 8,253,914 B2 | 8/2012 | Kajiya et al. |
| 8,254,031 B2 | 8/2012 | Levola |
| 8,264,498 B1 | 9/2012 | Vanderkamp et al. |
| 8,294,749 B2 | 10/2012 | Cable |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,310,327 B2 | 11/2012 | Willers et al. |
| 8,314,819 B2 | 11/2012 | Kimmel et al. |
| 8,314,993 B2 | 11/2012 | Levola et al. |
| 8,320,032 B2 | 11/2012 | Levola |
| 8,321,810 B2 | 11/2012 | Heintze |
| 8,325,166 B2 | 12/2012 | Akutsu et al. |
| 8,329,773 B2 | 12/2012 | Fäcke et al. |
| 8,335,040 B2 | 12/2012 | Mukawa et al. |
| 8,335,414 B2 | 12/2012 | Zinoviev et al. |
| D673,996 S | 1/2013 | Kim et al. |
| 8,351,744 B2 | 1/2013 | Travis et al. |
| 8,354,640 B2 | 1/2013 | Hamre et al. |
| 8,354,806 B2 | 1/2013 | Travis et al. |
| 8,355,610 B2 | 1/2013 | Simmonds |
| 8,369,019 B2 | 2/2013 | Baker et al. |
| 8,376,548 B2 | 2/2013 | Schultz |
| 8,382,293 B2 | 2/2013 | Phillips, III et al. |
| 8,384,504 B2 | 2/2013 | Diederichs et al. |
| 8,384,694 B2 | 2/2013 | Powell et al. |
| 8,384,730 B1 | 2/2013 | Vanderkamp et al. |
| 8,396,339 B2 | 3/2013 | Mukawa et al. |
| 8,396,341 B2 | 3/2013 | Lee et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,432,614 B2 | 4/2013 | Amitai |
| 8,441,731 B2 | 5/2013 | Sprague |
| 8,447,365 B1 | 5/2013 | Imanuel |
| 8,466,953 B2 | 6/2013 | Levola |
| 8,472,119 B1 | 6/2013 | Kelly |
| 8,472,120 B2 | 6/2013 | Border et al. |
| 8,477,261 B2 | 7/2013 | Travis et al. |
| 8,481,130 B2 | 7/2013 | Harding et al. |
| 8,482,858 B2 | 7/2013 | Sprague |
| 8,488,246 B2 | 7/2013 | Border et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,494,229 B2 | 7/2013 | Jarvenpaa et al. |
| 8,508,848 B2 | 8/2013 | Saarikko |
| 8,520,309 B2 | 8/2013 | Sprague |
| D691,192 S | 10/2013 | Stanley et al. |
| 8,547,638 B2 | 10/2013 | Levola |
| 8,548,290 B2 | 10/2013 | Travers et al. |
| 8,565,560 B2 | 10/2013 | Popovich et al. |
| D694,310 S | 11/2013 | Cho et al. |
| D694,311 S | 11/2013 | Cho et al. |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| D697,130 S | 1/2014 | Lövgren |
| 8,633,786 B2 | 1/2014 | Ermolov et al. |
| 8,634,120 B2 | 1/2014 | Popovich et al. |
| 8,634,139 B1 | 1/2014 | Brown et al. |
| 8,639,072 B2 | 1/2014 | Popovich et al. |
| 8,643,691 B2 | 2/2014 | Rosenfeld et al. |
| 8,643,948 B2 | 2/2014 | Amitai et al. |
| 8,649,099 B2 | 2/2014 | Schultz et al. |
| 8,654,420 B2 | 2/2014 | Simmonds |
| 8,659,826 B1 | 2/2014 | Brown et al. |
| D701,206 S | 3/2014 | Luckey et al. |
| 8,670,029 B2 | 3/2014 | McEldowney |
| 8,693,087 B2 | 4/2014 | Nowatzyk et al. |
| 8,698,705 B2 | 4/2014 | Burke |
| 8,731,350 B1 | 5/2014 | Lin et al. |
| 8,736,802 B2 | 5/2014 | Kajiya et al. |
| 8,736,963 B2 | 5/2014 | Robbins et al. |
| 8,742,952 B1 | 6/2014 | Bold |
| 8,746,008 B1 | 6/2014 | Mauritsen et al. |
| 8,749,886 B2 | 6/2014 | Gupta |
| 8,749,890 B1 | 6/2014 | Wood et al. |
| 8,767,294 B2 | 7/2014 | Chen et al. |
| 8,786,923 B2 | 7/2014 | Chuang et al. |
| 8,810,600 B2 | 8/2014 | Bohn et al. |
| 8,810,913 B2 | 8/2014 | Simmonds et al. |
| 8,810,914 B2 | 8/2014 | Amitai |
| 8,814,691 B2 | 8/2014 | Haddick et al. |
| 8,816,578 B1 | 8/2014 | Peng et al. |
| 8,817,350 B1 | 8/2014 | Robbins et al. |
| 8,824,836 B2 | 9/2014 | Sugiyama |
| 8,830,143 B1 | 9/2014 | Pitchford et al. |
| 8,830,584 B2 | 9/2014 | Saarikko et al. |
| 8,830,588 B1 | 9/2014 | Brown et al. |
| 8,842,368 B2 | 9/2014 | Simmonds et al. |
| 8,859,412 B2 | 10/2014 | Jain |
| 8,872,435 B2 | 10/2014 | Kreitzer et al. |
| 8,873,149 B2 | 10/2014 | Bohn et al. |
| 8,873,150 B2 | 10/2014 | Amitai |
| D718,304 S | 11/2014 | Heinrich |
| D718,366 S | 11/2014 | Mehin et al. |
| 8,885,112 B2 | 11/2014 | Popovich et al. |
| 8,885,997 B2 | 11/2014 | Nguyen et al. |
| 8,903,207 B1 | 12/2014 | Brown et al. |
| 8,906,088 B2 | 12/2014 | Pugh et al. |
| 8,913,324 B2 | 12/2014 | Schrader |
| 8,913,865 B1 | 12/2014 | Bennett |
| 8,917,453 B2 | 12/2014 | Bohn |
| 8,917,962 B1 | 12/2014 | Nichol et al. |
| 8,929,589 B2 | 1/2015 | Publicover et al. |
| 8,933,144 B2 | 1/2015 | Enomoto et al. |
| 8,934,743 B2 | 1/2015 | Nishiwaki et al. |
| 8,937,771 B2 | 1/2015 | Robbins et al. |
| 8,937,772 B1 | 1/2015 | Burns et al. |
| 8,938,141 B2 | 1/2015 | Magnusson |
| 8,950,867 B2 | 2/2015 | Macnamara |
| 8,964,298 B2 | 2/2015 | Haddick et al. |
| 8,965,152 B2 | 2/2015 | Simmonds |
| D725,102 S | 3/2015 | Lee et al. |
| 8,985,803 B2 | 3/2015 | Bohn |
| 8,989,535 B2 | 3/2015 | Robbins |
| D726,180 S | 4/2015 | Roat et al. |
| 9,019,595 B2 | 4/2015 | Jain |
| 9,025,253 B2 | 5/2015 | Hadad et al. |
| 9,035,344 B2 | 5/2015 | Jain |
| D733,709 S | 7/2015 | Kawai |
| 9,075,184 B2 | 7/2015 | Popovich et al. |
| 9,081,178 B2 | 7/2015 | Simmonds et al. |
| 9,097,890 B2 | 8/2015 | Miller et al. |
| 9,103,978 B2 | 8/2015 | Nishiwaki et al. |
| 9,122,015 B2 | 9/2015 | Shimizu |
| 9,128,226 B2 | 9/2015 | Fattal et al. |
| 9,129,295 B2 | 9/2015 | Border et al. |
| 9,164,290 B2 | 10/2015 | Robbins et al. |
| 9,176,324 B1 | 11/2015 | Scherer et al. |

(56) References Cited

U.S. PATENT DOCUMENTS

| | | |
|---|---|---|
| 9,188,717 B2 | 11/2015 | Nishiwaki |
| 9,201,270 B2 | 12/2015 | Fattal et al. |
| 9,215,293 B2 | 12/2015 | Miller |
| D746,896 S | 1/2016 | Markovitz et al. |
| 9,239,507 B2 | 1/2016 | Chen et al. |
| 9,244,275 B1 | 1/2016 | Li |
| 9,244,280 B1 | 1/2016 | Tiana et al. |
| 9,244,281 B1 | 1/2016 | Zimmerman et al. |
| D749,074 S | 2/2016 | Cazalet et al. |
| 9,253,359 B2 | 2/2016 | Takahashi |
| 9,269,854 B2 | 2/2016 | Jain |
| D751,551 S | 3/2016 | Ho et al. |
| D752,129 S | 3/2016 | Lee et al. |
| 9,274,338 B2 | 3/2016 | Robbins et al. |
| 9,274,339 B1 | 3/2016 | Brown et al. |
| 9,274,349 B2 | 3/2016 | Popovich et al. |
| D754,782 S | 4/2016 | Kokinakis et al. |
| 9,310,566 B2 | 4/2016 | Valera et al. |
| 9,316,786 B2 | 4/2016 | Nishiwaki et al. |
| 9,329,325 B2 | 5/2016 | Simmonds et al. |
| 9,335,548 B1 | 5/2016 | Cakmakci et al. |
| 9,335,604 B2 | 5/2016 | Popovich et al. |
| 9,341,846 B2 | 5/2016 | Popovich et al. |
| 9,354,366 B2 | 5/2016 | Jain |
| 9,366,862 B2 | 6/2016 | Haddick et al. |
| 9,366,864 B1 | 6/2016 | Brown et al. |
| 9,372,347 B1 | 6/2016 | Levola et al. |
| 9,377,623 B2 | 6/2016 | Robbins et al. |
| 9,377,852 B1 | 6/2016 | Shapiro et al. |
| 9,389,415 B2 | 7/2016 | Fattal et al. |
| 9,400,395 B2 | 7/2016 | Travers et al. |
| 9,423,360 B1 | 8/2016 | Kostamo et al. |
| 9,429,692 B1 | 8/2016 | Saarikko et al. |
| 9,431,794 B2 | 8/2016 | Jain |
| 9,435,961 B2 | 9/2016 | Jiang |
| 9,456,744 B2 | 10/2016 | Popovich et al. |
| 9,459,451 B2 | 10/2016 | Saarikko et al. |
| 9,464,779 B2 | 10/2016 | Popovich et al. |
| 9,465,213 B2 | 10/2016 | Simmonds |
| 9,465,227 B2 | 10/2016 | Popovich et al. |
| 9,484,482 B2 | 11/2016 | Hsu et al. |
| 9,494,799 B2 | 11/2016 | Robbins et al. |
| 9,507,150 B1 | 11/2016 | Stratton et al. |
| 9,513,480 B2 | 12/2016 | Saarikko et al. |
| 9,516,193 B2 | 12/2016 | Aramaki |
| 9,519,089 B1 | 12/2016 | Brown et al. |
| 9,523,852 B1 | 12/2016 | Brown et al. |
| 9,535,253 B2 | 1/2017 | Levola et al. |
| 9,541,383 B2 | 1/2017 | Abovitz et al. |
| 9,541,763 B1 | 1/2017 | Heberlein et al. |
| 9,547,174 B2 | 1/2017 | Gao et al. |
| 9,551,468 B2 | 1/2017 | Jones |
| 9,551,874 B2 | 1/2017 | Amitai |
| 9,551,880 B2 | 1/2017 | Amitai |
| 9,599,813 B1 | 3/2017 | Stratton et al. |
| 9,612,403 B2 | 4/2017 | Abovitz et al. |
| 9,632,226 B2 | 4/2017 | Waldern et al. |
| 9,635,352 B1 | 4/2017 | Henry et al. |
| 9,648,313 B1 | 5/2017 | Henry et al. |
| 9,651,368 B2 | 5/2017 | Abovitz et al. |
| 9,664,824 B2 | 5/2017 | Simmonds et al. |
| 9,664,910 B2 | 5/2017 | Mansharof et al. |
| 9,671,612 B2 | 6/2017 | Kress et al. |
| 9,674,413 B1 | 6/2017 | Tiana et al. |
| 9,678,345 B1 | 6/2017 | Melzer et al. |
| 9,679,367 B1 | 6/2017 | Wald |
| 9,715,067 B1 | 7/2017 | Brown et al. |
| 9,715,110 B1 | 7/2017 | Brown et al. |
| D793,468 S | 8/2017 | Yu et al. |
| D795,865 S | 8/2017 | Porter et al. |
| D795,866 S | 8/2017 | Porter et al. |
| 9,726,540 B2 | 8/2017 | Popovich et al. |
| 9,727,772 B2 | 8/2017 | Popovich et al. |
| 9,733,475 B1 | 8/2017 | Brown et al. |
| 9,739,950 B2 | 8/2017 | Sqalli et al. |
| 9,746,688 B2 | 8/2017 | Popovich et al. |
| 9,754,507 B1 | 9/2017 | Wenger et al. |
| 9,762,895 B1 | 9/2017 | Henry et al. |
| 9,766,465 B1 | 9/2017 | Tiana et al. |
| 9,785,231 B1 | 10/2017 | Zimmerman |
| 9,791,694 B1 | 10/2017 | Haverkamp et al. |
| 9,791,696 B2 | 10/2017 | Woltman et al. |
| 9,791,703 B1 | 10/2017 | Vallius et al. |
| 9,804,316 B2 | 10/2017 | Drolet et al. |
| 9,804,389 B2 | 10/2017 | Popovich et al. |
| 9,823,423 B2 | 11/2017 | Waldern et al. |
| 9,857,605 B2 | 1/2018 | Popovich et al. |
| 9,874,931 B1 | 1/2018 | Koenck et al. |
| 9,899,800 B2 | 2/2018 | Ferrotti et al. |
| 9,915,825 B2 | 3/2018 | Robbins et al. |
| 9,933,684 B2 | 4/2018 | Brown et al. |
| 9,939,577 B2 | 4/2018 | Inoue et al. |
| 9,939,628 B2 | 4/2018 | Basset et al. |
| 9,977,247 B1 | 5/2018 | Brown et al. |
| D827,641 S | 9/2018 | Morisawa |
| 10,088,686 B2 | 10/2018 | Robbins et al. |
| 10,089,516 B2 | 10/2018 | Popovich et al. |
| 10,095,045 B2 | 10/2018 | Robbins et al. |
| 10,107,966 B1 | 10/2018 | Horibe et al. |
| 10,114,220 B2 | 10/2018 | Grey et al. |
| 10,156,681 B2 | 12/2018 | Waldern et al. |
| 10,162,181 B2 | 12/2018 | Webster et al. |
| 10,185,154 B2 | 1/2019 | Popovich et al. |
| D840,454 S | 2/2019 | Han et al. |
| 10,197,804 B2 | 2/2019 | Stenberg et al. |
| 10,209,517 B2 | 2/2019 | Popovich et al. |
| 10,216,061 B2 | 2/2019 | Popovich et al. |
| 10,234,696 B2 | 3/2019 | Popovich et al. |
| 10,241,330 B2 | 3/2019 | Popovich et al. |
| 10,241,332 B2 | 3/2019 | Vallius |
| 10,281,725 B2 | 5/2019 | Yokoyama |
| 10,330,777 B2 | 6/2019 | Popovich et al. |
| 10,345,519 B1 | 7/2019 | Miller et al. |
| 10,359,736 B2 | 7/2019 | Popovich et al. |
| D855,687 S | 8/2019 | Villalpando |
| D859,510 S | 9/2019 | Harmon et al. |
| 10,409,144 B2 | 9/2019 | Popovich et al. |
| 10,423,222 B2 | 9/2019 | Popovich et al. |
| 10,423,813 B2 | 9/2019 | Popovich et al. |
| 10,437,051 B2 | 10/2019 | Popovich et al. |
| 10,437,064 B2 | 10/2019 | Popovich et al. |
| 10,444,510 B1 | 10/2019 | Lee et al. |
| 10,459,145 B2 | 10/2019 | Popovich et al. |
| 10,459,311 B2 | 10/2019 | Popovich et al. |
| D871,494 S | 12/2019 | Yamada et al. |
| D872,170 S | 1/2020 | Evans et al. |
| D872,794 S | 1/2020 | Wilkins |
| 10,527,797 B2 | 1/2020 | Waldern et al. |
| 10,532,594 B2 | 1/2020 | Akahane et al. |
| 10,545,346 B2 | 1/2020 | Waldern et al. |
| 10,569,449 B1 | 2/2020 | Curts et al. |
| 10,578,876 B1 | 3/2020 | Lam et al. |
| 10,591,756 B2 | 3/2020 | Popovich et al. |
| 10,598,938 B1 | 3/2020 | Huang et al. |
| D880,575 S | 4/2020 | Thixton |
| 10,613,268 B1 | 4/2020 | Colburn et al. |
| 10,642,058 B2 | 5/2020 | Popovich et al. |
| 10,649,119 B2 | 5/2020 | Mohanty et al. |
| 10,670,876 B2 | 6/2020 | Popovich et al. |
| 10,678,053 B2 | 6/2020 | Waldern et al. |
| 10,690,831 B2 | 6/2020 | Calafiore |
| 10,690,915 B2 | 6/2020 | Popovich et al. |
| 10,690,916 B2 | 6/2020 | Popovich et al. |
| 10,698,214 B2 | 6/2020 | Vallius et al. |
| 10,705,281 B2 | 7/2020 | Fattal et al. |
| 10,712,571 B2 | 7/2020 | Popovich et al. |
| 10,725,304 B2 | 7/2020 | Ratnam et al. |
| 10,725,312 B2 | 7/2020 | Popovich et al. |
| 10,732,351 B2 | 8/2020 | Colburn et al. |
| 10,732,569 B2 | 8/2020 | Waldern et al. |
| 10,747,982 B2 | 8/2020 | Popovich et al. |
| 10,823,887 B1 | 11/2020 | Calafiore et al. |
| 10,859,768 B2 | 12/2020 | Popovich et al. |
| 10,890,707 B2 | 1/2021 | Waldern et al. |

(56) References Cited

U.S. PATENT DOCUMENTS

| | | |
|---|---|---|
| 10,942,430 B2 | 3/2021 | Waldern et al. |
| 10,983,257 B1 | 4/2021 | Colburn et al. |
| 11,103,892 B1 | 8/2021 | Liao et al. |
| 11,106,048 B2 | 8/2021 | Popovich et al. |
| 11,107,972 B2 | 8/2021 | Diest et al. |
| 11,137,603 B2 | 10/2021 | Zhang |
| 11,175,512 B2 | 11/2021 | Waldern et al. |
| 11,194,098 B2 | 12/2021 | Waldern et al. |
| 11,194,162 B2 | 12/2021 | Waldern et al. |
| 11,204,540 B2 | 12/2021 | Popovich et al. |
| 11,243,333 B1 | 2/2022 | Ouderkirk et al. |
| 11,256,155 B2 | 2/2022 | Popovich et al. |
| 11,281,013 B2 | 3/2022 | Popovich et al. |
| 11,300,795 B1 | 4/2022 | Stanley et al. |
| 11,306,193 B1 | 4/2022 | Lane et al. |
| 11,307,357 B2 | 4/2022 | Mohanty |
| 11,340,386 B1 | 5/2022 | Ouderkirk et al. |
| 11,378,732 B2 | 7/2022 | Waldern et al. |
| 11,391,950 B2 | 7/2022 | Calafiore |
| 11,460,621 B2 | 10/2022 | Popovich et al. |
| 11,543,594 B2 | 1/2023 | Grant et al. |
| 11,604,314 B2 | 3/2023 | Popovich et al. |
| 11,703,645 B2 | 7/2023 | Waldern et al. |
| 11,747,568 B2 | 9/2023 | Waldern et al. |
| 12,140,764 B2 | 11/2024 | Popovich et al. |
| 2001/0024177 A1 | 9/2001 | Popovich |
| 2001/0033400 A1 | 10/2001 | Sutherland et al. |
| 2001/0036012 A1 | 11/2001 | Nakai et al. |
| 2001/0043163 A1 | 11/2001 | Waldern et al. |
| 2001/0046142 A1 | 11/2001 | Van Santen et al. |
| 2001/0050756 A1 | 12/2001 | Lipton et al. |
| 2002/0003509 A1 | 1/2002 | Lipton et al. |
| 2002/0009299 A1 | 1/2002 | Lipton |
| 2002/0011969 A1 | 1/2002 | Lipton et al. |
| 2002/0012064 A1 | 1/2002 | Yamaguchi |
| 2002/0018040 A1 | 2/2002 | Aye et al. |
| 2002/0021407 A1 | 2/2002 | Elliott |
| 2002/0021461 A1 | 2/2002 | Ono et al. |
| 2002/0036825 A1 | 3/2002 | Lipton et al. |
| 2002/0047837 A1 | 4/2002 | Suyama et al. |
| 2002/0075240 A1 | 6/2002 | Lieberman et al. |
| 2002/0093701 A1 | 7/2002 | Zhang et al. |
| 2002/0110077 A1 | 8/2002 | Drobot et al. |
| 2002/0126332 A1 | 9/2002 | Popovich |
| 2002/0127497 A1 | 9/2002 | Brown et al. |
| 2002/0131175 A1 | 9/2002 | Yagi et al. |
| 2002/0150032 A1 | 10/2002 | Nishiuchi et al. |
| 2002/0150337 A1 | 10/2002 | Fujimaki |
| 2002/0167462 A1 | 11/2002 | Lewis et al. |
| 2002/0196332 A1 | 12/2002 | Lipton et al. |
| 2003/0007070 A1 | 1/2003 | Lipton et al. |
| 2003/0025881 A1 | 2/2003 | Hwang |
| 2003/0030912 A1 | 2/2003 | Gleckman et al. |
| 2003/0038912 A1 | 2/2003 | Broer et al. |
| 2003/0039442 A1 | 2/2003 | Bond et al. |
| 2003/0063042 A1 | 4/2003 | Friesem et al. |
| 2003/0063884 A1 | 4/2003 | Smith et al. |
| 2003/0067685 A1 | 4/2003 | Niv |
| 2003/0076590 A1 | 4/2003 | Kramer |
| 2003/0086670 A1 | 5/2003 | Moridaira et al. |
| 2003/0107809 A1 | 6/2003 | Chen et al. |
| 2003/0129542 A1 | 7/2003 | Shih et al. |
| 2003/0149346 A1 | 8/2003 | Arnone et al. |
| 2003/0175004 A1 | 9/2003 | Garito et al. |
| 2003/0197154 A1 | 10/2003 | Manabe et al. |
| 2003/0197157 A1 | 10/2003 | Sutherland et al. |
| 2003/0202247 A1 | 10/2003 | Niv et al. |
| 2003/0206329 A1 | 11/2003 | Ikeda et al. |
| 2003/0228019 A1 | 12/2003 | Eichler et al. |
| 2004/0004767 A1 | 1/2004 | Song |
| 2004/0004989 A1 | 1/2004 | Shigeoka |
| 2004/0012833 A1 | 1/2004 | Newswanger et al. |
| 2004/0047938 A1 | 3/2004 | Kosuga et al. |
| 2004/0057138 A1 | 3/2004 | Tanijiri et al. |
| 2004/0075830 A1 | 4/2004 | Miyake et al. |
| 2004/0089842 A1 | 5/2004 | Sutehrland et al. |
| 2004/0108971 A1 | 6/2004 | Waldern et al. |
| 2004/0109234 A1 | 6/2004 | Levola |
| 2004/0112862 A1 | 6/2004 | Willson et al. |
| 2004/0125454 A1 | 7/2004 | Kawasaki et al. |
| 2004/0130797 A1 | 7/2004 | Leigh |
| 2004/0141217 A1 | 7/2004 | Endo et al. |
| 2004/0156008 A1 | 8/2004 | Reznikov et al. |
| 2004/0174348 A1 | 9/2004 | David |
| 2004/0175627 A1 | 9/2004 | Sutherland et al. |
| 2004/0179764 A1 | 9/2004 | Melikechi et al. |
| 2004/0184156 A1 | 9/2004 | Gunn, III et al. |
| 2004/0188617 A1 | 9/2004 | Devitt et al. |
| 2004/0200368 A1 | 10/2004 | Ogino et al. |
| 2004/0208446 A1 | 10/2004 | Bond et al. |
| 2004/0208466 A1 | 10/2004 | Mossberg et al. |
| 2004/0225025 A1 | 11/2004 | Sullivan et al. |
| 2004/0263969 A1 | 12/2004 | Lipton et al. |
| 2004/0263971 A1 | 12/2004 | Lipton et al. |
| 2005/0018304 A1 | 1/2005 | Lipton et al. |
| 2005/0047705 A1 | 3/2005 | Domash et al. |
| 2005/0079663 A1 | 4/2005 | Masutani et al. |
| 2005/0083564 A1 | 4/2005 | Mallya et al. |
| 2005/0105909 A1 | 5/2005 | Stone |
| 2005/0122395 A1 | 6/2005 | Lipton et al. |
| 2005/0134404 A1 | 6/2005 | Kajiya et al. |
| 2005/0135747 A1 | 6/2005 | Greiner et al. |
| 2005/0136260 A1 | 6/2005 | Garcia |
| 2005/0141066 A1 | 6/2005 | Ouchi |
| 2005/0141811 A1 | 6/2005 | Yang et al. |
| 2005/0174321 A1 | 8/2005 | Ikeda et al. |
| 2005/0180687 A1 | 8/2005 | Amitai |
| 2005/0195276 A1 | 9/2005 | Lipton et al. |
| 2005/0218377 A1 | 10/2005 | Lawandy |
| 2005/0231774 A1 | 10/2005 | Hayashi et al. |
| 2005/0232530 A1 | 10/2005 | Kekas |
| 2005/0254752 A1 | 11/2005 | Domash et al. |
| 2005/0259217 A1 | 11/2005 | Lin et al. |
| 2005/0259302 A9 | 11/2005 | Metz et al. |
| 2005/0259944 A1 | 11/2005 | Anderson et al. |
| 2005/0265585 A1 | 12/2005 | Rowe |
| 2005/0269481 A1 | 12/2005 | David et al. |
| 2005/0271258 A1 | 12/2005 | Rowe |
| 2005/0286133 A1 | 12/2005 | Lipton |
| 2006/0002274 A1 | 1/2006 | Kihara et al. |
| 2006/0012878 A1 | 1/2006 | Lipton et al. |
| 2006/0013977 A1 | 1/2006 | Duke et al. |
| 2006/0043938 A1 | 3/2006 | O'Gorman et al. |
| 2006/0055993 A1 | 3/2006 | Kobayashi et al. |
| 2006/0093012 A1 | 5/2006 | Singh et al. |
| 2006/0093793 A1 | 5/2006 | Miyakawa et al. |
| 2006/0114564 A1 | 6/2006 | Sutherland et al. |
| 2006/0119837 A1 | 6/2006 | Raguin et al. |
| 2006/0119916 A1 | 6/2006 | Sutherland et al. |
| 2006/0126179 A1 | 6/2006 | Levola |
| 2006/0132914 A1 | 6/2006 | Weiss et al. |
| 2006/0142455 A1 | 6/2006 | Agarwal et al. |
| 2006/0146422 A1 | 7/2006 | Koike |
| 2006/0159864 A1 | 7/2006 | Natarajan et al. |
| 2006/0164593 A1 | 7/2006 | Peyghambarian et al. |
| 2006/0171647 A1 | 8/2006 | Ye et al. |
| 2006/0177180 A1 | 8/2006 | Tazawa et al. |
| 2006/0181683 A1 | 8/2006 | Bhowmik et al. |
| 2006/0191293 A1 | 8/2006 | Kuczma |
| 2006/0215244 A1 | 9/2006 | Yosha et al. |
| 2006/0215976 A1 | 9/2006 | Singh et al. |
| 2006/0221063 A1 | 10/2006 | Ishihara |
| 2006/0221448 A1 | 10/2006 | Nivon et al. |
| 2006/0228073 A1 | 10/2006 | Mukawa et al. |
| 2006/0262250 A1 | 11/2006 | Hobbs |
| 2006/0268104 A1 | 11/2006 | Cowan et al. |
| 2006/0268412 A1 | 11/2006 | Downing et al. |
| 2006/0279662 A1 | 12/2006 | Kapellner et al. |
| 2006/0284974 A1 | 12/2006 | Lipton et al. |
| 2006/0285205 A1 | 12/2006 | Lipton et al. |
| 2006/0291021 A1 | 12/2006 | Mukawa |
| 2006/0291052 A1 | 12/2006 | Lipton et al. |
| 2006/0292493 A1 | 12/2006 | Shinotsuka et al. |
| 2007/0012777 A1 | 1/2007 | Tsikos et al. |

(56) References Cited

U.S. PATENT DOCUMENTS

| | | |
|---|---|---|
| 2007/0019152 A1 | 1/2007 | Caputo et al. |
| 2007/0019297 A1 | 1/2007 | Stewart et al. |
| 2007/0034600 A1 | 2/2007 | Willson et al. |
| 2007/0041684 A1 | 2/2007 | Popovich et al. |
| 2007/0045596 A1 | 3/2007 | King et al. |
| 2007/0052929 A1 | 3/2007 | Allman et al. |
| 2007/0053032 A1 | 3/2007 | Popovich |
| 2007/0070476 A1 | 3/2007 | Yamada et al. |
| 2007/0070504 A1 | 3/2007 | Akutsu et al. |
| 2007/0070859 A1 | 3/2007 | Hirayama |
| 2007/0089625 A1 | 4/2007 | Grinberg et al. |
| 2007/0097502 A1 | 5/2007 | Lipton et al. |
| 2007/0109400 A1 | 5/2007 | Woodgate et al. |
| 2007/0109401 A1 | 5/2007 | Lipton et al. |
| 2007/0115553 A1 | 5/2007 | Chang-Hasnain et al. |
| 2007/0116409 A1 | 5/2007 | Bryan et al. |
| 2007/0127348 A1 | 6/2007 | Ooi et al. |
| 2007/0133089 A1 | 6/2007 | Lipton et al. |
| 2007/0133920 A1 | 6/2007 | Lee et al. |
| 2007/0133983 A1 | 6/2007 | Traff |
| 2007/0146624 A1 | 6/2007 | Duston et al. |
| 2007/0146625 A1 | 6/2007 | Ooi et al. |
| 2007/0154153 A1 | 7/2007 | Fomitchov et al. |
| 2007/0160325 A1 | 7/2007 | Son et al. |
| 2007/0177007 A1 | 8/2007 | Lipton et al. |
| 2007/0182915 A1 | 8/2007 | Osawa et al. |
| 2007/0183650 A1 | 8/2007 | Lipton et al. |
| 2007/0188602 A1 | 8/2007 | Cowan et al. |
| 2007/0188837 A1 | 8/2007 | Shimizu et al. |
| 2007/0195409 A1 | 8/2007 | Yun et al. |
| 2007/0206155 A1 | 9/2007 | Lipton |
| 2007/0211164 A1 | 9/2007 | Olsen et al. |
| 2007/0236560 A1 | 10/2007 | Lipton et al. |
| 2007/0237456 A1 | 10/2007 | Blauvelt et al. |
| 2007/0247687 A1 | 10/2007 | Handschy et al. |
| 2007/0258138 A1 | 11/2007 | Cowan et al. |
| 2007/0263169 A1 | 11/2007 | Lipton |
| 2008/0001909 A1 | 1/2008 | Lim |
| 2008/0018851 A1 | 1/2008 | Lipton et al. |
| 2008/0024598 A1 | 1/2008 | Perlin et al. |
| 2008/0043334 A1 | 2/2008 | Itzkovitch et al. |
| 2008/0049100 A1 | 2/2008 | Lipton et al. |
| 2008/0062259 A1 | 3/2008 | Lipton et al. |
| 2008/0063808 A1 | 3/2008 | Stumpe et al. |
| 2008/0089073 A1 | 4/2008 | Hikmet |
| 2008/0106775 A1 | 5/2008 | Amitai et al. |
| 2008/0106779 A1 | 5/2008 | Peterson et al. |
| 2008/0117289 A1 | 5/2008 | Schowengerdt et al. |
| 2008/0136916 A1 | 6/2008 | Wolff |
| 2008/0136923 A1 | 6/2008 | Inbar et al. |
| 2008/0138013 A1 | 6/2008 | Parriaux |
| 2008/0143964 A1 | 6/2008 | Cowan et al. |
| 2008/0143965 A1 | 6/2008 | Cowan et al. |
| 2008/0149517 A1 | 6/2008 | Lipton et al. |
| 2008/0151370 A1 | 6/2008 | Cook et al. |
| 2008/0151379 A1 | 6/2008 | Amitai |
| 2008/0186573 A1 | 8/2008 | Lipton |
| 2008/0186574 A1 | 8/2008 | Robinson et al. |
| 2008/0186604 A1 | 8/2008 | Amitai |
| 2008/0193085 A1 | 8/2008 | Singh et al. |
| 2008/0198471 A1 | 8/2008 | Amitai |
| 2008/0225187 A1 | 9/2008 | Yamanaka |
| 2008/0226281 A1 | 9/2008 | Lipton |
| 2008/0239067 A1 | 10/2008 | Lipton |
| 2008/0239068 A1 | 10/2008 | Lipton |
| 2008/0273081 A1 | 11/2008 | Lipton |
| 2008/0278812 A1 | 11/2008 | Amitai |
| 2008/0285137 A1 | 11/2008 | Simmonds et al. |
| 2008/0285140 A1 | 11/2008 | Amitai |
| 2008/0297731 A1 | 12/2008 | Powell et al. |
| 2008/0297807 A1 | 12/2008 | Feldman et al. |
| 2008/0298649 A1 | 12/2008 | Ennis et al. |
| 2008/0298740 A1 | 12/2008 | Hlousek et al. |
| 2008/0303895 A1 | 12/2008 | Akka et al. |
| 2008/0303896 A1 | 12/2008 | Lipton et al. |
| 2008/0304111 A1 | 12/2008 | Queenan et al. |
| 2008/0309586 A1 | 12/2008 | Vitale |
| 2008/0316303 A1 | 12/2008 | Chiu et al. |
| 2008/0316375 A1 | 12/2008 | Lipton et al. |
| 2009/0010135 A1 | 1/2009 | Ushiro et al. |
| 2009/0017424 A1 | 1/2009 | Yoeli et al. |
| 2009/0019222 A1 | 1/2009 | Verma et al. |
| 2009/0052017 A1 | 2/2009 | Sasaki |
| 2009/0052046 A1 | 2/2009 | Amitai |
| 2009/0052047 A1 | 2/2009 | Amitai |
| 2009/0067774 A1 | 3/2009 | Magnusson |
| 2009/0074356 A1 | 3/2009 | Sanchez et al. |
| 2009/0097122 A1 | 4/2009 | Niv |
| 2009/0097127 A1 | 4/2009 | Amitai |
| 2009/0116790 A1 | 5/2009 | Mossberg et al. |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128495 A1 | 5/2009 | Kong et al. |
| 2009/0128781 A1 | 5/2009 | Li |
| 2009/0128902 A1 | 5/2009 | Niv et al. |
| 2009/0128911 A1 | 5/2009 | Itzkovitch et al. |
| 2009/0136246 A1 | 5/2009 | Murakami |
| 2009/0141324 A1 | 6/2009 | Mukawa |
| 2009/0153437 A1 | 6/2009 | Aharoni |
| 2009/0169152 A1 | 7/2009 | Oestergard |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0242021 A1 | 10/2009 | Petkie et al. |
| 2009/0296218 A1 | 12/2009 | Ryytty |
| 2009/0303599 A1 | 12/2009 | Levola |
| 2009/0316246 A1 | 12/2009 | Asai et al. |
| 2010/0014312 A1 | 1/2010 | Travis et al. |
| 2010/0039796 A1 | 2/2010 | Mukawa |
| 2010/0053565 A1 | 3/2010 | Mizushima et al. |
| 2010/0060551 A1 | 3/2010 | Sugiyama et al. |
| 2010/0060990 A1 | 3/2010 | Wertheim et al. |
| 2010/0065726 A1 | 3/2010 | Zhong et al. |
| 2010/0079841 A1 | 4/2010 | Levola |
| 2010/0079865 A1 | 4/2010 | Saarikko et al. |
| 2010/0084261 A1 | 4/2010 | Lee et al. |
| 2010/0086256 A1 | 4/2010 | Ben Bakir et al. |
| 2010/0092124 A1 | 4/2010 | Magnusson et al. |
| 2010/0096562 A1 | 4/2010 | Klunder et al. |
| 2010/0097674 A1 | 4/2010 | Kasazumi et al. |
| 2010/0097820 A1 | 4/2010 | Owen et al. |
| 2010/0103078 A1 | 4/2010 | Mukawa et al. |
| 2010/0134534 A1 | 6/2010 | Seesselberg et al. |
| 2010/0135615 A1 | 6/2010 | Ho et al. |
| 2010/0136319 A1 | 6/2010 | Imai et al. |
| 2010/0141555 A1 | 6/2010 | Rorberg et al. |
| 2010/0141905 A1 | 6/2010 | Burke |
| 2010/0149073 A1 | 6/2010 | Chaum et al. |
| 2010/0165465 A1 | 7/2010 | Levola |
| 2010/0165660 A1 | 7/2010 | Weber et al. |
| 2010/0171680 A1 | 7/2010 | Lapidot et al. |
| 2010/0177388 A1 | 7/2010 | Cohen et al. |
| 2010/0202725 A1 | 8/2010 | Popovich et al. |
| 2010/0214659 A1 | 8/2010 | Levola |
| 2010/0220293 A1 | 9/2010 | Mizushima et al. |
| 2010/0225834 A1 | 9/2010 | Li |
| 2010/0225876 A1 | 9/2010 | Escuti et al. |
| 2010/0231532 A1 | 9/2010 | Nho et al. |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0232016 A1 | 9/2010 | Landa et al. |
| 2010/0245756 A1 | 9/2010 | Sugihara et al. |
| 2010/0245757 A1 | 9/2010 | Sugihara et al. |
| 2010/0246003 A1 | 9/2010 | Simmonds et al. |
| 2010/0246004 A1 | 9/2010 | Simmonds |
| 2010/0246993 A1 | 9/2010 | Rieger et al. |
| 2010/0253987 A1 | 10/2010 | Leopold et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0284090 A1 | 11/2010 | Simmonds |
| 2010/0284180 A1 | 11/2010 | Popovich et al. |

(56) References Cited

U.S. PATENT DOCUMENTS

| | | |
|---|---|---|
| 2010/0296163 A1 | 11/2010 | Saarikko |
| 2010/0299814 A1 | 12/2010 | Celona et al. |
| 2010/0315719 A1 | 12/2010 | Saarikko et al. |
| 2010/0321781 A1 | 12/2010 | Levola et al. |
| 2010/0322555 A1 | 12/2010 | Vermeulen et al. |
| 2011/0001895 A1 | 1/2011 | Dahl |
| 2011/0002143 A1 | 1/2011 | Saarikko et al. |
| 2011/0013423 A1 | 1/2011 | Selbrede et al. |
| 2011/0019250 A1 | 1/2011 | Aiki et al. |
| 2011/0019874 A1* | 1/2011 | Jarvenpaa ............... A61B 3/113 382/103 |
| 2011/0026128 A1 | 2/2011 | Baker et al. |
| 2011/0026774 A1 | 2/2011 | Flohr et al. |
| 2011/0032602 A1 | 2/2011 | Rothenberg et al. |
| 2011/0032618 A1 | 2/2011 | Handerek et al. |
| 2011/0032706 A1 | 2/2011 | Mukawa |
| 2011/0038024 A1 | 2/2011 | Wang et al. |
| 2011/0050548 A1 | 3/2011 | Blumenfeld et al. |
| 2011/0063604 A1 | 3/2011 | Hamre et al. |
| 2011/0096401 A1 | 4/2011 | Levola |
| 2011/0102711 A1 | 5/2011 | Sutherland et al. |
| 2011/0109880 A1 | 5/2011 | Nummela |
| 2011/0157707 A1 | 6/2011 | Tilleman et al. |
| 2011/0164221 A1 | 7/2011 | Tilleman et al. |
| 2011/0187293 A1 | 8/2011 | Travis et al. |
| 2011/0211239 A1 | 9/2011 | Mukawa et al. |
| 2011/0216255 A1 | 9/2011 | Miyauchi et al. |
| 2011/0221656 A1 | 9/2011 | Haddick et al. |
| 2011/0232211 A1 | 9/2011 | Farahi |
| 2011/0235179 A1 | 9/2011 | Simmonds |
| 2011/0235365 A1 | 9/2011 | McCollum et al. |
| 2011/0236803 A1 | 9/2011 | Weiser et al. |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0249309 A1 | 10/2011 | McPheters et al. |
| 2011/0274435 A1 | 11/2011 | Fini et al. |
| 2011/0299075 A1 | 12/2011 | Meade et al. |
| 2011/0310356 A1 | 12/2011 | Vallius |
| 2012/0007979 A1 | 1/2012 | Schneider et al. |
| 2012/0027347 A1 | 2/2012 | Mathal et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0062998 A1 | 3/2012 | Schultz et al. |
| 2012/0067864 A1 | 3/2012 | Kusuda et al. |
| 2012/0075168 A1 | 3/2012 | Osterhout et al. |
| 2012/0081789 A1 | 4/2012 | Mukawa et al. |
| 2012/0092632 A1 | 4/2012 | McLeod et al. |
| 2012/0099203 A1 | 4/2012 | Boubis et al. |
| 2012/0105634 A1 | 5/2012 | Meidan et al. |
| 2012/0105740 A1 | 5/2012 | Jannard et al. |
| 2012/0120493 A1 | 5/2012 | Simmonds et al. |
| 2012/0127577 A1 | 5/2012 | Desserouer |
| 2012/0162549 A1 | 6/2012 | Gao et al. |
| 2012/0162764 A1 | 6/2012 | Shimizu |
| 2012/0176665 A1 | 7/2012 | Song et al. |
| 2012/0183888 A1 | 7/2012 | Oliveira et al. |
| 2012/0194420 A1 | 8/2012 | Osterhout et al. |
| 2012/0200532 A1 | 8/2012 | Powell et al. |
| 2012/0206811 A1 | 8/2012 | Mukawa et al. |
| 2012/0206937 A1 | 8/2012 | Travis et al. |
| 2012/0207432 A1 | 8/2012 | Travis et al. |
| 2012/0207434 A1 | 8/2012 | Large |
| 2012/0214089 A1 | 8/2012 | Hönel et al. |
| 2012/0214090 A1 | 8/2012 | Weiser et al. |
| 2012/0218481 A1 | 8/2012 | Popovich et al. |
| 2012/0224062 A1 | 9/2012 | Lacoste et al. |
| 2012/0235884 A1 | 9/2012 | Miller et al. |
| 2012/0235886 A1 | 9/2012 | Border et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0281943 A1 | 11/2012 | Popovich et al. |
| 2012/0290973 A1 | 11/2012 | Robertson et al. |
| 2012/0294037 A1 | 11/2012 | Holman et al. |
| 2012/0300311 A1 | 11/2012 | Simmonds et al. |
| 2012/0320460 A1 | 12/2012 | Levola |
| 2012/0326950 A1 | 12/2012 | Park et al. |
| 2012/0328234 A1 | 12/2012 | Lu et al. |
| 2013/0016324 A1 | 1/2013 | Travis |
| 2013/0016362 A1 | 1/2013 | Gong et al. |
| 2013/0021392 A1 | 1/2013 | Travis |
| 2013/0021586 A1 | 1/2013 | Lippey |
| 2013/0027006 A1 | 1/2013 | Holloway et al. |
| 2013/0033485 A1 | 2/2013 | Kollin et al. |
| 2013/0039619 A1 | 2/2013 | Laughlin |
| 2013/0044376 A1 | 2/2013 | Valera et al. |
| 2013/0051730 A1 | 2/2013 | Travers et al. |
| 2013/0059233 A1 | 3/2013 | Askham |
| 2013/0069850 A1 | 3/2013 | Mukawa et al. |
| 2013/0077049 A1 | 3/2013 | Bohn |
| 2013/0088637 A1 | 4/2013 | Duparre |
| 2013/0093893 A1 | 4/2013 | Schofield et al. |
| 2013/0101253 A1 | 4/2013 | Popovich et al. |
| 2013/0107186 A1 | 5/2013 | Ando et al. |
| 2013/0117377 A1 | 5/2013 | Miller |
| 2013/0125027 A1 | 5/2013 | Abovitz et al. |
| 2013/0128230 A1 | 5/2013 | Macnamara |
| 2013/0138275 A1 | 5/2013 | Nauman et al. |
| 2013/0141937 A1 | 6/2013 | Katsuta et al. |
| 2013/0143336 A1 | 6/2013 | Jain |
| 2013/0163089 A1 | 6/2013 | Bohn |
| 2013/0163928 A1 | 6/2013 | Wang et al. |
| 2013/0170031 A1 | 7/2013 | Bohn et al. |
| 2013/0176704 A1 | 7/2013 | Lanman et al. |
| 2013/0184904 A1 | 7/2013 | Gadzinski |
| 2013/0200710 A1 | 8/2013 | Robbins |
| 2013/0207887 A1 | 8/2013 | Raffle et al. |
| 2013/0224634 A1 | 8/2013 | Berneth et al. |
| 2013/0229717 A1 | 9/2013 | Amitai |
| 2013/0249895 A1 | 9/2013 | Westerinen et al. |
| 2013/0250207 A1 | 9/2013 | Bohn |
| 2013/0250380 A1 | 9/2013 | Fujikawa et al. |
| 2013/0250430 A1 | 9/2013 | Robbins et al. |
| 2013/0250431 A1 | 9/2013 | Robbins et al. |
| 2013/0257848 A1 | 10/2013 | Westerinen et al. |
| 2013/0258701 A1 | 10/2013 | Westerinen et al. |
| 2013/0267309 A1 | 10/2013 | Robbins et al. |
| 2013/0271731 A1 | 10/2013 | Popovich et al. |
| 2013/0277890 A1 | 10/2013 | Bowman et al. |
| 2013/0286053 A1 | 10/2013 | Fleck et al. |
| 2013/0300997 A1 | 11/2013 | Popovich et al. |
| 2013/0301014 A1 | 11/2013 | DeJong et al. |
| 2013/0305437 A1 | 11/2013 | Weller et al. |
| 2013/0308185 A1 | 11/2013 | Robinson et al. |
| 2013/0312811 A1 | 11/2013 | Aspnes et al. |
| 2013/0314789 A1 | 11/2013 | Saarikko et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2013/0342525 A1 | 12/2013 | Benko et al. |
| 2014/0002514 A1 | 1/2014 | Richards |
| 2014/0003762 A1 | 1/2014 | Macnamara |
| 2014/0009809 A1 | 1/2014 | Pyun et al. |
| 2014/0022616 A1 | 1/2014 | Popovich et al. |
| 2014/0024159 A1 | 1/2014 | Jain |
| 2014/0027006 A1 | 1/2014 | Foley et al. |
| 2014/0037242 A1 | 2/2014 | Popovich et al. |
| 2014/0043672 A1 | 2/2014 | Clarke et al. |
| 2014/0043689 A1 | 2/2014 | Mason |
| 2014/0055845 A1 | 2/2014 | Jain |
| 2014/0063055 A1 | 3/2014 | Osterhout et al. |
| 2014/0064655 A1 | 3/2014 | Nguyen et al. |
| 2014/0071538 A1 | 3/2014 | Muller |
| 2014/0098010 A1 | 4/2014 | Travis |
| 2014/0104665 A1 | 4/2014 | Popovich et al. |
| 2014/0104685 A1 | 4/2014 | Bohn et al. |
| 2014/0118647 A1 | 5/2014 | Momonoi et al. |
| 2014/0126029 A1 | 5/2014 | Fuetterer |
| 2014/0126175 A1 | 5/2014 | Amitai et al. |
| 2014/0130132 A1 | 5/2014 | Cahill et al. |

(56) References Cited

U.S. PATENT DOCUMENTS

| | | |
|---|---|---|
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0154614 A1 | 6/2014 | Xie et al. |
| 2014/0160576 A1 | 6/2014 | Robbins et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0168783 A1 | 6/2014 | Luebke et al. |
| 2014/0172296 A1 | 6/2014 | Shtukater |
| 2014/0176528 A1 | 6/2014 | Robbins |
| 2014/0177023 A1 | 6/2014 | Gao et al. |
| 2014/0185286 A1 | 7/2014 | Popovich et al. |
| 2014/0198128 A1 | 7/2014 | Hong et al. |
| 2014/0198896 A1 | 7/2014 | Hemmendorff et al. |
| 2014/0204455 A1 | 7/2014 | Popovich et al. |
| 2014/0211322 A1 | 7/2014 | Bohn et al. |
| 2014/0218468 A1 | 8/2014 | Gao et al. |
| 2014/0218801 A1 | 8/2014 | Simmonds et al. |
| 2014/0232759 A1 | 8/2014 | Simmonds et al. |
| 2014/0240834 A1 | 8/2014 | Mason |
| 2014/0240842 A1 | 8/2014 | Nguyen et al. |
| 2014/0255662 A1 | 9/2014 | Enomoto et al. |
| 2014/0267420 A1 | 9/2014 | Schowengerdt et al. |
| 2014/0268017 A1 | 9/2014 | Sweis et al. |
| 2014/0268353 A1 | 9/2014 | Fujimura et al. |
| 2014/0300947 A1 | 10/2014 | Fattal et al. |
| 2014/0300960 A1 | 10/2014 | Santori et al. |
| 2014/0300966 A1 | 10/2014 | Travers et al. |
| 2014/0327970 A1 | 11/2014 | Bohn et al. |
| 2014/0330159 A1 | 11/2014 | Costa et al. |
| 2014/0367719 A1 | 12/2014 | Jain |
| 2014/0375542 A1 | 12/2014 | Robbins et al. |
| 2014/0375789 A1 | 12/2014 | Lou et al. |
| 2014/0375790 A1 | 12/2014 | Robbins et al. |
| 2015/0001677 A1 | 1/2015 | Palumbo et al. |
| 2015/0003796 A1 | 1/2015 | Bennett |
| 2015/0010265 A1 | 1/2015 | Popovich et al. |
| 2015/0015946 A1 | 1/2015 | Muller |
| 2015/0016777 A1 | 1/2015 | Abovitz et al. |
| 2015/0035744 A1 | 2/2015 | Robbins et al. |
| 2015/0036068 A1 | 2/2015 | Fattal et al. |
| 2015/0058791 A1 | 2/2015 | Robertson et al. |
| 2015/0062675 A1 | 3/2015 | Ayres et al. |
| 2015/0062707 A1 | 3/2015 | Simmonds et al. |
| 2015/0086163 A1 | 3/2015 | Valera et al. |
| 2015/0086907 A1 | 3/2015 | Mizuta et al. |
| 2015/0107671 A1 | 4/2015 | Bodan et al. |
| 2015/0109763 A1 | 4/2015 | Shinkai et al. |
| 2015/0125109 A1 | 5/2015 | Robbins et al. |
| 2015/0148728 A1 | 5/2015 | Sallum et al. |
| 2015/0160529 A1 | 6/2015 | Popovich et al. |
| 2015/0167868 A1 | 6/2015 | Boncha |
| 2015/0177443 A1 | 6/2015 | Faecke et al. |
| 2015/0177686 A1 | 6/2015 | Lee et al. |
| 2015/0177688 A1 | 6/2015 | Popovich et al. |
| 2015/0185475 A1 | 7/2015 | Saarikko et al. |
| 2015/0211960 A1 | 7/2015 | Shimizu |
| 2015/0219834 A1 | 8/2015 | Nichol et al. |
| 2015/0235447 A1 | 8/2015 | Abovitz et al. |
| 2015/0235448 A1 | 8/2015 | Schowengerdt et al. |
| 2015/0243068 A1 | 8/2015 | Solomon |
| 2015/0247975 A1 | 9/2015 | Abovitz et al. |
| 2015/0260994 A1 | 9/2015 | Akutsu et al. |
| 2015/0262424 A1 | 9/2015 | Tabaka et al. |
| 2015/0268399 A1 | 9/2015 | Futterer |
| 2015/0268415 A1 | 9/2015 | Schowengerdt et al. |
| 2015/0277375 A1 | 10/2015 | Large et al. |
| 2015/0285682 A1 | 10/2015 | Popovich et al. |
| 2015/0288129 A1 | 10/2015 | Jain |
| 2015/0289762 A1 | 10/2015 | Popovich et al. |
| 2015/0309264 A1 | 10/2015 | Abovitz et al. |
| 2015/0316768 A1 | 11/2015 | Simmonds |
| 2015/0338689 A1 | 11/2015 | Min et al. |
| 2015/0346490 A1 | 12/2015 | Tekolste et al. |
| 2015/0346495 A1 | 12/2015 | Welch et al. |
| 2015/0355394 A1 | 12/2015 | Leighton et al. |
| 2016/0003847 A1 | 1/2016 | Ryan et al. |
| 2016/0004090 A1 | 1/2016 | Popovich et al. |
| 2016/0018673 A1 | 1/2016 | Wang |
| 2016/0026253 A1 | 1/2016 | Bradski et al. |
| 2016/0033705 A1 | 2/2016 | Fattal |
| 2016/0033706 A1 | 2/2016 | Fattal et al. |
| 2016/0038992 A1 | 2/2016 | Arthur et al. |
| 2016/0041387 A1 | 2/2016 | Valera et al. |
| 2016/0055822 A1 | 2/2016 | Bell |
| 2016/0077338 A1 | 3/2016 | Robbins et al. |
| 2016/0085300 A1 | 3/2016 | Robbins et al. |
| 2016/0097959 A1 | 4/2016 | Bruizeman et al. |
| 2016/0116739 A1 | 4/2016 | TeKolste et al. |
| 2016/0124223 A1 | 5/2016 | Shinbo et al. |
| 2016/0124241 A1 | 5/2016 | Popovich et al. |
| 2016/0132025 A1 | 5/2016 | Taff et al. |
| 2016/0147067 A1 | 5/2016 | Hua et al. |
| 2016/0170226 A1 | 6/2016 | Popovich et al. |
| 2016/0178901 A1 | 6/2016 | Ishikawa |
| 2016/0195664 A1 | 7/2016 | Fattal et al. |
| 2016/0209648 A1 | 7/2016 | Haddick et al. |
| 2016/0209657 A1 | 7/2016 | Popovich et al. |
| 2016/0231568 A1 | 8/2016 | Saarikko et al. |
| 2016/0231570 A1 | 8/2016 | Levola et al. |
| 2016/0238772 A1 | 8/2016 | Waldern et al. |
| 2016/0266398 A1 | 9/2016 | Poon et al. |
| 2016/0274356 A1 | 9/2016 | Mason |
| 2016/0274362 A1 | 9/2016 | Tinch et al. |
| 2016/0283773 A1 | 9/2016 | Popovich et al. |
| 2016/0291328 A1 | 10/2016 | Popovich et al. |
| 2016/0299344 A1 | 10/2016 | Dobschal et al. |
| 2016/0320536 A1 | 11/2016 | Simmonds et al. |
| 2016/0327705 A1 | 11/2016 | Simmonds et al. |
| 2016/0336033 A1 | 11/2016 | Tanaka |
| 2016/0341964 A1 | 11/2016 | Amitai |
| 2016/0363840 A1 | 12/2016 | Mizoguchi et al. |
| 2016/0377879 A1 | 12/2016 | Popovich et al. |
| 2017/0003505 A1 | 1/2017 | Vallius et al. |
| 2017/0010466 A1 | 1/2017 | Klug et al. |
| 2017/0010488 A1 | 1/2017 | Klug et al. |
| 2017/0030550 A1 | 2/2017 | Popovich et al. |
| 2017/0031160 A1 | 2/2017 | Popovich et al. |
| 2017/0031171 A1 | 2/2017 | Vallius et al. |
| 2017/0032166 A1 | 2/2017 | Raguin et al. |
| 2017/0034435 A1 | 2/2017 | Vallius |
| 2017/0038579 A1 | 2/2017 | Yeoh et al. |
| 2017/0052374 A1 | 2/2017 | Waldern et al. |
| 2017/0052376 A1 | 2/2017 | Amitai et al. |
| 2017/0059759 A1 | 3/2017 | Ayres et al. |
| 2017/0059775 A1 | 3/2017 | Coles et al. |
| 2017/0102543 A1 | 4/2017 | Vallius |
| 2017/0115487 A1 | 4/2017 | Travis et al. |
| 2017/0123208 A1 | 5/2017 | Vallius |
| 2017/0131460 A1 | 5/2017 | Lin et al. |
| 2017/0131545 A1 | 5/2017 | Wall et al. |
| 2017/0131546 A1 | 5/2017 | Woltman et al. |
| 2017/0131551 A1 | 5/2017 | Robbins et al. |
| 2017/0138789 A1 | 5/2017 | Ivanov |
| 2017/0160546 A1 | 6/2017 | Bull et al. |
| 2017/0176747 A1 | 6/2017 | Vallius et al. |
| 2017/0180404 A1 | 6/2017 | Bersch et al. |
| 2017/0180408 A1 | 6/2017 | Yu et al. |
| 2017/0192246 A9 | 7/2017 | Popovich et al. |
| 2017/0192499 A1 | 7/2017 | Trail |
| 2017/0199333 A1 | 7/2017 | Waldern et al. |
| 2017/0212295 A1 | 7/2017 | Vasylyev |
| 2017/0219841 A1 | 8/2017 | Popovich et al. |
| 2017/0255257 A1 | 9/2017 | Tiana et al. |
| 2017/0270637 A1 | 9/2017 | Perreault et al. |
| 2017/0276940 A1 | 9/2017 | Popovich et al. |
| 2017/0299793 A1 | 10/2017 | Fattal |
| 2017/0299794 A1 | 10/2017 | Fattal |
| 2017/0299860 A1 | 10/2017 | Wall et al. |
| 2017/0307800 A1 | 10/2017 | Fattal |
| 2017/0322426 A1 | 11/2017 | Tervo |
| 2017/0329075 A1 | 11/2017 | Yeoh et al. |

(56) References Cited

U.S. PATENT DOCUMENTS

| | | |
|---|---|---|
| 2017/0329140 A1 | 11/2017 | Yeoh et al. |
| 2017/0356801 A1 | 12/2017 | Popovich et al. |
| 2017/0357841 A1 | 12/2017 | Popovich et al. |
| 2018/0003805 A1* | 1/2018 | Popovich .............. G06F 3/013 |
| 2018/0011324 A1 | 1/2018 | Popovich et al. |
| 2018/0017801 A1 | 1/2018 | Chang et al. |
| 2018/0052277 A1 | 2/2018 | Schowengerdt et al. |
| 2018/0059305 A1 | 3/2018 | Popovich et al. |
| 2018/0067251 A1 | 3/2018 | Baldwin et al. |
| 2018/0067318 A1 | 3/2018 | St. Hilaire |
| 2018/0074265 A1 | 3/2018 | Waldern et al. |
| 2018/0074340 A1 | 3/2018 | Robbins et al. |
| 2018/0074352 A1 | 3/2018 | Popovich et al. |
| 2018/0081190 A1 | 3/2018 | Lee et al. |
| 2018/0082644 A1 | 3/2018 | Bohn |
| 2018/0095283 A1 | 4/2018 | Takeda et al. |
| 2018/0107011 A1 | 4/2018 | Lu et al. |
| 2018/0113303 A1 | 4/2018 | Popovich et al. |
| 2018/0120669 A1 | 5/2018 | Popovich et al. |
| 2018/0129060 A1 | 5/2018 | Lee et al. |
| 2018/0143438 A1 | 5/2018 | Oh |
| 2018/0143449 A1 | 5/2018 | Popovich et al. |
| 2018/0172995 A1 | 6/2018 | Lee et al. |
| 2018/0188542 A1 | 7/2018 | Waldern et al. |
| 2018/0188691 A1 | 7/2018 | Fattal |
| 2018/0203230 A1 | 7/2018 | Vallius et al. |
| 2018/0210198 A1 | 7/2018 | Brown et al. |
| 2018/0210205 A1 | 7/2018 | Grey et al. |
| 2018/0210396 A1 | 7/2018 | Popovich et al. |
| 2018/0232048 A1 | 8/2018 | Popovich et al. |
| 2018/0246354 A1 | 8/2018 | Popovich et al. |
| 2018/0252869 A1 | 9/2018 | Ayres et al. |
| 2018/0275350 A1 | 9/2018 | Oh et al. |
| 2018/0275402 A1* | 9/2018 | Popovich .............. G02B 6/0035 |
| 2018/0275410 A1 | 9/2018 | Yeoh et al. |
| 2018/0284440 A1 | 10/2018 | Popovich et al. |
| 2018/0299678 A1 | 10/2018 | Singer et al. |
| 2018/0338131 A1 | 11/2018 | Robbins |
| 2018/0348524 A1 | 12/2018 | Blum et al. |
| 2018/0373115 A1 | 12/2018 | Brown et al. |
| 2019/0041634 A1 | 2/2019 | Popovich et al. |
| 2019/0042827 A1 | 2/2019 | Popovich et al. |
| 2019/0064526 A1 | 2/2019 | Connor |
| 2019/0064735 A1 | 2/2019 | Waldern et al. |
| 2019/0072723 A1 | 3/2019 | Waldern et al. |
| 2019/0094548 A1 | 3/2019 | Nicholson et al. |
| 2019/0113751 A9 | 4/2019 | Waldern et al. |
| 2019/0113829 A1 | 4/2019 | Waldern et al. |
| 2019/0114484 A1 | 4/2019 | Keech et al. |
| 2019/0121027 A1 | 4/2019 | Popovich et al. |
| 2019/0129085 A1 | 5/2019 | Waldern et al. |
| 2019/0162962 A1 | 5/2019 | Leighton et al. |
| 2019/0162963 A1 | 5/2019 | Leighton et al. |
| 2019/0171031 A1 | 6/2019 | Popovich et al. |
| 2019/0179153 A1 | 6/2019 | Popovich et al. |
| 2019/0187474 A1 | 6/2019 | Bhargava et al. |
| 2019/0187538 A1 | 6/2019 | Popovich et al. |
| 2019/0188471 A1 | 6/2019 | Osterhout et al. |
| 2019/0212195 A9 | 7/2019 | Popovich et al. |
| 2019/0212557 A1 | 7/2019 | Waldern et al. |
| 2019/0212573 A1 | 7/2019 | Popovich et al. |
| 2019/0212588 A1 | 7/2019 | Waldern et al. |
| 2019/0212589 A1 | 7/2019 | Waldern et al. |
| 2019/0212596 A1 | 7/2019 | Waldern et al. |
| 2019/0212597 A1 | 7/2019 | Waldern et al. |
| 2019/0212698 A1 | 7/2019 | Waldern et al. |
| 2019/0212699 A1 | 7/2019 | Waldern et al. |
| 2019/0219822 A1 | 7/2019 | Popovich et al. |
| 2019/0226830 A1 | 7/2019 | Edwin et al. |
| 2019/0243142 A1 | 8/2019 | Tekolste et al. |
| 2019/0243209 A1 | 8/2019 | Perreault et al. |
| 2019/0265486 A1 | 8/2019 | Hansotte et al. |
| 2019/0278224 A1 | 9/2019 | Schlottau et al. |
| 2019/0285796 A1 | 9/2019 | Waldern et al. |
| 2019/0293880 A1 | 9/2019 | Nishiwaki et al. |
| 2019/0319426 A1 | 10/2019 | Lu et al. |
| 2019/0339558 A1 | 11/2019 | Waldern et al. |
| 2020/0012839 A1 | 1/2020 | Popovich et al. |
| 2020/0026074 A1 | 1/2020 | Waldern et al. |
| 2020/0033190 A1 | 1/2020 | Popovich et al. |
| 2020/0033801 A1 | 1/2020 | Waldern et al. |
| 2020/0033802 A1 | 1/2020 | Popovich et al. |
| 2020/0041791 A1 | 2/2020 | Shipton et al. |
| 2020/0057353 A1 | 2/2020 | Popovich et al. |
| 2020/0064637 A1 | 2/2020 | Popovich et al. |
| 2020/0081317 A1 | 3/2020 | Popovich et al. |
| 2020/0089319 A1 | 3/2020 | Popovich et al. |
| 2020/0103661 A1 | 4/2020 | Kamakura |
| 2020/0116997 A1 | 4/2020 | Lee et al. |
| 2020/0142131 A1 | 5/2020 | Waldern et al. |
| 2020/0150469 A1 | 5/2020 | Popovich et al. |
| 2020/0159023 A1 | 5/2020 | Bhargava et al. |
| 2020/0159026 A1 | 5/2020 | Waldern et al. |
| 2020/0183163 A1 | 6/2020 | Waldern et al. |
| 2020/0201042 A1 | 6/2020 | Wang et al. |
| 2020/0201051 A1 | 6/2020 | Popovich et al. |
| 2020/0209630 A1 | 7/2020 | Schultz et al. |
| 2020/0225471 A1 | 7/2020 | Waldern et al. |
| 2020/0241304 A1 | 7/2020 | Popovich et al. |
| 2020/0247016 A1 | 8/2020 | Calafiore |
| 2020/0247017 A1 | 8/2020 | Waldern et al. |
| 2020/0249484 A1 | 8/2020 | Waldern et al. |
| 2020/0249491 A1 | 8/2020 | Popovich et al. |
| 2020/0249568 A1 | 8/2020 | Rao et al. |
| 2020/0264378 A1* | 8/2020 | Grant .................. G02B 6/0016 |
| 2020/0271973 A1 | 8/2020 | Waldern et al. |
| 2020/0292745 A1 | 9/2020 | Waldern et al. |
| 2020/0292840 A1 | 9/2020 | Popovich et al. |
| 2020/0333606 A1 | 10/2020 | Popovich et al. |
| 2020/0341194 A1 | 10/2020 | Waldern et al. |
| 2020/0348519 A1 | 11/2020 | Waldern et al. |
| 2020/0348531 A1 | 11/2020 | Popovich et al. |
| 2020/0363771 A1 | 11/2020 | Waldern et al. |
| 2020/0372236 A1 | 11/2020 | Popovich et al. |
| 2020/0386947 A1 | 12/2020 | Waldern et al. |
| 2020/0400946 A1 | 12/2020 | Waldern et al. |
| 2021/0026297 A1 | 1/2021 | Waldern et al. |
| 2021/0033857 A1 | 2/2021 | Waldern et al. |
| 2021/0055551 A1 | 2/2021 | Chi et al. |
| 2021/0063634 A1 | 3/2021 | Waldern et al. |
| 2021/0109285 A1 | 4/2021 | Jiang et al. |
| 2021/0191122 A1 | 6/2021 | Yaroshchuk et al. |
| 2021/0199873 A1 | 7/2021 | Shi et al. |
| 2021/0199971 A1 | 7/2021 | Lee et al. |
| 2021/0216040 A1 | 7/2021 | Waldern et al. |
| 2021/0223585 A1 | 7/2021 | Waldern et al. |
| 2021/0231874 A1 | 7/2021 | Popovich et al. |
| 2021/0231955 A1 | 7/2021 | Waldern et al. |
| 2021/0238374 A1 | 8/2021 | Ye et al. |
| 2021/0239984 A1 | 8/2021 | Popovich et al. |
| 2021/0247560 A1 | 8/2021 | Waldern et al. |
| 2021/0247620 A1 | 8/2021 | Popovich et al. |
| 2021/0247719 A1 | 8/2021 | Waldern et al. |
| 2021/0278739 A1 | 9/2021 | Brown et al. |
| 2021/0349328 A1 | 11/2021 | Popovich et al. |
| 2021/0364803 A1 | 11/2021 | Schowengerdt et al. |
| 2021/0364836 A1 | 11/2021 | Waldern et al. |
| 2021/0405299 A1 | 12/2021 | Grant et al. |
| 2021/0405365 A1 | 12/2021 | Popovich et al. |
| 2021/0405514 A1 | 12/2021 | Waldern et al. |
| 2022/0019015 A1 | 1/2022 | Calafiore et al. |
| 2022/0082739 A1 | 3/2022 | Franke et al. |
| 2022/0091323 A1 | 3/2022 | Yaroshchuk et al. |
| 2022/0099898 A1 | 3/2022 | Waldern et al. |
| 2022/0163728 A1 | 5/2022 | Waldern et al. |
| 2022/0204790 A1 | 6/2022 | Zhang et al. |
| 2022/0206232 A1 | 6/2022 | Zhang et al. |
| 2022/0283377 A1 | 9/2022 | Popovich et al. |
| 2023/0221493 A1 | 7/2023 | Grant et al. |
| 2023/0290290 A1 | 9/2023 | Shams et al. |
| 2023/0314810 A1 | 10/2023 | Delapp et al. |
| 2024/0012242 A1 | 1/2024 | Waldern et al. |
| 2024/0012247 A1 | 1/2024 | Popovich et al. |
| 2024/0019640 A1 | 1/2024 | Waldern et al. |

(56) References Cited

U.S. PATENT DOCUMENTS

| | | |
|---|---|---|
| 2024/0027670 A1 | 1/2024 | Waldern et al. |
| 2024/0027689 A1 | 1/2024 | Waldern et al. |
| 2024/0272724 A1 | 8/2024 | Bradski et al. |
| 2024/0295703 A1 | 9/2024 | Grant et al. |

FOREIGN PATENT DOCUMENTS

| | | | |
|---|---|---|---|
| CN | 1320217 | A | 10/2001 |
| CN | 1886680 | A | 12/2006 |
| CN | 200944140 | Y | 9/2007 |
| CN | 101103297 | A | 1/2008 |
| CN | 101151562 | A | 3/2008 |
| CN | 101263412 | A | 9/2008 |
| CN | 100492099 | C | 5/2009 |
| CN | 101589326 | A | 11/2009 |
| CN | 101688977 | A | 3/2010 |
| CN | 101726857 | A | 6/2010 |
| CN | 101793555 | A | 8/2010 |
| CN | 101881936 | A | 11/2010 |
| CN | 101910900 | A | 12/2010 |
| CN | 101945612 | A | 1/2011 |
| CN | 102314092 | A | 1/2012 |
| CN | 102498425 | A | 6/2012 |
| CN | 102608762 | A | 7/2012 |
| CN | 102782563 | A | 11/2012 |
| CN | 102928981 | A | 2/2013 |
| CN | 103000188 | A | 3/2013 |
| CN | 103185970 | A | 7/2013 |
| CN | 103562802 | A | 2/2014 |
| CN | 103777282 | A | 5/2014 |
| CN | 103823267 | A | 5/2014 |
| CN | 103959133 | A | 7/2014 |
| CN | 104040308 | A | 9/2014 |
| CN | 104040410 | A | 9/2014 |
| CN | 104136952 | A | 11/2014 |
| CN | 104204901 | A | 12/2014 |
| CN | 104246626 | A | 12/2014 |
| CN | 303019849 | | 12/2014 |
| CN | 104520751 | A | 4/2015 |
| CN | 303217936 | | 5/2015 |
| CN | 104956252 | A | 9/2015 |
| CN | 105074537 | A | 11/2015 |
| CN | 105074539 | A | 11/2015 |
| CN | 105137598 | A | 12/2015 |
| CN | 105190407 | A | 12/2015 |
| CN | 105229514 | A | 1/2016 |
| CN | 105393159 | A | 3/2016 |
| CN | 105408801 | A | 3/2016 |
| CN | 105408802 | A | 3/2016 |
| CN | 105408803 | A | 3/2016 |
| CN | 105531716 | A | 4/2016 |
| CN | 105705981 | A | 6/2016 |
| CN | 105940451 | A | 9/2016 |
| CN | 106125308 | A | 11/2016 |
| CN | 106443867 | A | 2/2017 |
| CN | 106575034 | A | 4/2017 |
| CN | 106716223 | A | 5/2017 |
| CN | 106842397 | A | 6/2017 |
| CN | 106950744 | A | 7/2017 |
| CN | 107015368 | A | 8/2017 |
| CN | 107466372 | A | 12/2017 |
| CN | 107533137 | A | 1/2018 |
| CN | 107873086 | A | 4/2018 |
| CN | 108107506 | A | 6/2018 |
| CN | 108351516 | A | 7/2018 |
| CN | 108474945 | A | 8/2018 |
| CN | 108549124 | A | 9/2018 |
| CN | 108681067 | A | 10/2018 |
| CN | 108780224 | A | 11/2018 |
| CN | 208092344 | U | 11/2018 |
| CN | 109073889 | A | 12/2018 |
| CN | 109154717 | A | 1/2019 |
| CN | 208621784 | U | 3/2019 |
| CN | 103823267 | B | 5/2019 |
| CN | 110383117 | A | 10/2019 |
| CN | 107873086 | B | 3/2020 |
| CN | 111025657 | A | 4/2020 |
| CN | 111323867 | A | 6/2020 |
| CN | 111386495 | A | 7/2020 |
| CN | 111566571 | A | 8/2020 |
| CN | 305973971 | S | 8/2020 |
| CN | 111615655 | A | 9/2020 |
| CN | 111684362 | A | 9/2020 |
| CN | 111902768 | A | 11/2020 |
| CN | 107466372 | B | 1/2021 |
| CN | 109073889 | B | 4/2021 |
| CN | 108780224 | B | 8/2021 |
| CN | 113424095 | A | 9/2021 |
| CN | 108474945 | B | 10/2021 |
| CN | 113692544 | A | 11/2021 |
| CN | 113728258 | A | 11/2021 |
| CN | 113759555 | A | 12/2021 |
| CN | 114207492 | A | 3/2022 |
| CN | 114341729 | A | 4/2022 |
| CN | 116149058 | A | 5/2023 |
| DE | 19751190 | A1 | 5/1999 |
| DE | 10221837 | A1 | 12/2003 |
| DE | 102006003785 | A1 | 7/2007 |
| DE | 102006036831 | A1 | 2/2008 |
| DE | 102012108424 | A1 | 3/2014 |
| DE | 102013209436 | A1 | 11/2014 |
| EM | 001747551-0002 | | 8/2012 |
| EM | 007234190-0001 | | 11/2019 |
| EP | 0795775 | A2 | 9/1997 |
| EP | 0822441 | A2 | 2/1998 |
| EP | 1347641 | A1 | 9/2003 |
| EP | 1413972 | A1 | 4/2004 |
| EP | 1526709 | A2 | 4/2005 |
| EP | 1748305 | A1 | 1/2007 |
| EP | 1938152 | A1 | 7/2008 |
| EP | 1413972 | B1 | 10/2008 |
| EP | 2110701 | A1 | 10/2009 |
| EP | 2196729 | A1 | 6/2010 |
| EP | 2225592 | A1 | 9/2010 |
| EP | 2244114 | A1 | 10/2010 |
| EP | 2326983 | A1 | 6/2011 |
| EP | 2381290 | A1 | 10/2011 |
| EP | 1828832 | B1 | 5/2013 |
| EP | 2733517 | A1 | 5/2014 |
| EP | 1573369 | B1 | 7/2014 |
| EP | 2748670 | A1 | 7/2014 |
| EP | 2634605 | B1 | 10/2015 |
| EP | 2929378 | A1 | 10/2015 |
| EP | 2748670 | B1 | 11/2015 |
| EP | 2995986 | A1 | 3/2016 |
| EP | 1402298 | B1 | 9/2016 |
| EP | 2995986 | B1 | 4/2017 |
| EP | 3198192 | A1 | 8/2017 |
| EP | 3245444 | A1 | 11/2017 |
| EP | 3245551 | A2 | 11/2017 |
| EP | 3256888 | A1 | 12/2017 |
| EP | 3359999 | A1 | 8/2018 |
| EP | 2494388 | B1 | 11/2018 |
| EP | 3398007 | A1 | 11/2018 |
| EP | 3433658 | A1 | 1/2019 |
| EP | 3433659 | A1 | 1/2019 |
| EP | 2842003 | B1 | 2/2019 |
| EP | 3245551 | B1 | 9/2019 |
| EP | 3548939 | A2 | 10/2019 |
| EP | 3698214 | | 8/2020 |
| EP | 3710876 | A1 | 9/2020 |
| EP | 3710887 | A1 | 9/2020 |
| EP | 3710893 | A1 | 9/2020 |
| EP | 3710894 | A1 | 9/2020 |
| EP | 3894938 | A1 | 10/2021 |
| EP | 3924759 | A1 | 12/2021 |
| EP | 3927793 | A1 | 12/2021 |
| EP | 3938821 | A1 | 1/2022 |
| EP | 3980825 | A1 | 4/2022 |
| EP | 4004646 | A1 | 6/2022 |
| EP | 2831659 | B1 | 5/2023 |
| EP | 3256888 | B1 | 4/2024 |
| EP | 4350422 | A2 | 4/2024 |
| FI | 20176157 | A1 | 6/2019 |

(56) References Cited

FOREIGN PATENT DOCUMENTS

| | | |
|---|---|---|
| FI | 20176158 A1 | 6/2019 |
| FI | 20176161 A1 | 6/2019 |
| FR | 2677463 A1 | 12/1992 |
| FR | 2975506 A1 | 11/2012 |
| GB | 2115178 A | 9/1983 |
| GB | 2140935 A | 12/1984 |
| GB | 2500631 A | 10/2013 |
| GB | 2508661 A | 6/2014 |
| GB | 2509536 A | 7/2014 |
| GB | 2512077 A | 9/2014 |
| GB | 2514658 A | 12/2014 |
| HK | 1204684 A1 | 11/2015 |
| HK | 1205563 A1 | 12/2015 |
| HK | 1205793 A1 | 12/2015 |
| HK | 1206101 A1 | 12/2015 |
| JP | 57089722 A | 6/1982 |
| JP | 02186319 A | 7/1990 |
| JP | 03239384 A | 10/1991 |
| JP | H04303812 A | 10/1992 |
| JP | 06294952 A | 10/1994 |
| JP | 07098439 A | 4/1995 |
| JP | 0990312 A | 4/1997 |
| JP | H09185313 A | 7/1997 |
| JP | 10096903 A | 4/1998 |
| JP | 11109320 A | 4/1999 |
| JP | 11142806 A | 5/1999 |
| JP | 2953444 B2 | 9/1999 |
| JP | 2000056259 A | 2/2000 |
| JP | 2000511306 A | 8/2000 |
| JP | 2000261706 A | 9/2000 |
| JP | 2000267042 A | 9/2000 |
| JP | 2001027739 A | 1/2001 |
| JP | 2001296503 A | 10/2001 |
| JP | 2002090858 A | 3/2002 |
| JP | 2002122906 A | 4/2002 |
| JP | 2002156617 A | 5/2002 |
| JP | 2002162598 A | 6/2002 |
| JP | 2002523802 A | 7/2002 |
| JP | 2002529790 A | 9/2002 |
| JP | 2002311379 A | 10/2002 |
| JP | 2003066428 A | 3/2003 |
| JP | 2003270419 A | 9/2003 |
| JP | 2004157245 A | 6/2004 |
| JP | 2006350129 A | 12/2006 |
| JP | 2007011057 A | 1/2007 |
| JP | 2007094175 A | 4/2007 |
| JP | 2007219106 A | 8/2007 |
| JP | 2008112187 A | 5/2008 |
| JP | 2008145619 A | 6/2008 |
| JP | 2008233226 A | 10/2008 |
| JP | 2009036955 A | 2/2009 |
| JP | 2009515225 A | 4/2009 |
| JP | 2009132221 A | 6/2009 |
| JP | 2009133999 A | 6/2009 |
| JP | 2009211091 A | 9/2009 |
| JP | 4367775 B2 | 11/2009 |
| JP | 2010044326 A | 2/2010 |
| JP | 2010256631 A | 11/2010 |
| JP | 2011075681 A | 4/2011 |
| JP | 2011164545 A | 8/2011 |
| JP | 2011187108 A | 9/2011 |
| JP | 2011232510 A | 11/2011 |
| JP | 2012137616 A | 7/2012 |
| JP | 2012533089 A | 12/2012 |
| JP | 2013061480 A | 4/2013 |
| JP | 5303928 B2 | 10/2013 |
| JP | 2013235256 A | 11/2013 |
| JP | 2014132328 A | 7/2014 |
| JP | 5588794 B2 | 8/2014 |
| JP | 5646748 B2 | 11/2014 |
| JP | 2015053163 A | 3/2015 |
| JP | 2015523586 A | 8/2015 |
| JP | 2015172713 A | 10/2015 |
| JP | 2016030503 A | 3/2016 |
| JP | 2017156389 A | 9/2017 |
| JP | 2017528739 A | 9/2017 |
| JP | 2018508037 A | 3/2018 |
| JP | 2018512562 A | 5/2018 |
| JP | 2018524621 A | 8/2018 |
| JP | 2018533069 A | 11/2018 |
| JP | 2019512745 A | 5/2019 |
| JP | 2019520595 A | 7/2019 |
| JP | 6598269 B2 | 10/2019 |
| JP | 6680793 B2 | 3/2020 |
| JP | 2020512578 A | 4/2020 |
| JP | 2020514783 A | 5/2020 |
| JP | 1664536 S | 7/2020 |
| JP | 6734933 B2 | 7/2020 |
| JP | 2020-537187 A | 12/2020 |
| JP | 2021509488 A | 3/2021 |
| JP | 2021509736 A | 4/2021 |
| JP | 2021509737 A | 4/2021 |
| JP | 2021509739 A | 4/2021 |
| JP | 6895451 B2 | 6/2021 |
| JP | 2022509083 A | 1/2022 |
| JP | 2022513896 A | 2/2022 |
| JP | 2022-520472 A | 3/2022 |
| JP | 2022-525165 A | 5/2022 |
| JP | 2022535460 A | 8/2022 |
| JP | 2022543571 A | 10/2022 |
| JP | 7461357 B2 | 3/2024 |
| JP | 7612592 B2 | 12/2024 |
| KR | 20060132474 A | 12/2006 |
| KR | 100803288 B1 | 2/2008 |
| KR | 20100092059 A | 8/2010 |
| KR | 20140140063 A | 12/2014 |
| KR | 20140142337 A | 12/2014 |
| KR | 20170031357 A | 3/2017 |
| KR | 20170039655 A | 4/2017 |
| KR | 30-1061010 S | 5/2020 |
| KR | 10-2020-0106932 A | 9/2020 |
| KR | 10-2020-0108030 A | 9/2020 |
| KR | 2020-0106170 A | 9/2020 |
| KR | 20200104402 A | 9/2020 |
| KR | 20210100174 A | 8/2021 |
| KR | 10-2021-0127237 A | 10/2021 |
| KR | 0138609 A | 11/2021 |
| KR | 20210134763 A | 11/2021 |
| TW | 200535633 A | 11/2005 |
| TW | 200801583 A | 1/2008 |
| TW | 201314263 A | 4/2013 |
| TW | 201600943 A | 1/2016 |
| TW | 201604601 A | 2/2016 |
| WO | 1997001133 A1 | 1/1997 |
| WO | 1997027519 A1 | 7/1997 |
| WO | 1998004650 A1 | 2/1998 |
| WO | 1999009440 A1 | 2/1999 |
| WO | 9931658 A1 | 6/1999 |
| WO | 1999052002 A1 | 10/1999 |
| WO | 2000016136 A1 | 3/2000 |
| WO | 2000023830 | 4/2000 |
| WO | 2000023832 A1 | 4/2000 |
| WO | 2000023847 | 4/2000 |
| WO | 2000028369 A2 | 5/2000 |
| WO | 2000028369 A3 | 10/2000 |
| WO | 2001050200 A2 | 7/2001 |
| WO | 2001090822 A1 | 11/2001 |
| WO | 2002082168 A1 | 10/2002 |
| WO | 2003081320 A1 | 10/2003 |
| WO | 2004023174 A2 | 3/2004 |
| WO | 2004053531 A3 | 11/2004 |
| WO | 2004102226 A2 | 11/2004 |
| WO | 2004109349 A2 | 12/2004 |
| WO | 2004109349 A3 | 1/2005 |
| WO | 2005001753 A1 | 1/2005 |
| WO | 2005006065 A8 | 1/2005 |
| WO | 2005006065 A3 | 2/2005 |
| WO | 2005073798 A1 | 8/2005 |
| WO | 2005093493 A1 | 10/2005 |
| WO | 2006002870 A1 | 1/2006 |
| WO | 2006064301 A1 | 6/2006 |
| WO | 2006064325 A1 | 6/2006 |
| WO | 2006064334 A1 | 6/2006 |
| WO | 2006102073 A2 | 9/2006 |

(56) References Cited

FOREIGN PATENT DOCUMENTS

| | | |
|---|---|---|
| WO | 2006132614 A1 | 12/2006 |
| WO | 2006102073 A3 | 1/2007 |
| WO | 2007015141 A2 | 2/2007 |
| WO | 2007029032 A1 | 3/2007 |
| WO | 2007085682 A1 | 8/2007 |
| WO | 2007130130 A2 | 11/2007 |
| WO | 2007141587 A1 | 12/2007 |
| WO | 2007141589 A1 | 12/2007 |
| WO | 2008011066 A2 | 1/2008 |
| WO | 2008011066 A9 | 5/2008 |
| WO | 2008081070 A1 | 7/2008 |
| WO | 2008100545 A2 | 8/2008 |
| WO | 2008011066 A3 | 12/2008 |
| WO | 2009013597 A2 | 1/2009 |
| WO | 2009013597 A3 | 1/2009 |
| WO | 2009077802 A1 | 6/2009 |
| WO | 2009077803 A1 | 6/2009 |
| WO | 2009101238 A1 | 8/2009 |
| WO | 2007130130 A3 | 9/2009 |
| WO | 2009155437 A1 | 12/2009 |
| WO | 2009155437 A8 | 3/2010 |
| WO | 2010023444 A1 | 3/2010 |
| WO | 2010057219 A1 | 5/2010 |
| WO | 2010067114 A1 | 6/2010 |
| WO | 2010067117 A1 | 6/2010 |
| WO | 2010078856 A1 | 7/2010 |
| WO | 2010104692 A2 | 9/2010 |
| WO | 2010122330 A1 | 10/2010 |
| WO | 2010125337 A2 | 11/2010 |
| WO | 2010125337 A3 | 11/2010 |
| WO | 2010131046 A1 | 11/2010 |
| WO | 2011012825 A1 | 2/2011 |
| WO | 2011032005 A2 | 3/2011 |
| WO | 2011042711 A2 | 4/2011 |
| WO | 2011051660 A1 | 5/2011 |
| WO | 2011055109 A2 | 5/2011 |
| WO | 2011042711 A3 | 6/2011 |
| WO | 2011073673 A1 | 6/2011 |
| WO | 2011107831 A1 | 9/2011 |
| WO | 2011110821 A1 | 9/2011 |
| WO | 2011131978 A1 | 10/2011 |
| WO | 2012052352 A1 | 4/2012 |
| WO | 2012062658 A1 | 5/2012 |
| WO | 2012136970 A1 | 10/2012 |
| WO | 2012158950 A1 | 11/2012 |
| WO | 2012172295 A1 | 12/2012 |
| WO | 2013027004 A1 | 2/2013 |
| WO | 2013027006 A1 | 2/2013 |
| WO | 2013033274 A1 | 3/2013 |
| WO | 2013034879 A1 | 3/2013 |
| WO | 2013049012 A1 | 4/2013 |
| WO | 2013054972 A1 | 4/2013 |
| WO | 2013102759 A2 | 7/2013 |
| WO | 2013163347 A1 | 10/2013 |
| WO | 2013167864 A1 | 11/2013 |
| WO | 2013190257 A1 | 12/2013 |
| WO | 2014064427 A1 | 5/2014 |
| WO | 2014080155 A1 | 5/2014 |
| WO | 2014085734 A1 | 6/2014 |
| WO | 2014090379 A1 | 6/2014 |
| WO | 2014091200 A1 | 6/2014 |
| WO | 2014093601 A1 | 6/2014 |
| WO | 2014100182 A1 | 6/2014 |
| WO | 2014113506 A1 | 7/2014 |
| WO | 2014116615 A1 | 7/2014 |
| WO | 2014130383 A1 | 8/2014 |
| WO | 2014144526 A2 | 9/2014 |
| WO | 2014159621 A1 | 10/2014 |
| WO | 2014164901 A1 | 10/2014 |
| WO | 2014176695 A1 | 11/2014 |
| WO | 2014179632 A1 | 11/2014 |
| WO | 2014188149 A1 | 11/2014 |
| WO | 2014209733 A1 | 12/2014 |
| WO | 2014209819 A1 | 12/2014 |
| WO | 2014209820 A1 | 12/2014 |
| WO | 2014209821 A1 | 12/2014 |
| WO | 2014210349 A1 | 12/2014 |
| WO | 2015006784 A2 | 1/2015 |
| WO | 2015015138 A1 | 2/2015 |
| WO | 2015017291 A1 | 2/2015 |
| WO | 2015069553 A1 | 5/2015 |
| WO | 2015081313 A2 | 6/2015 |
| WO | 2015117039 A1 | 8/2015 |
| WO | 2015145119 A1 | 10/2015 |
| WO | 2016010289 A1 | 1/2016 |
| WO | 2016020630 A2 | 2/2016 |
| WO | 2016020643 A1 | 2/2016 |
| WO | 2016025350 A1 | 2/2016 |
| WO | 2016020630 A3 | 3/2016 |
| WO | 2016042283 A1 | 3/2016 |
| WO | 2016044193 A1 | 3/2016 |
| WO | 2016046514 A1 | 3/2016 |
| WO | 2016048729 A1 | 3/2016 |
| WO | 2016054092 A1 | 4/2016 |
| WO | 2016069606 A1 | 5/2016 |
| WO | 2016087442 A1 | 6/2016 |
| WO | 2016103263 A1 | 6/2016 |
| WO | 2016111706 A1 | 7/2016 |
| WO | 2016111707 A1 | 7/2016 |
| WO | 2016111708 A1 | 7/2016 |
| WO | 2016111709 A1 | 7/2016 |
| WO | 2016113533 A2 | 7/2016 |
| WO | 2016113534 A1 | 7/2016 |
| WO | 2016116733 A1 | 7/2016 |
| WO | 2016118107 A1 | 7/2016 |
| WO | 2016122679 A1 | 8/2016 |
| WO | 2016130509 A1 | 8/2016 |
| WO | 2016135434 A1 | 9/2016 |
| WO | 2016113533 A3 | 10/2016 |
| WO | 2016156776 A1 | 10/2016 |
| WO | 2016162606 A1 | 10/2016 |
| WO | 2016181108 A1 | 11/2016 |
| WO | 2016046514 A8 | 4/2017 |
| WO | 2017060665 A1 | 4/2017 |
| WO | 2017094129 A1 | 6/2017 |
| WO | 2017120320 A1 | 7/2017 |
| WO | 2017134412 A1 | 8/2017 |
| WO | 2017160367 A1 | 9/2017 |
| WO | 2017162999 A1 | 9/2017 |
| WO | 2017176861 A1 | 10/2017 |
| WO | 2017178781 A1 | 10/2017 |
| WO | 2017180403 A1 | 10/2017 |
| WO | 2017182771 A1 | 10/2017 |
| WO | 2017203200 A1 | 11/2017 |
| WO | 2017203201 A1 | 11/2017 |
| WO | 2017207987 A1 | 12/2017 |
| WO | 2018102834 A2 | 6/2018 |
| WO | 2018102834 A3 | 6/2018 |
| WO | 2018096359 A3 | 7/2018 |
| WO | 2018129398 A1 | 7/2018 |
| WO | 2017162999 A8 | 8/2018 |
| WO | 2018150163 A1 | 8/2018 |
| WO | 2018152337 A1 | 8/2018 |
| WO | 2018175546 A1 | 9/2018 |
| WO | 2018206487 A1 | 11/2018 |
| WO | 2019046649 A1 | 3/2019 |
| WO | 2019077307 A1 | 4/2019 |
| WO | 2019079350 A2 | 4/2019 |
| WO | 2019079350 A3 | 4/2019 |
| WO | 2019046649 A8 | 5/2019 |
| WO | 2019122806 A1 | 6/2019 |
| WO | 2019135784 A1 | 7/2019 |
| WO | 2019135796 A1 | 7/2019 |
| WO | 2019135837 A1 | 7/2019 |
| WO | 2019136470 A1 | 7/2019 |
| WO | 2019136471 A1 | 7/2019 |
| WO | 2019136473 A1 | 7/2019 |
| WO | 2019171038 A1 | 9/2019 |
| WO | 2019185973 A1 | 10/2019 |
| WO | 2019185975 A1 | 10/2019 |
| WO | 2019185976 A1 | 10/2019 |
| WO | 2019185977 A1 | 10/2019 |
| WO | 2019217453 A1 | 11/2019 |
| WO | 2020023779 A1 | 1/2020 |

(56) References Cited

FOREIGN PATENT DOCUMENTS

| | | |
|---|---|---|
| WO | 2020123506 A1 | 6/2020 |
| WO | 2020149956 A1 | 7/2020 |
| WO | 2020163524 A1 | 8/2020 |
| WO | 2020168348 A1 | 8/2020 |
| WO | 2020172681 A1 | 8/2020 |
| WO | 2020186113 A1 | 9/2020 |
| WO | 2020212682 A1 | 10/2020 |
| WO | 2020219092 A1 | 10/2020 |
| WO | 2020227236 A1 | 11/2020 |
| WO | 2020247930 A1 | 12/2020 |
| WO | 2021016371 A1 | 1/2021 |
| WO | 2021021926 A1 | 2/2021 |
| WO | 2021032982 A1 | 2/2021 |
| WO | 2021032983 A1 | 2/2021 |
| WO | 2021041949 A1 | 3/2021 |
| WO | 2021044121 A1 | 3/2021 |
| WO | 2021138607 A1 | 7/2021 |
| WO | 2021262759 A1 | 12/2021 |
| WO | 2022109615 A1 | 5/2022 |
| WO | 2022150841 A1 | 7/2022 |

OTHER PUBLICATIONS

International Preliminary Report on Patentability for International Application PCT/US2020/019549, Report issued Aug. 10, 2021, Mailed Sep. 2, 2021, 7 pgs.
International Preliminary Report on Patentability for International Application PCT/US2020/022482, issued Aug. 25, 2021, Mailed Sep. 23, 2021, 7 Pgs.
International Preliminary Report on Patentability for International Application PCT/US2020/031363, issued Nov. 2, 2021, Mailed Nov. 18, 2021, 7 pgs.
International Preliminary Report on Patentability for International Application PCT/US2020/036654, Report issued Dec. 7, 2021, Mailed Dec. 16, 2021, 9 pgs.
International Preliminary Report on Patentability for PCT Application No. PCT/US2013/038070, dated Oct. 28, 2014, 6 pgs.
International Search Report and Written Opinion for International Application No. PCT/GB2010/000835, completed Oct. 26, 2010, mailed Nov. 8, 2010, 12 pgs.
International Search Report and Written Opinion for International Application No. PCT/GB2010/001920, completed Mar. 29, 2011, mailed Apr. 6, 2011, 15 pgs.
International Search Report and Written Opinion for International Application No. PCT/GB2015/000228, Search completed May 4, 2011, Mailed Jul. 15, 2011, 15 Pgs.
International Search Report and Written Opinion for International Application No. PCT/GB2016/000036, completed Jul. 4, 2016, mailed Jul. 13, 2016, 10 pgs.
International Search Report and Written Opinion for International Application No. PCT/GB2016/000065, completed Jul. 14, 2016, mailed Jul. 27, 2016, 10 pgs.
International Search Report and Written Opinion for International Application No. PCT/GB2017/000015, Search completed Apr. 25, 2017, Mailed May 8, 2017, 10 pgs.
International Search Report and Written Opinion for International Application No. PCT/GB2017/000055, Search completed Jul. 19, 2017, Mailed Jul. 26, 2017, 12 pgs.
International Search Report and Written Opinion for International Application No. PCT/IB2008/001909, Search completed Feb. 4, 2009, Mailed Feb. 17, 2009, 6 pgs.
International Search Report and Written Opinion for International Application No. PCT/US2013/038070, completed Aug. 12, 2013, mailed Aug. 14, 2013, 12 pgs.
International Search Report and Written Opinion for International Application No. PCT/US2014/011736, completed Apr. 18, 2014, mailed May 8, 2014, 10 pgs.
International Search Report and Written Opinion for International Application No. PCT/US2018/012227, Search completed Feb. 28, 2018, Mailed Mar. 14, 2018, 8 Pgs.
International Search Report and Written Opinion for International Application No. PCT/US2018/012691, completed Mar. 10, 2018, mailed Mar. 28, 2018, 16 pgs.
International Search Report and Written Opinion for International Application No. PCT/US2018/015553, completed Aug. 6, 2018, Mailed Sep. 19, 2018, 12 pgs.
International Search Report and Written Opinion for International Application No. PCT/US2018/037410, Search completed Aug. 16, 2018, Mailed Aug. 30, 2018, 11 pgs.
International Search Report and Written Opinion for International Application No. PCT/US2018/048636, Search completed Nov. 1, 2018, Mailed Nov. 15, 2018, 16 pgs.
International Search Report and Written Opinion for International Application No. PCT/US2018/048960, Search completed Dec. 14, 2018, Mailed Jan. 8, 2019, 14 pgs.
International Search Report and Written Opinion for International Application No. PCT/US2018/056150, Search completed Dec. 4, 2018, Mailed Dec. 26, 2018, 10 pgs.
International Search Report and Written Opinion for International Application No. PCT/US2018/062835, Search completed Jan. 14, 2019, Mailed Jan. 31, 2019, 14 pgs.
International Search Report and Written Opinion for International Application No. PCT/US2019/012758, completed Mar. 12, 2019, mailed Mar. 27, 2019, 9 pgs.
International Search Report and Written Opinion for International Application No. PCT/US2019/012764, completed Mar. 1, 2019, mailed Mar. 18, 2019, 9 pgs.
International Search Report and Written Opinion for International Application No. PCT/US2019/031163, Search completed Jul. 9, 2019, Mailed Jul. 29, 2019, 11 pgs.
International Search Report and Written Opinion for International Application No. PCT/US2019/043496, Search completed Sep. 28, 2019, Mailed Nov. 14, 2019, 12 pgs.
International Search Report and Written Opinion for International Application No. PCT/US2019/064765, Search completed Feb. 3, 2020, Mailed Mar. 18, 2020, 11 pgs.
International Search Report and Written Opinion for International Application No. PCT/US2019/065478, Search completed Jan. 29, 2020, Mailed Feb. 11, 2020, 14 pgs.
International Search Report and Written Opinion for International Application No. PCT/US2020/018686, Search completed Apr. 25, 2020, Mailed May 22, 2020, 11 pgs.
International Search Report and Written Opinion for International Application No. PCT/US2020/019549, Search completed Apr. 14, 2020, Mailed May 22, 2020, 12 pgs.
International Search Report and Written Opinion for International Application No. PCT/US2020/022482, Search completed May 12, 2020, Mailed Jun. 9, 2020, 11 pgs.
International Search Report and Written Opinion for International Application No. PCT/US2020/031363, completed May 28, 2020, Mailed Jun. 10, 2020, 8 pgs.
International Search Report and Written Opinion for International Application No. PCT/US2020/036654, Search completed Aug. 21, 2020, Mailed Sep. 4, 2020, 14 pgs.
International Search Report and Written Opinion for International Application No. PCT/US2020/043107, Search completed Sep. 28, 2020, Mailed Oct. 15, 2020, 12 pgs.
International Search Report and Written Opinion for International Application No. PCT/US2020/044060, Search completed Oct. 9, 2020, Mailed Nov. 9, 2020, 12 pgs.
International Search Report and Written Opinion for International Application No. PCT/US2020/048590, Search completed Dec. 7, 2020, Mailed Jan. 11, 2021, 19 pgs.
International Search Report and Written Opinion for International Application No. PCT/US2020/067737, Search completed Mar. 3, 2021, Mailed Mar. 5, 2021, 12 pgs.
International Search Report and Written Opinion for International Application No. PCT/US2021/038542, search Completed Sep. 21, 2021, Mailed Oct. 20, 2021 16 pgs.
International Search Report and Written Opinion for International Application No. PCT/US2021/072548, Search completed Jan. 25, 2022, Mailed Feb. 8, 2022, 15 Pgs.

(56) References Cited

OTHER PUBLICATIONS

International Search Report and Written Opinion for International Application No. PCT/US2022/070095, Search completed Mar. 10, 2022, Mailed Mar. 22, 2022, 13 pgs.
International Search Report and Written Opinion for International Application PCT/GB2009/051676, completed May 10, 2010, mailed May 18, 2010, 7 pgs.
International Search Report and Written Opinion for International Application PCT/GB2016/000181, completed Dec. 21, 2016, mailed Feb. 27, 2017, 21 pgs.
International Search Report and Written Opinion for International Application PCT/US2016/017091, completed by the European Patent Office on Apr. 20, 2016, 7 pgs.
International Search Report and Written Opinion for International Application PCT/US2019/012759, completed Mar. 14, 2019, mailed Apr. 15, 2019, 12 pgs.
International Search Report and Written Opinion for International Application PCT/US2019/047097, completed Nov. 22, 2015, mailed Dec. 16, 2019, 10 pgs.
International Search Report and Written Opinion for International Application PCT/US2020/016875, Report Completed Apr. 9, 2020, Mailed Apr. 29, 2020, 11 pgs.
International Search Report for International Application PCT/GB2014/000295, completed Nov. 18, 2014, mailed Jan. 5, 2015, 4 pgs.
International Search Report for International Application PCT/GB2017/000040, mailed Jul. 18, 2017, completed Jul. 10, 2017, 3 pgs.
International Search Report for PCT/GB2010/001982, completed by the European Patent Office on Feb. 24, 2011, 4 pgs.
International Search Report for PCT/GB2011/000349, completed by the European Patent Office on Aug. 17, 2011, 4 pgs.
International Search Report for PCT/GB2012/000331, completed by the European Patent Office on Aug. 29, 2012, 4 pgs.
International Search Report for PCT/GB2012/000677, completed by the European Patent Office on Dec. 10, 2012, 4 pgs.
International Search Report for PCT/GB2013/000005, completed by the European Patent Office on Jul. 16, 2013, 3 pgs.
International Search Report for PCT/GB2013/000210, completed by the European Patent Office on Aug. 12, 2013, 3 pgs.
International Search Report for PCT/GB2013/000273, completed by the European Patent Office on Aug. 30, 2013, 4 pgs.
International Search Report for PCT/GB2014/000197, Completed by the European Patent Office on Jul. 31, 2014, 3 pgs.
International Search Report for PCT/GB2015/000203, completed by the European Patent Office on Oct. 9, 2015, 4 pgs.
International Search Report for PCT/GB2015/000225, completed by the European Patent Office on Nov. 10, 2015, mailed Dec. 2, 2016, 5 pgs.
International Search Report for PCT/GB2015/000274, completed by the European Patent Office on Jan. 7, 2016, 4 pgs.
International Search Report for PCT/GB2016/000003, Completed by the European Patent Office May 31, 2016, 6 pgs.
International Search Report for PCT/GB2016/000005, completed by the European Patent Office on May 27, 2016, 4 pgs.
International Search Report for PCT/GB2016/000014, completed by the European Patent Office on Jun. 27, 2016, 4 pgs.
International Search Report for PCT/GB2016/000051, Completed Aug. 11, 2016, 3 Pgs.
Written Opinion for International Application No. PCT/GB2010/001982, search completed Feb. 24, 2011, mailed Mar. 8, 2011, 6 pgs.
Written Opinion for International Application No. PCT/GB2011/000349, completed Aug. 17, 2011, mailed Aug. 25, 2011, 9 pgs.
Written Opinion for International Application No. PCT/GB2012/000331, completed Aug. 29, 2012, mailed Sep. 6, 2012, 7 pgs.
Written Opinion for International Application No. PCT/GB2012/000677, completed Dec. 10, 2012, mailed Dec. 17, 2012, 4 pgs.
Written Opinion for International Application No. PCT/GB2013/000005, search completed Jul. 16, 2013, mailed Jul. 24, 2013, 11 pgs.
Written Opinion for International Application No. PCT/GB2013/000273, completed Aug. 30, 2013, mailed Sep. 9, 2013, 7 pgs.
Written Opinion for International Application No. PCT/GB2014/000197, Search completed Jul. 31, 2014, Mailed Aug. 7, 2014, 6 Pgs.
Written Opinion for International Application No. PCT/GB2014/000295, search completed Nov. 18, 2014, mailed Jan. 5, 2015, 3 pgs.
Written Opinion for International Application No. PCT/GB2015/000203, completed Oct. 29, 2015, mailed Nov. 16, 2015, 7 pgs.
Written Opinion for International Application No. PCT/GB2015/000225, search completed Nov. 10, 2015, mailed Feb. 4, 2016, 7 pgs.
Written Opinion for International Application No. PCT/GB2015/000274, search completed Jan. 7, 2016, mailed Jan. 19, 2016, 7 pgs.
Written Opinion for International Application No. PCT/GB2016/000014, search completed Jun. 27, 2016, mailed Jul. 7, 2016, 6 pgs.
Written Opinion for International Application No. PCT/GB2016/000051, Search completed Aug. 11, 2016, Mailed Aug. 22, 2016, 6 Pgs.
Written Opinion for International Application No. PCT/GB2017/000040, search completed Jul. 10, 2017, mailed Jul. 18, 2017, 6 pgs.
Written Opinion for International Application PCT/GB2013/000210, completed Aug. 12, 2013, Mailed Aug. 20, 2013, 5 pgs.
Written Opinion for International Application PCT/GB2016/000003, completed May 31, 2016, mailed Aug. 12, 2016, 10 pgs.
Written Opinion for International Application PCT/GB2016/000005, search completed May 27, 2016, mailed Jun. 6, 2016, 6 pgs.
"Compact linear Fresnel reflector", Wikipedia, Sep. 16, 2019, https://en.wikipedia.org/wiki/Compact_linear_Fresnel_reflector.
Digi Lens: Waveguides, announced unknown, [online], [site visited Nov. 6, 2020]. Available from Internet, <URL: https://www.digilens.com/technology/waveguides/> (Year: 2020).
Google search: "digilens waveguide" [site visited Sep. 14, 2020], https://www.google.com/search?q=digilens+waveguide&sxsrf=ALeKk02RFwZAZOvrlxVHOM_2fiXFkhW1 FA: 1604777621684&source=lnms&tbm=isch&sa=X&ved=2ah UKEwjjyNXAlvHsAh U Rh HI EHTufCvsQ_AUoAnoECBwQBA&biw=1200&bih=1777.
,.
Google search: "eyewear display devices" [site visited Sep. 14, 2020], https://www.google.com/search?q=eyewear+display+devices&sxsrf=ALeKk01 WWfnOAgsQR_bhydJaYK3e37r J Lg: 1604779001617&source=lnms&tbm=isch&sa=X&ved=2ah U KEwi99txSm_HsAhVaoH IEHawtD8QQ_AUoAnoECC8QBA&biw= 1200&bih= 1777.,.
Google search: "smart glasses" [site visited Sep. 14, 2020], https://www.google.com/search?q=smart+glasses&sxsrf=ALeKk01 KN 1wj23-NqP-KCnrcsUpCgxyKA: 1604779046920&source=lnms&tbm=isch&sa=X&ved=2ah U KEwipkqPom_HsAhVKhXI EHQGFBp8Q_AUoBHoECCgQBg&biw= 1200&bih= 1777.,.
"Agilent ADNS-2051 Optical Mouse Sensor: Data Sheet", Agilent Technologies, Jan. 9, 2002, 40 pgs.
"Application Note—MOXTEK ProFlux Polarizer use with LCOS displays", CRL Opto Limited, http://www.crlopto.com, 2003, 6 pgs.
"Application Note AN16: Optical Considerations for Bridgelux LED Arrays", BridgeLux, Jul. 31, 2010, 23 pgs.
"Application Note: Variable Attenuator for Lasers", Technology and Applications Center, Newport Corporation, www.newport.com, 2006, DS-08067, 6 pgs.
"Bae Systems to Unveil Q-Sight Family of Helmet-Mounted Display at AUSA Symposium", Released on Tuesday, Oct. 9, 2007, 1 pg.
"Beam Steering Using Liquid Crystals", Boulder Nonlinear Systems, Inc., info@bnonlinear.com, May 8, 2001, 4 pgs.
"BragGrate—Deflector: Transmitting vol. Bragg Grating for angular selection and magnification", 2015, www.OptiGrate.com.
"Cree XLamp XP-E LEDs", Cree, Inc., Retrieved from www.cree.com/Xlamp, CLD-DS18 Rev 17, 2013, 17 pgs.
"Desmodur N 3900", Bayer MaterialScience AG, Mar. 18, 2013, www.bayercoatings.com, 4 pgs.

(56) References Cited

OTHER PUBLICATIONS

"Digilens—Innovative Augmented Reality Display and Sensor Solutions for OEMs", Jun. 6, 2017, 31 pgs.
"Exotic Optical Components", Building Electro-Optical Systems, Making It All Work, Chapter 7, John Wiley & Sons, Inc., pp. 233-261.
Lu et al., "Polarization switch using thick holographic polymer-dispersed liquid crystal grating", Journal of Applied Physics, vol. 95, No. 3, Feb. 1, 2004, pp. 810-815.
Lu et al., "The Mechanism of electric-field-induced segregation of additives in a liquid-crystal host", Phys Rev E Stat Nonlin Soft Matter Phys., Nov. 27, 2012, 14 pgs.
Ma et al., "Holographic Reversed-Mode Polymer-Stabilized Liquid Crystal Grating", Chinese Phys. Lett., 2005, vol. 22, No. 1, pp. 103-106.
Mach et al., "Switchable Bragg diffraction from liquid crystal in colloid-templated structures", Europhysics Letters, Jun. 1, 2002, vol. 58, No. 5, pp. 679-685.
Magarinos et al., "Wide Angle Color Holographic infinity optics display", Air Force Systems Command, Brooks Air Force Base, Texas, AFHRL-TR-80-53, Mar. 1981, 100 pgs.
Marino et al., "Dynamical Behaviour of Policryps Gratings", Electronic-Liquid Crystal Communications, Feb. 5, 2004, 10 pgs.
Massenot et al., "Multiplexed holographic transmission gratings recorded in holographic polymer-dispersed liquid crystals: static and dynamic studies", Applied Optics, 2005, vol. 44, Issue 25, pp. 5273-5280.
Matay et al., "Planarization of Microelectronic Structures by Using Polyimides", Journal of Electrical Engineering, 2002, vol. 53, No. 3-4, pp. 86-90.
Mathews, "The LED FAQ Pages", Jan. 31, 2002, 23 pgs.
Matic, "Blazed phase liquid crystal beam steering", Proc. of the SPIE, 1994, vol. 2120, pp. 194-205.
Matsushima et al., "Thiol-Isocyanate-Acrylate Ternary Networks by Selective Thiol-Click Chemistry", Journal of Polymer Science: Part A: Polymer Chemistry, Apr. 16, 2010, vol. 48, 3255-3264, doi: 10.1002/pola.24102.
McLeod, "Axicons and Their Uses", Journal of the Optical Society of America, Feb. 1960, vol. 50, No. 2, pp. 166-169.
McManamon et al., "A Review of Phased Array Steering for Narrow-Band Electrooptical Systems", Proceedings of the IEEE, Jun. 2009, vol. 97, No. 6, pp. 1078-1096.
McManamon et al., "Optical Phased Array Technology", Proceedings of the IEEE, Feb. 1996, vol. 84, Issue 2, pp. 268-298.
Miller, "Coupled Wave Theory and Waveguide Applications", The Bell System Technical Journal, Short Hills, NJ, Feb. 2, 1954, 166 pgs.
Missinne et al., "Flexible thin polymer waveguide Bragg grating sensor foils for strain sensing", Proc. SPIE, 10101, Organic Photonic Materials and Devices, Feb. 16, 2017, https://doi.org/10.1117/12.2250823.
Moffitt, "Head-Mounted Display Image Configurations", retrieved from the internet on Dec. 19, 2014, dated May 2008, 25 pgs.
Moharam et al., "Diffraction characteristics of photoresist surface-relief gratings", Applied Optics, Sep. 15, 1984, vol. 23, pp. 3214-3220.
Mulik, "Adhesion Enhancement of Polymeric Films on Glass Surfaces by a Silane Derivative of Azobisisobutyronitrile (AIBN).", Polymer Preprints, American Chemical Society (ACS), Jan. 2008, 3 pgs.
Nair et al., "Enhanced Two-Stage Reactive Polymer Network Forming Systems", Polymer (Guildf). May 25, 2012, vol. 53, No. 12, pp. 2429-2434, doi: 10.1016/j.polymer.2012.04.007.
Nair et al., "Two-Stage Reactive Polymer Network Forming Systems", Advanced Functional Materials, 2012, pp. 1-9, DOI: 10.1002/adfm.201102742.
Naqvi et al., "Concentration-dependent toxicity of iron oxide nanoparticles mediated by increased oxidative stress", International Journal of Nanomedicine, Dovepress, Nov. 13, 2010, vol. 5, pp. 983-989.
Natarajan et al., "Electro Optical Switching Characteristics of vol. Holograms in Polymer Dispersed Liquid Crystals", Journal of Nonlinear Optical Physics and Materials, 1997, vol. 5, No. 1, pp. 666-668.
Natarajan et al., "Electro-Optical Switching Characteristics of vol. Holograms in Polymer Dispersed Liquid Crystals", Journal of Nonlinear Optical Physics and Materials, Jan. 1996, vol. 5, No. 1, pp. 89-98.
Natarajan et al., "Holographic polymer dispersed liquid crystal reflection gratings formed by visible light initiated thiol-ene photopolymerization", Polymer, vol. 47, May 8, 2006, pp. 4411-4420.
Naydenova et al., "Low-scattering Volume Holographic Material", DIT PhD Project, http://www.dit.ie/ieo/, Oct. 2017, 2 pgs.
Neipp et al., "Non-local polymerization driven diffusion based model: general dependence of the polymerization rate to the exposure intensity", Optics Express, Aug. 11, 2003, vol. 11, No. 16, pp. 1876-1886.
Nielsen et al., "Grating Couplers for Fiber-to-Fiber Characterizations of Stand-Alone Dielectric Loaded Surface Plasmon Waveguide Components", Journal of Lightwave Technology, Oct. 1, 2012, vol. 30, No. 19, pp. 3118-3125, DOI: 10.1109/JLT.2012.2212418.
Nishikawa et al., "Mechanically and Light Induced Anchoring of Liquid Crystal on Polyimide Film", Mol. Cryst. Liq. Cryst., Aug. 1999, vol. 329, 8 pgs.
Nishikawa et al., "Mechanism of Unidirectional Liquid-Crystal Alignment on Polyimides with Linearly Polarized Ultraviolet Light Exposure", Applied Physics Letters, May 11, 1998, vol. 72, No. 19, 4 pgs.
Nordin et al., "Diffraction Properties of Stratified vol. Holographic Optical Elements", Journal of the Optical Society of America A. Dec. 1992, vol. 9, No. 12, , pp. 2206-2217.
Ogiwara et al., "Temperature Dependence of Anisotropic Diffraction in Holographic Polymer-Dispersed Liquid Crystal Memory", Applied Optics, Sep. 10, 2013, vol. 52, No. 26, pp. 6529-6536.
Ogiwara et al., "Thermo-Driven Light Controller by Using Thermal Modulation of Diffraction Wavelength in Holographic Polymer Dispersed Liquid Crystal Grating", Proc. SPIE, Feb. 19, 2014, 9004, Article 90040Q, 8 pgs., doi: 10.1117/12.2039104.
Oh et al., "Achromatic diffraction from polarization gratings with high efficiency", Optic Letters, Oct. 15, 2008, vol. 33, No. 20, pp. 2287-2289.
Olson et al., "Templating Nanoporous Polymers with Ordered Block Copolymers", Chemistry of Materials, Web publication Nov. 27, 2007, vol. 20, pp. 869-890.
Ondax, Inc., "vol. Holographic Gratings (VHG)", 2005, 7 pgs.
Orcutt, "Coming Soon: Smart Glasses That Look Like Regular Spectacles", Intelligent Machines, Jan. 9, 2014, 4 pgs.
Osredkar, "A study of the limits of spin-on-glass planarization process", Informacije MIDEM, 2001, vol. 31, 2, ISSN0352-9045, pp. 102-105.
Osredkar et al., "Planarization methods in IC fabrication technologies", Informacije MIDEM, 2002, vol. 32, 3, ISSN0352-9045, 5 pgs.
Ou et al., "A Simple LCOS Optical System (Late News)", Industrial Technology Research Institute/OES Lab. Q100/Q200, SID 2002, Boston, USA, 2 pgs.
Paolini et al., "High-Power LED Illuminators in Projection Displays", Lumileds, Aug. 7, 2001, 19 pgs.
Park et al., "Aligned Single-Wall Carbon Nanotube Polymer Composites Using an Electric Field", Journal of Polymer Science: Part B: Polymer Physics, Mar. 24, 2006, DOI 10.1002/polb.20823, pp. 1751-1762.
Park et al., "Fabrication of Reflective Holographic Gratings with Polyurethane Acrylates (PUA)", Current Applied Physics, Jun. 2002, vol. 2, pp. 249-252.
Peng et al., "Facile Image Patterning via Sequential Thiol-Michael/Thiol-Yne Click Reactions", Chemistry of Materials, Nov. 20, 2014, vol. 26, pp. 6819-6826, doi: 10.1021/cm5034436.

(56) References Cited

OTHER PUBLICATIONS

Peng et al., "High Performance Graded Rainbow Holograms via Two-Stage Sequential Orthogonal Thiol-Click Chemistry", Macromolecules, Mar. 28, 2014, vol. 47, pp. 2306-2315, doi: 10.1021/ma500167x.
Peng et al., "Low Voltage Driven and Highly Diffractive Holographic Polymer Dispersed Liquid Crystals with Spherical Morphology", RSC Advances, 2017, vol. 7, pp. 51847-51857, doi: 10.1039/c7ra08949.
Pierantoni et al., "Efficient modeling of 3-D photonic crystals for integrated optical devices", IEEE Photonics Technology Letters, Feb. 2006, vol. 18, No. 2, pp. 319-321, DOI: 10.1109/LPT.2005.861991.
Plawsky et al., "Engineered nanoporous and nanostructured films", Materials Today, Jun. 2009, vol. 12, No. 6, pp. 36-45.
Pogue et al., "Electrically Switchable Bragg Gratings from Liquid Crystal/Polymer Composites", Applied Spectroscopy, 2000, vol. 54, Issue 1, pp. 12A-28A.
Potenza, "These smart glasses automatically focus on what you're looking at", The Verge, Voc Media, Inc., Jan. 29, 2017, https://www.theverge.com/2017/1/29/14403924/smart-glasses-automatic-focus-presbyopia-ces-2017, 6 pgs.
Presnyakov et al., "Electrically tunable polymer stabilized liquid-crystal lens", Journal of Applied Physics, Apr. 29, 2005, vol. 97, pp. 103101-1-103101-6.
Prokop et al., "Air-Suspended SU-8 Polymer Waveguide Grating Couplers", Journal of Lightwave Technology, Sep. 1, 2016, vol. 34, No. 17, pp. 3966-3971, DOI: 10.1109/JLT.2016.2593025.
Qi et al., "P-111: Reflective Display Based on Total Internal Reflection and Grating-Grating Coupling", Society for Information Display Digest, May 2003, pp. 648-651, DOI: 10.1889/1.1832359.
Ramón, "Formation of 3D micro-and nanostructures using liquid crystals as a template", Technische Universiteit Eindhoven, Apr. 17, 2008, Thesis, 117 pgs., DOI:http://dx.doi.org/10.6100/IR634422.
Ramsey, "Holographic Patterning of Polymer Dispersed Liquid Crystal Materials for Diffractive Optical Elements", Thesis, The University of Texas at Arlington, Dec. 2006, 166 pgs.
Ramsey et al., "Holographically recorded reverse-mode transmission gratings in polymer-dispersed liquid crystal cells", Applied Physics B: Laser and Optics, Sep. 10, 2008, vol. 93, Nos. 2-3, pp. 481-489.
Reid, "Thin film silica nanocomposites for anti-reflection coatings", Oxford Advance Surfaces, www.oxfordsurfaces.com, Oct. 18, 2012, 23 pgs.
Riechert, "Speckle Reduction in Projection Systems", Dissertation, University Karlsruhe, 2009, 178 pgs.
Rossi et al., "Diffractive Optical Elements for Passive Infrared Detectors" Submitted to OSA Topical Meeting "Diffractive Optics and Micro-Optics", Quebec, Jun. 18-22, 2000, 3 pgs.
Roussel et al., "Photopolymerization Kinetics and Phase Behavior of Acrylate Based Polymers Dispersed Liquid Crystals", Liquid Crystals, 1998, vol. 24, Issue 4, pp. 555-561.
Saarikko, Extract of US 2010/0296163 ,Figure 2 as marked up by Examiner in Final Office Action for U.S. Appl. No. 14/044,676 dated Oct. 20, 2015, 1 page.
Sabel et al., "Simultaneous formation of holographic surface relief gratings and vol. phase gratings in photosensitive polymer", Materials Research Letters, May 30, 2019, vol. 7, No. 10, pp. 405-411, doi: 10.1080/21663831.2019.1621956.
Sagan et al., "Electrically Switchable Bragg Grating Technology for Projection Displays", Proc. SPIE. vol. 4294, Jan. 24, 2001, pp. 75-83.
Sakhno et al., "Deep surface relief grating in azobenzene-containing materials using a low-intensity 532 nm laser", Optical Materials: X, Jan. 23, 2019, 100006, pp. 3-7, doi: 10.1016/j.omx.2019.100006.
Saleh et al., "Fourier Optics: 4.1 Propagation of light in free space, 4.2 Optical Fourier Transform, 4.3 Diffraction of Light, 4.4 Image Formation, 4.5 Holography", Fundamentals of Photonics 1991, Chapter 4, pp. 108-143.
Saraswat, "Deposition & Planarization", EE 311 Notes, Aug. 29, 2017, 28 pgs.
Schreiber et al., "Laser display with single-mirror MEMS scanner", Journal of the SID 17/7, 2009, pp. 591-595.
Seiberle et al., "Photo-aligned anisotropic optical thin films", Journal of the SID 12/1, 2004, 6 pgs.
Serebriakov et al., "Correction of the phase retardation caused by intrinsic birefringence in deep UV lithography", Proc. of SPIE, May 21, 2010, vol. 5754, pp. 1780-1791.
Shechter et al., "Compact beam expander with linear gratings", Applied Optics, vol. 41, No. 7, Mar. 1, 2002, pp. 1236-1240.
Shi et al., "Design considerations for high efficiency liquid crystal decentered microlens arrays for steering light", Applied Optics, vol. 49, No. 3, Jan. 20, 2010, pp. 409-421.
Shriyan et al., "Analysis of effects of oxidized multiwalled carbon nanotubes on electro-optic polymer/liquid crystal thin film gratings", Optics Express, Nov. 12, 2010, vol. 18, No. 24, pp. 24842-24852.
Simonite, "How Magic Leap's Augmented Reality Works", Intelligent Machines, Oct. 23, 2014, 7 pgs.
Smith et al., "RM-PLUS—Overview", Licrivue, Nov. 5, 2013, 16 pgs.
Sony Global, "Sony Releases the Transparent Lens Eyewear 'SmartEyeglass Developer Edition'", printed Oct. 19, 2017, Sony Global—News Releases, 5 pgs.
Steranka et al., "High-Power LEDs—Technology Status and Market Applications", Lumileds, Jul. 2002, 23 pgs.
Stumpe et al., "Active and Passive LC Based Polarization Elements", Mol. Cryst. Liq. Cryst., 2014, vol. 594: pp. 140-149.
Stumpe et al., "New type of polymer-LC electrically switchable diffractive devices—POLIPHEM", May 19, 2015, p. 97.
Subbarayappa et al., "Bistable Nematic Liquid Crystal Device", Jul. 30, 2009, 14 pgs.
Sun et al., "Effects of multiwalled carbon nanotube on holographic polymer dispersed liquid crystal", Polymers Advanced Technologies, Feb. 19, 2010, DOI: 10.1002/pat. 1708, 8 pgs.
Sun et al., "Low-birefringence lens design for polarization sensitive optical systems", Proceedings of SPIE, 2006, vol. 6289, pp. 6289DH-1 6289DH-10, doi: 10.1117/12.679416.
Sun et al., "Transflective multiplexing of holographic polymer dispersed liquid crystal using Si additives", eXPRESS Polymer Letters, 2011, vol. 5, No. 1, pp. 73-81.
Sutherland et al., "Bragg Gratings in an Acrylate Polymer Consisting of Periodic Polymer-Dispersed Liquid-Crystal Planes", Chem. Mater., 1993, vol. 5, pp. 1533-1538.
Sutherland et al., "Electrically switchable volume gratings in polymer-dispersed liquid crystals", Applied Physics Letters, Feb. 28, 1994, vol. 64, No. 9, pp. 1074-1076.
Sutherland et al., "Enhancing the electro-optical properties of liquid crystal nanodroplets for switchable Bragg gratings", Proc. of SPIE, 2008, vol. 7050, pp. 705003-1-705003-9, doi: 10.1117/12.792629.
Sutherland et al., "Liquid crystal bragg gratings: dynamic optical elements for spatial light modulators", Hardened Materials Branch, Hardened Materials Branch, AFRL-ML-WP-TP-2007-514, Jan. 2007, Wright-Patterson Air Force Base, OH, 18 pgs.
Sutherland et al., "Phenomenological model of anisotropic vol. hologram formation in liquid-crystal-photopolymer mixtures", Journal of Applied Physics, Jun. 30, 2004, vol. 96, No. 2, pp. 951-965, https://doi.org/10.1063/1.1762713.
Sutherland et al., "The physics of photopolymer liquid crystal composite holographic gratings", presented at SPIE: Diffractive and Holographic Optics Technology San Jose, CA, 1996, SPIE, vol. 2689, pp. 158-169.
Sweatt, "Achromatic triplet using holographic optical elements", Applied Optics, May 1977, vol. 16, No. 5, pp. 1390-1391.
Tahata et al., "Effects of Polymer Matrix on Electro-Optic Properties of Liquid Crystal Mixed With Polymer", Proc SPIE, Mar. 11, 1996, vol. 2651, pp. 101-106, doi: 10.1117/12.235342.
Talukdar, "Technology Forecast: Augmented reality", Changing the economics of Smartglasses, Issue 2, 2016, 5 pgs.
Tao et al., "TiO2 nanocomposites with high refractive index and transparency", J. Mater. Chem., Oct. 4, 2011, vol. 21, pp. 18623-18629.

(56) References Cited

OTHER PUBLICATIONS

Titus et al., "Efficient, Accurate Liquid Crystal Digital Light Deflector", Proc. SPIE 3633, Diffractive and Holographic Technologies, Systems, and Spatial Light Modulators VI, 1 Jun. 1, 1999, doi: 10.1117/12.349334, 10 pgs.
Tiziani, "Physical Properties of Speckles", Speckle Metrology, Chapter 2, Academic Press, Inc., 1978, pp. 5-9.
Tominaga et al., "Fabrication of holographic polymer dispersed liquid crystals doped with gold nanoparticles", 2010 Japanese Liquid Crystal Society Annual Meeting, 2 pgs.
Tomita, "Holographic assembly of nanoparticles in photopolymers for photonic applications", The International Society for Optical Engineering, SPIE Newsroom, 2006, 3 pgs., doi: 10.1117/2.1200612.0475.
Tondiglia et al., "Holographic Formation of Electro-Optical Polymer-Liquid Crystal Photonic Crystals", Advanced Materials, 2002, Published Online Nov. 8, 2001, vol. 14, No. 3, pp. 187-191.
Trisnadi, "Hadamard Speckle Contrast Reduction", Optics Letters, Jan. 1, 2004, vol. 29, No. 1, pp. 11-13.
Ducharme, "Microlens diffusers for efficient laser speckle generation", Optics Express, Oct. 29, 2007, vol. 15, No. 22, pp. 14573-14579.
Duong et al., "Centrifugal Deposition of Iron Oxide Magnetic Nanorods for Hyperthermia Application", Journal of Thermal Engineering, Yildiz Technical University Press, Istanbul, Turkey, Apr. 2015, vol. 1, No. 2, pp. 99-103.
Escuti et al., "Holographic photonic crystals", Society of Photo-Optical Instrumentation Engineers, Sep. 2004, vol. 43, No. 9, pp. 1973-1987, DOI: 10.1117/1.1773773.
Fattal et al., "A multi directional backlight for a wide-angle glasses-free three-dimensional display", Nature, Mar. 21, 2012, vol. 495, pp. 348-351.
Flory, "Molecular size distribution in three-dimensional polymers. I. Gelation", J. Am. Chem. Soc., Nov. 1941, vol. 63, pp. 3083-3090.
Fontecchio et al., "Spatially Pixelated Reflective Arrays from Holographic Polymer Dispersed Liquid Crystals", SID 00 Digest, May 2000, pp. 774-776.
Forman et al., "Materials development for PhotoINhibited Super-Resolution (PINSR) lithography", Proc. of SPIE, 2012, vol. 8249, pp. 824904-1-824904-9, doi: 10.1117/12.908512.
Forman et al., "Radical diffusion limits to photoinhibited super-resolution lithography", Phys. Chem. Chem. Phys., May 31, 2013, vol. 15, pp. 14862-14867, DOI: 10.1039/c3cp51512.
Friedrich-Schiller, "Spatial Noise and Speckle", Version 1.12.2011, Dec. 2011, Abbe School of Photonics, Jena, Germany, 27 pgs.
Fries et al., "Real-time beam shaping without additional optical elements", Light Science & Applications, Jun. 20, 2018, vol. 7, No. 18, doi: 10.1038/s41377-018-0014-0.
Fuh et al., "Thermally and Electrically Switchable Gratings Based Upon the Polymer-Balls Type Polymer-Dispersed Liquid Crystal Films", Appl. Phys. Vol. 41, No. 22, Aug. 1, 2002, pp. 4585-4589.
Fujii et al., "Nanoparticle-polymer-composite volume gratings incorporating chain-transfer agents for holography and slow-neutron optics", Optics Letters, Apr. 25, 2014, vol. 39, Issue 12, 5 pgs.
Funayama et al., "Proposal of a new type thin film light-waveguide display device using", The International Conference on Electrical Engineering, 2008, No. P-044, 5 pgs.
Gabor, "Laser Speckle and its Elimination", BM Research and Development, Eliminating Speckle Noise, Sep. 1970, vol. 14, No. 5, pp. 509-514.
Gardiner et al., "Bistable liquid-crystals reduce power consumption for high-efficiency smart glazing", SPIE, 2009, 10.1117/2.1200904.1596, 2 pgs.
Gerritsen et al., "Application of Kogelnik's two-wave theory to deep, slanted, highly efficient, relief transmission gratings", Applied Optics, Mar. 1, 1991, vol. 30; No. 7, pp. 807-814.
Giancola, "Holographic Diffuser, Makes Light Work of Screen Tests", Photonics Spectra, 1996, vol. 30, No. 8, pp. 121-122.
Golub et al., "Bragg properties of efficient surface relief gratings in the resonance domain", Optics Communications, Feb. 24, 2004, vol. 235, pp. 261-267, doi: 10.1016/j.optcom.2004.02.069.
Goodman, "Introduction to Fourier Optics", Second Edition, Jan. 1996, 457 pgs.
Goodman, "Some fundamental properties of speckle", J. Opt. Soc. Am., Nov. 1976, vol. 66, No. 11, pp. 1145-1150.
Goodman, "Statistical Properties of Laser Speckle Patterns", Applied Physics, 1975, vol. 9, Chapter 2, Laser Speckle and Related Phenomena, pp. 9-75.
Goodman et al., "Speckle Reduction by a Moving Diffuser in Laser Projection Displays", The Optical Society of America, 2000, 15 pgs.
Guldin et al., "Self-Cleaning Antireflective Optical Coatings", Nano Letters, Oct. 14, 2013, vol. 13, pp. 5329-5335.
Guo et al., "Analysis of the effects of viscosity, volume and temperature in photopolymer material for holographic applications", Proc. SPIE, May 2013, vol. 8776, pp. 87760J-1-87760-J15, DOI: 10.1117/12.2018330.
Guo et al., "Review Article: A Review of the Optimisation of Photopolymer Materials for Holographic Data Storage", Physics Research International, vol. 2012, Article ID 803439, Academic Editor: Sergi Gallego, 16 pages, http://dx.doi.org/10.1155/2012/803439, May 4, 2012.
Han et al., "Study of Holographic Waveguide Display System", Advanced Photonics for Communications, 2014, 4 pgs.
Harbers et al., "I-15.3: LED Backlighting for LCD-HDTV", Journal of the Society for Information Display, 2002, vol. 10, No. 4, pp. 347-350.
Harbers et al., "Performance of High Power LED Illuminators in Color Sequential Projection Displays", Lumileds Lighting, 2007, 4 pgs.
Harbers et al., "Performance of High Power LED Illuminators in Color Sequential Projection Displays", Lumileds, Aug. 7, 2001, 11 pgs.
Harbers et al., "Performance of High-Power LED illuminators in Projection Displays", Proc. Int. Disp. Workshops, Japan. Vol. 10, 2003, pp. 1585-1588.
Harding et al., "Reactive Liquid Crystal Materials for Optically Anisotropic Patterned Retarders", Merck, licrivue, 2008, ME-GR-RH-08-010, 20 pgs.
Harding et al., "Reactive Liquid Crystal Materials for Optically Anisotropic Patterned Retarders", SPIE Lithography Asia—Taiwan, 2008, Proceedings vol. 7140, Lithography Asia 2008; 71402J, doi: 10.1117/12.805378.
Hariharan, "Optical Holography: Principles, techniques and applications", Cambridge University Press, 1996, pp. 231-233.
Harris, "Photonic Devices", EE 216 Principals and Models of Semiconductor Devices, Autumn 2002, 20 pgs.
Harrold et al., "3D Display Systems Hardware Research at Sharp Laboratories of Europe: an update", Sharp Laboratories of Europe, Ltd., received May 21, 1999, 7 pgs.
Harthong et al., "Speckle phase averaging in high-resolution color holography", J. Opt. Soc. Am. A, vol. 14, No. 2, Feb. 1997, pp. 405-409.
Hasan et al., "Tunable-focus lens for adaptive eyeglasses", Optics Express, Jan. 23, 2017, vol. 25, No. 2, 1221, 13 pgs.
Hasman et al., "Diffractive Optics: Design, Realization, and Applications", Fiber and Integrated Optics, vol. 16, 1997, pp. 1-25.
Hata et al., "Holographic nanoparticle-polymer composites based on step-growth thiol-ene photopolymerization", Optical Materials Express, vol. 1, No. 2, Jun. 1, 2011, pp. 207-222.
He et al., "Dynamics of peristrophic multiplexing in holographic polymer-dispersed liquid crystal", Liquid Crystals, Mar. 26, 2014, vol. 41, No. 5, pp. 673-684.
He et al., "Holographic 3D display based on polymer-dispersed liquid-crystal thin films", Proceedings of China Display/Asia Display 2011, pp. 158-160.
He et al., "Properties of vol. Holograms Recording in Photopolymer Films with Various Pulse Exposures Repetition Frequencies", Proceedings of SPIE vol. 5636, Bellingham, WA, 2005, pp. 842-848, doi: 10.1117/12.580978.
He et al., "Transmission Holographic Gratings Using Siloxane Containing Liquid Crystalline Compounds, Importance of Chemi-

(56) References Cited

OTHER PUBLICATIONS cal Structure of Polymer Matrix Components", Polymer Journal, Jun. 9, 2006, vol. 38, No. 7, pp. 678-685.
Herman et al., "Production and Uses of Diffractionless Beams", J. Opt. Soc. Am. A., Jun. 1991, vol. 8, No. 6, pp. 932-942.
Hisano, "Alignment layer-free molecular ordering induced by masked photopolymerization with nonpolarized light", Appl. Phys. Express 9, Jun. 6, 2016, p. 072601-1 -072601-4.
Hoepfner et al., "LED Front Projection Goes Mainstream", Luminus Devices, Inc., Projection Summit, 2008, 18 pgs.
Holmes et al., "Controlling the Anisotropy of Holographic Polymer-Dispersed Liquid-Crystal Gratings", Physical Review E, Jun. 11, 2002, vol. 65, p. 066603-1 -066603-4.
Hoyle et al., "Advances in the Polymerization of Thiol-Ene Formulations", Heraeus Noblelight Fusion UV Inc., 2003 Conference, 6 pgs.
Hua, "Sunglass-like displays become a reality with free-form optical technology", Illumination & Displays 3D Visualization and Imaging Systems Laboratory (3DVIS) College of Optical Sciences University of Arizona Tucson, AZ. 2014, 3 pgs.
Huang et al., "Diffraction properties of substrate guided-wave holograms", Optical Engineering, Oct. 1995, vol. 34, No. 10, pp. 2891-2899.
Huang et al., "Theory and characteristics of holographic polymer dispersed liquid crystal transmission grating with scaffolding morphology", Applied Optics, Jun. 20, 2012, vol. 51, No. 18, pp. 4013-4020.
Iannacchione et al., "Deuterium NMR and morphology study of copolymer-dispersed liquid-crystal Bragg gratings", Europhysics Letters, 1996, vol. 36, No. 6, pp. 425-430.
Irie, "Photochromic diarylethenes for photonic devices", Pure and Applied Chemistry, 1996, pp. 1367-1371, vol. 68, No. 7, IUPAC.
Jang et al., "Low Driving Voltage Holographic Polymer Dispersed Liquid Crystals with Chemically Incorporated Graphene Oxide", Journal of Materials Chemistry, 2011, vol. 21, pp. 19226-19232, doi. 10.1039/1jm13827h.
Jeng et al., "Aligning liquid crystal molecules", SPIE, 2012, 10.1117/2.1201203.004148, 2 pgs.
Jeong et al., "Memory Effect of Polymer Dispersed Liquid Crystal by Hybridization with Nanoclay", express Polymer Letters, vol. 4, No. 1, 2010, pp. 39-46, DOI: 10.3144/expresspolymlett.2010.7.
Jo et al., "Control of Liquid Crystal Pretilt Angle using Polymerization of Reactive Mesogen", IMID 2009 Digest, P1-25, 2009, pp. 604-606.
Juhl, "Interference Lithography for Optical Devices and Coatings", Dissertation, University of Illinois at Urbana-Champaign, 2010.
Juhl et al., "Holographically Directed Assembly of Polymer Nanocomposites", ACS Nano, Oct. 7, 2010, vol. 4, No. 10, pp. 5953-5961.
Jurbergs et al., "New recording materials for the holographic industry", Proc. of SPIE, 2009 Vol. 7233, pp. 72330K-1-72330L-10, doi: 10.1117/12.809579.
Kahn et al., "Private Line Report on Large Area Display", Kahn International, Jan. 7, 2003, vol. 8, No. 10, 9 pgs.
Kakiuchida et al., "Multiple Bragg Diffractions with Different Wavelengths and Polarizations Composed of Liquid Crystal/Polymer Periodic Phases", ACS Omega, Sep. 22, 2017, pp. 6081-6090, doi: 10.1021/acsomega.7b01149.
Karasawa et al., "Effects of Material Systems on the Polarization Behavior of Holographic Polymer Dispersed Liquid Crystal Gratings", Japanese Journal of Applied Physics, Oct. 1997, vol. 36, No. 10, pp. 6388-6392.
Karp et al., "Planar micro-optic solar concentration using multiple imaging lenses into a common slab waveguide", Proc. of SPIE vol. 7407, 2009 SPIE, pp. 74070D-1-74070D-11, CCC code: 0277-786X/09, doi: 10.1117/12.826531.
Karp et al., "Planar micro-optic solar concentrator", Optics Express, Jan. 18, 2010, vol. 18, No. 2, pp. 1122-1133.
Kato et al., "Alignment-Controlled Holographic Polymer Dispersed Liquid Crystal (HPDLC) for Reflective Display Devices", SPIE, 1998, vol. 3297, pp. 52-57.
Kessler, "Optics of Near to Eye Displays (NEDs)", Oasis 2013, Tel Aviv, Feb. 19, 2013, 37 pgs.
Keuper et al., "26.1: RGB LED Illuminator for Pocket-Sized Projectors", SID 04 Digest, 2004, ISSN/0004-0966X/04/3502, pp. 943-945.
Keuper et al., "P-126: Ultra-Compact LED based Image Projector for Portable Applications", SID 03 Digest, 2003, ISSN/0003-0966X/03/3401-0713, pp. 713-715.
Kim et al., "Effect of Polymer Structure on the Morphology and Electro optic Properties of UV Curable PNLCs", Polymer, Feb. 2000, vol. 41, pp. 1325-1335.
Kim et al., "Enhancement of electro-optical properties in holographic polymer-dispersed liquid crystal films by incorporation of multiwalled carbon nanotubes into a polyurethane acrylate matrix", Polym. Int., Jun. 16, 2010, vol. 59, pp. 1289-1295.
Kim et al., "Fabrication of Reflective Holographic PDLC for Blue", Molecular Crystals and Liquid Crystals Science, 2001, vol. 368, pp. 3845-3853.
Kim et al., "Optimization of Holographic PDLC for Green", Mol. Cryst. Liq. Cryst., vol. 368, 2001, pp. 3855-3864.
Klein, "Optical Efficiency for Different Liquid Crystal Colour Displays", Digital Media Department, HPL-2000-83, Jun. 29, 2000, 18 pgs.
Kogelnik, "Coupled Wave Theory for Thick Hologram Gratings", The Bell System Technical Journal, vol. 48, No. 9, Nov. 1969, pp. 2909-2945.
Konuray et al., "State of the Art in Dual-Curing Acrylate Systems", Polymers, Feb. 12, 2018, vol. 10, No. 178, 24 pgs, doi: 10.3390/polym10020178.
Kotakonda et al., "Electro-optical Switching of the Holographic Polymer-dispersed Liquid Crystal Diffraction Gratings", Journal of Optics A: Pure and Applied Optics, Jan. 1, 2009, vol. 11, No. 2, 11 pgs.
Kress et al., "Diffractive and Holographic Optics as Optical Combiners in Head Mounted Displays", UbiComp '13, Sep. 9-12, 2013, Session: Wearable Systems for Industrial Augmented Reality Applications, pp. 1479-1482.
Kwon et al., "Polymer waveguide notch filter using two stacked thermooptic long-period gratings", IEEE Photonics Technology Letters, Apr. 4, 2005, vol. 17, Issue 4, pp. 792-794, DOI: 10.1109/LPT.2005.844008.
Lauret et al., "Solving the Optics Equation for Effective LED Applications", Gaggione North America, LLFY System Design Workshop 2010, Oct. 28, 2010, 26 pgs.
Lee, "Patents Shows Widespread Augmented Reality Innovation", PatentVue, May 26, 2015, 5 pgs.
Levin et al., "A Closed Form Solution To Natural Image Matting", Illumination & Displays 3D Visualization and Imaging Systems Laboratory (3DVIS) College of Optical Sciences University of Arizona Tucson, 2014, 8 pgs.
Levola, "Diffractive optics for virtual reality displays", Journal of the SID, 2006, 14/5, pp. 467-475.
Levola et al., "Near-to-eye display with diffractive exit pupil expander having chevron design", Journal of the SID, 2008, 16/8, pp. 857-862.
Levola et al., "Replicated slanted gratings with a high refractive index material for in and outcoupling of light", Optics Express, vol. 15, Issue 5, 2007, pp. 2067-2074.
Li et al., "A low cost, label-free biosensor based on a novel double-sided grating waveguide coupler with sub-surface cavities", Sensors and Actuators B: Chemical, Jan. 2015, vol. 206, pp. 371-380, https://doi.org/10.1016/j.snb.2014.09.065.
Li et al., "Design and Optimization of Tapered Light Pipes", Proceedings vol. 5529, Nonimaging Optics and Efficient Illumination Systems, Sep. 29, 2004, doi: 10.1117/12.559844, 10 pgs.
Li et al., "Dual Paraboloid Reflector and Polarization Recycling Systems for Projection Display", Proceedings vol. 5002, Projection Displays IX, Mar. 28, 2003, doi: 10.1117/12.479585, 12 pgs.

(56) References Cited

OTHER PUBLICATIONS

Li et al., "Light Pipe Based Optical Train and its Applications", Proceedings vol. 5524, Novel Optical Systems Design and Optimization VII, Oct. 24, 2004, doi: 10.1117/12.559833, 10 pgs.
Li et al., "Novel Projection Engine with Dual Paraboloid Reflector and Polarization Recovery Systems", Wavien Inc., SPIE EI 5289-38, Jan. 21, 2004, 49 pgs.
Li et al., "Polymer crystallization/melting induced thermal switching in a series of holographically patterned Bragg reflectors", Soft Matter, Jul. 11, 2005, vol. 1, pp. 238-242.
Lin et al., "Ionic Liquids in Photopolymerizable Holographic Materials", in book: Holograms—Recording Materials and Applications, Nov. 9, 2011, 21 pgs.
Liu et al., "Effect of Surfactant on the Electro-Optical Properties of Holographic Polymer Dispersed Liquid Crystal Bragg Gratings", Optical Materials, 2005, vol. 27, pp. 1451-1455, available online Dec. 25, 2004, doi: 10.1016/j.optmat.2004.10.010.
Liu et al., "Holographic Polymer Dispersed Liquid Crystals Materials, Formation and Applications", Advances in OptoElectronics, Nov. 30, 2008, vol. 2008, Article ID 684349, 52 pgs.
Liu et al., "Realization and Optimization of Holographic Waveguide Display System", Acta Optica Sinica, vol. 37, Issue 5, Issuing date—May 10, 2017, pp. 310-317.
Lorek, "Experts Say Mass Adoption of augmented and Virtual Reality is Many Years Away", Siliconhills, Sep. 9, 2017, 4 pgs.
Lougnot et al., "Polymers for holographic recording: VI. Some basic ideas for modelling the kinetics of the recording process", Pure and Applied Optics: Journal of the European Optical Society Part A, 1997, vol. 6, No. 2, pp. 225-245, https://doi.org/10.1088/0963-9659/6/2/007.
Lowenthal et al., "Speckle Removal by a Slowly Moving Diffuser Associated with a Motionless Diffuser", Journal of the Optical Society of America, Jul. 1971, vol. 61, No. 7, pp. 847-851.
"FHS Lenses Series", Fraen Corporation, www.fraen.com, Jun. 16, 2003, 10 pgs.
"FLP Lens Series for Luxeon™ Rebel and Rebel ES LEDs", Fraen Corporation, www.fraensrl.com, Aug. 7, 2015, 8 pgs.
"Head-up Displays, See-through display for military aviation", BAE Systems, 2016, 3 pgs.
"Holder for LUXEON Rebel—Part No. 180", Polymer Optics Ltd., 2008, 12 pgs.
"LED 7-Segment Displays", Lumex, uk.digikey.com, 2003, UK031, 36 pgs.
"LED325W UVTOP UV LED with Window", Thorlabs, Specifications and Documentation, 21978-S01 Rev. A, Apr. 8, 2011, 5 pgs.
"Liquid Crystal Phases", Phases of Liquid Crystals, http://plc.cwru.edu/tutorial/enhanced/files/lc/phase, Retrieved on Sep. 21, 2004, 6 pgs.
"LiteHUD Head-up display", BAE Systems, 2016, 2 pgs.
"LiteHUD Head-up display infographic", BAE Systems, 2017, 2 pgs.
"Luxeon C: Power Light Source", Philips Lumileds, www.philipslumileds.com, 2012, 18 pgs.
"Luxeon Rebel ES: Leading efficacy and light output, maximum design flexibility", Luxeon Rebel ES Datasheet DS61 Feb. 21, 2013, www.philipslumileds.com, 2013, 33 pgs.
"Mobile Display Report", Insight Media, LLC, Apr. 2012, vol. 7, No. 4, 72 pgs.
"Molecular Imprints Imprio 55", Engineering at Illinois, Micro + Nanotechnology Lab, Retrieved from https://mntl.illinois.edu/facilities/cleanrooms/equipment/Nano-Imprint.asp, Dec. 28, 2015, 2 pgs.
"Navy awards SGB Labs a contract for HMDs for simulation and training", Press releases, DigiLens, Oct. 2012, pp. 1-2.
"Optical measurements of retinal flow", Industrial Research Limited, Feb. 2012, 18 pgs.
"Osterhout Design Group Develops Next-Generation, Fully-integrated Smart Glasses Using Qualcomm Technologies", ODG, www.osterhoutgroup.com, Sep. 18, 2014, 2 pgs.
"Plastic has replaced glass in photochromic lens", www.plastemart.com, 2003, 1 page.
"Range Finding Using Pulse Lasers", OSRAM, Opto Semiconductors, Sep. 10, 2004, 7 pgs.
"Response time in Liquid-Crystal Variable Retarders", Meadowlark Optics, Inc., 2005, 4 pgs.
"Secondary Optics Design Considerations for SuperFlux LEDs", Lumileds, application brief AB20-5, Sep. 2002, 23 pgs.
"Solid-State Optical Mouse Sensor with Quadrature Outputs", IC Datasheet, UniquelCs, Jul. 15, 2004, 11 pgs.
"SVGA TransparentVLSITM Microdisplay Evaluation Kit", Radiant Images, Inc., Product Data Sheet, 2003, 3 pgs.
"Technical Data Sheet LPR1", Luminus Devices, Inc., Luminus Projection Chipset, Release 1, Preliminary, Revision B, Sep. 21, 2004, 9 pgs.
"The Next Generation of TV", SID Information Display, Nov./Dec. 2014, vol. 30, No. 6, 56 pgs.
"Thermal Management Considerations for SuperFlux LEDs", Lumileds, application brief AB20-4, Sep. 2002, 14 pgs.
"USAF Awards SBG Labs an SBIR Contract for Wide Field of View HUD", Press Release, SBG Labs DigiLens, Apr. 2014, 2 pgs.
"UVTOP240", Roithner LaserTechnik GmbH, v 2.0, Jun. 24, 2013, 6 pgs.
"UVTOP310", Roithner LaserTechnik GmbH, v 2.0, Jun. 24, 2013, 6 pgs.
"Velodyne's HDL-64E: A High Definition Lidar Sensor for 3-D Applications", High Definition Lidar, white paper, Oct. 2007, 7 pgs.
"VerLASE Gets Patent for Breakthrough Color Conversion Technology That Enables Full Color MicroLED Arrays for Near Eye Displays", Cision PRweb, Apr. 28, 2015, Retrieved from the Internet http://www.prweb.com/releases/2015/04/prweb12681038.htm, 3 pgs.
"X-Cubes—Revisited for LCOS", BASID, RAF Electronics Corp. Rawson Optics, Inc., Oct. 24, 2002, 16 pgs.
Aachen, "Design of plastic optics for LED applications", Optics Colloquium 2009, Mar. 19, 2009, 30 pgs.
Abbate et al., "Characterization of LC-polymer composites for opto-electronic application", Proceedings of OPTOEL'03, Leganes-Madrid, Spain, Jul. 14-16, 2003, 4 pgs.
Al-Kalbani et al., "Ocular Microtremor laser speckle metrology", Proc. of SPIE, 2009, vol. 7176 717606-1, 12 pgs., doi: 10.1117/12.808855.
Almanza-Workman et al., "Planarization coating for polyimide substrates used in roll-to-roll fabrication of active matrix backplanes for flexible displays", HP Laboratories, HPL-2012-23, Feb. 6, 2012, 12 pgs.
Amitai et al., "Visor-display design based on planar holographic optics", Applied Optics, vol. 34, No. 8, Mar. 10, 1995, pp. 1352-1356.
Amundson et al., "Morphology and electro-optic properties of polymer- dispersed liquid-crystal films", Physical Review E, Feb. 1997, vol. 55. No. 2, pp. 1646-1654.
An et al., "Speckle suppression in laser display using several partially coherent beams", Optics Express, Jan. 5, 2009, vol. 17, No. 1, pp. 92-103, first published Dec. 22, 2008.
Apter et al., "Electrooptical Wide-Angle Beam Deflector Based on Fringing-Field-Induced Refractive Inhomogeneity in a Liquid Crystal Layer", 23rd IEEE Convention of Electrical and Electronics Engineers in Israel, Sep. 6-7, 2004, pp. 240-243.
Arnold et al., "52.3: An Improved Polarizing Beamsplitter LCOS Projection Display Based on Wire-Grid Polarizers", Society for Information Display, Jun. 2001, pp. 1282-1285.
Ayras et al., "Exit pupil expander with a large field of view based on diffractive optics", Journal of the Society for Information Display, May 18, 2009, vol. 17, No. 8, pp. 659-664, DOI: 10.1889/JSID17.8.659.
Baets et al., "Resonant-Cavity Light-Emitting Diodes: a review", Proceedings of SPIE, 2003, vol. 4996, pp. 74-86.
Bayer et al., "Introduction to Helmet-Mounted Displays", 2016, pp. 47-108.
Beckel et al., "Electro-optic properties of thiol-ene polymer stabilized ferroelectric liquid crystals", Liquid Crystals, vol. 30, No. 11, Nov. 2003, pp. 1343-1350, DOI: 10.1080/02678290310001605910.

(56) References Cited

OTHER PUBLICATIONS

Bergkvist, "Biospeckle-based Study of the Line Profile of Light Scattered in Strawberries", Master Thesis, Lund Reports on Atomic Physics, LRAP-220, Lund 1997, pp. 1-62.
Bernards et al., "Nanoscale porosity in polymer films: fabrication and therapeutic applications", Soft Matter, Jan. 1, 2010, vol. 6, No. 8, pp. 1621-1631, doi: 10.1039/B922303G.
Bhuvaneshwaran et al., "Spectral response of Bragg gratings in multimode polymer waveguides", Applied Optics, Dec. 1, 2017, vol. 56. No. 34, pp. 9573-9582, doi: 10.1364/AO.56.009573.
Bleha et al., "Binocular Holographic Waveguide Visor Display", SID Symposium Digest of Technical Papers, Holoeye Systems Inc., Jun. 2014, San Diego, CA, 4 pgs.
Bleha et al., "D-ILA Technology for High Resolution Projection Displays", Sep. 10, 2003, Proceedings, vol. 5080, 11 pgs., doi:10.1117/12.497532.
Bone, "Design Obstacles for LCOS Displays in Projection Applications Optics architectures for LCOS are still evolving", Aurora Systems Inc., Bay Area SID Seminar, Mar. 27, 2001, 22 pgs.
Born et al., "Optics of Crystals", Principles of Optics 5th Edition 1975, pp. 705-707.
Bourzac, "Magic Leap Needs to Engineer a Miracle", Intelligent Machines, Jun. 11, 2015, 7 pgs.
Bowen et al., "Optimisation of interdigitated electrodes for piezoelectric actuators and active fibre composites", J Electroceram, Jul. 2006, vol. 16, pp. 263-269, DOI 10.1007/s10832-006-9862-8.
Bowley et al., "Variable-wavelength switchable Bragg gratings formed in polymer-dispersed liquid crystals", Applied Physics Letters, Jul. 2, 2001, vol. 79, No. 1, pp. 9-11, DOI: 10.1063/1.1383566.
Bronnikov et al., "Polymer-Dispersed Liquid Crystals: Progress in Preparation, Investigation and Application", Journal of Macromolecular Science Part B, published online Sep. 30, 2013, vol. 52, pp. 1718-1738, DOI: 10.1080/00222348.2013.808926.
Brown, "Waveguide Displays", Rockwell Collins, 2015, 11 pgs.
Bruzzone et al., "Compact, high-brightness LED illumination for projection systems", Journal of the Society for Information Display, vol. 17, No. 12, Dec. 2009, pp. 1043-1049, Doi: 10.1189/JSID17.12.1043.
Buckley, "Colour holographic laser projection technology for heads-up and instrument cluster displays", Conference: Proc. SID Conference 14th Annual Symposium on Vehicle Displays, Jan. 2007, 5 pgs.
Buckley, "Pixtronix DMS technology for head-up displays", Pixtronix, Inc., Jan. 2011, 4 pgs.
Buckley et al., "Full colour holographic laser projector HUD", Light Blue Optics Ltd., Aug. 10, 2015, 5 pgs.
Buckley et al., "Rear-view virtual image displays", in Proc. SID Conference 16th Annual Symposium on Vehicle Displays, Jan. 2009, 5 pgs.
Bunning et al., "Effect of gel-point versus conversion on the real-time dynamics of holographic polymer-dispersed liquid crystal (HPDLC) formation", Proceedings of SPIE—vol. 5213, Liquid Crystals VII, Iam-Choon Khoo, Editor, Dec. 2003, pp. 123-129.
Bunning et al., "Electro-optical photonic crystals formed in H-PDLCs by thiol-ene photopolymerization", American Physical Society, Annual APS, Mar. 3-7, 2003, abstract #R1.135.
Bunning et al., "Holographic Polymer-Dispersed Liquid Crystals (H-PDLCs)1", Annual Review of Material Science, 2000, vol. 30, pp. 83-115.
Bunning et al., "Morphology of Anisotropic Polymer Dispersed Liquid Crystals and the Effect of Monomer Functionality", Journal of Polymer Science: Part B: Polymer Physics, Jul. 30, 1997, vol. 35, pp. 2825-2833.
Busbee et al., "SiO2 Nanoparticle Sequestration via Reactive Functionalization in Holographic Polymer-Dispersed Liquid Crystals", Advanced Materials, Sep. 2009, vol. 21, pp. 3659-3662, DOI: 10.1002/adma.200900298.
Butler et al., "Diffractive Properties of Highly Birefringent Volume Gratings: Investigation", Journal of Optical Society of America, Feb. 2002, vol. 19, No. 2, pp. 183-189.
Cai et al., "Recent advances in antireflective surfaces based on nanostructure arrays", Materials Horizons, 2015, vol. 2, pp. 37-53, DOI: 10.1038/c4mh00140k.
Cameron, "Optical Waveguide Technology & Its Application In Head Mounted Displays", Proc. of SPIE, May 22, 2012, vol. 8383, pp. 83830E-1-83830E-11, doi: 10.1117/12.923660.
Cameron, "The Application of Holographic Optical Waveguide Technology to Q-Sight™ Family of Helmet Mounted Displays", Proc. of SPIE, 2009, vol. 7326, 11 pages, doi: 10.1117/12.818581.
Caputo et al., "POLICRYPS Composite Materials: Features and Applications", Advances in Composite Materials—Analysis of Natural and Man-Made Materials, www.intechopen.com, Sep. 2011, pp. 93-118.
Caputo et al., "POLICRYPS Switchable Holographic Grating: A Promising Grating Electro-Optical Pixel for High Resolution Display Application", Journal of Display Technology, Mar. 2006, vol. 2, No. 1, pp. 38-51, Doi: 10.1109/JDT.2005.864156.
Caputo et al., "POLICRYPS: a liquid crystal composed nano/microstructure with a wide range of optical and electro-optical applications", Journal of Optics A: Pure and Applied Optics, Jan. 15, 2009, vol. 11, No. 2, 13 pgs., doi: 10.1088/1464-4258/11/2/024017.
Carclo Optics, "Guide to choosing secondary optics", Carclo Optics, Dec. 15, 2014, www.carclo-optics.com, 48 pgs.
Carothers, "Polymers and polyfunctionality", Transactions of the Faraday Society, Jan. 1, 1936, vol. 32, pp. 39-49, doi: 10.1039/TF9363200039.
Chen et al., "Polarization rotators fabricated by thermally-switched liquid crystal alignments based on rubbed poly(N-vinyl carbazole) films", Optics Express, Apr. 11, 2011, vol. 19, No. 8, pp. 7553-7558, first published Apr. 5, 2011.
Cheng et al., "Design of an ultra-thin near-eye display with geometrical waveguide and freeform optics", Optics Express, Aug. 2014, 16 pgs., DOI:10.1364/OE.22.020705.
Chi et al., "Ultralow-refractive-index optical thin films through nanoscale etching of ordered mesoporous silica films", Optic Letters, May 1, 2012, vol. 37, No. 9, pp. 1406-1408, first published Apr. 19, 2012.
Chigrinov et al., "Photo-aligning by azo-dyes: Physics and applications", Liquid Crystals Today, Sep. 6, 2006, http://www.tandfonline.com/action/journalInformation?journalCode=tlcy20, 15 pgs.
Cho et al., "Electro-optic Properties of CO2 Fixed Polymer/Nematic LC Composite Films", Journal of Applied Polymer Science, Nov. 5, 2000, vol. 81, Issue 11, pp. 2744-2753.
Cho et al., "Optimization of Holographic Polymer Dispersed Liquid Crystals for Ternary Monomers", Polymer International, Nov. 1999, vol. 48, pp. 1085-1090.
Colegrove et al., "p. 59: Technology of Stacking HPDLC for Higher Reflectance", SID 00 Digest, May 2000, pp. 770-773.
Crawford, "Electrically Switchable Bragg Gratings", Optics & Photonics News, Apr. 2003, pp. 54-59.
Cruz-Arreola et al., "Diffraction of beams by infinite or finite amplitude-phase gratings", Investigacio' n Revista Mexicana De Fi'sica, Feb. 2011, vol. 57, No. 1, pp. 6-16.
Dabrowski, "High Birefringence Liquid Crystals", Crystals, Sep. 3, 2013, vol. 3, No. 3, pp. 443-482, doi: 10.3390/cryst3030443.
Dainty, "Some statistical properties of random speckle patterns in coherent and partially coherent illumination", Optica Acta, Mar. 12, 1970, vol. 17, No. 10, pp. 761-772.
Date, "Alignment Control in Holographic Polymer Dispersed Liquid Crystal", Journal of Photopolymer Science and Technology, Nov. 2, 2000, vol. 13, No. 2, pp. 289-294.
Date et al., "52.3: Direct-viewing Display Using Alignment-controlled PDLC and Holographic PDLC", Society for Information Display Digest, May 2000, pp. 1184-1187, DOI: 10.1889/1.1832877.
Date et al., "Full-color reflective display device using holographically fabricated polymer-dispersed liquid crystal (HPDLC)", Journal of the SID, 1999, vol. 7, No. 1, pp. 17-22.
De Bitetto, "White light viewing of surface holograms by simple dispersion compensation", Applied Physics Letters, Dec. 15, 1966, vol. 9, No. 12, pp. 417-418.
De Sarkar et al., "Effect of Monomer Functionality on the Morphology and Performance of Holographic Transmission Gratings

(56) References Cited

OTHER PUBLICATIONS

Recorded on Polymer Dispersed Liquid Crystals", Macromolecules, 2003, vol. 36, No. 3, pp. 630-638.
Developer World, "Create customized augmented reality solutions", printed Oct. 19, 2017, LMX-001 holographic waveguide display, Sony Developer World, 3 pgs.
Dhar et al., "Recording media that exhibit high dynamic range for digital holographic data storage", Optics Letters, Apr. 1, 1999, vol. 24, No. 7, pp. 487-489.
Domash et al., "Applications of switchable Polaroid holograms", SPIE Proceedings, vol. 2152, Diffractive and Holographic Optics Technology, Jan. 23-29, 1994, Los Angeles, CA, pp. 127-138, ISBN: 0-8194-1447-6.
Doolittle, "Studies in Newtonian Flow. II. The Dependence of the Viscosity of Liquids on Free-Space", Journal of Applied Physics, 1951, vol. 22, Issue 12, pp. 1471-1475, published online Apr. 29, 2004, https://doi.org/10.1063/1. 1699894.
Drake et al., "Waveguide Hologram Fingerprint Entry Device", Optical Engineering, Sep. 1996, vol. 35, No. 9, pp. 2499-2505.
Drevensek-Olenik et al., "In-Plane Switching of Holographic Polymer-Dispersed Liquid Crystal Transmission Gratings", Mol. Cryst. Liq. Cryst., 2008, vol. 495, pp. 177/[529]-185/[537], DOI: 10.1080/15421400802432584.
Drevensek-Olenik et al., "Optical diffraction gratings from polymer-dispersed liquid crystals switched by interdigitated electrodes", Journal of Applied Physics, Dec. 1, 2004, vol. 96, No. 11, pp. 6207-6212, DOI: 10.1063/1.1807027.
European Office Action for European Patent Application No. 13192383.1 dated Oct. 16, 2017, 5 pgs.
Extended European Search Report for EP Application No. 13192383.1, dated Apr. 2, 2014, 7 pgs.
Extended European Search Report for European Application No. 13765610.4 dated Feb. 16, 2016, 6 pgs.
Extended European Search Report for European Application No. 15187491.4, search completed Jan. 15, 2016, mailed Jan. 28, 2016, 5 pgs.
Extended European Search Report for European Application No. 18867522.7, Search completed Sep. 15, 2021, Mailed Sep. 24, 2021, 9 Pgs.
Extended European Search Report for European Application No. 18898154.2, Search completed Aug. 13, 2021, Mailed Aug. 23, 2021, 7 pgs.
Extended European Search Report for European Application No. 19736108.2, Search completed Sep. 15, 2021, Mailed Sep. 27, 2021, 8 pgs.
Extended European Search Report for European Application No. 19897355.4, Search completed Jul. 12, 2022, Mailed Jul. 21, 2022, 8 Pgs.
Extended European Search Report for European Application No. 18727645.6, Search completed Oct. 14, 2020, Mailed Oct. 23, 2020, 13 pgs.
Extended Search Report for European Application No. 18898841.4, Search completed Mar. 18, 2021, Mailed Mar. 26, 2021, 10 pgs.
International Preliminary Report on Patentability for International Application No. PCT/GB2010/000835, issued Nov. 1, 2011, mailed Nov. 10, 2011, 9 pgs.
International Preliminary Report on Patentability for International Application No. PCT/GB2010/001920, issued Apr. 11, 2012, mailed Apr. 19, 2012, 10 pgs.
International Preliminary Report on Patentability for International Application No. PCT/GB2010/001982, report issued May 1, 2012, mailed May 10, 2012, 7 pgs.
International Preliminary Report on Patentability for International Application No. PCT/GB2013/000273, issued Dec. 23, 2014, mailed Dec. 31, 2014, 8 pgs.
International Preliminary Report on Patentability for International Application No. PCT/GB2015/000203, issued Mar. 21, 2017, mailed Mar. 30, 2017, 8 pgs.

International Preliminary Report on Patentability for International Application No. PCT/GB2016/000005, Report issued Jul. 18, 2017, Mailed Jul. 27, 2017, 7 pgs.
International Preliminary Report on Patentability for International Application No. PCT/GB2016/000036, issued Aug. 29, 2017, mailed Sep. 8, 2017, 8 pgs.
International Preliminary Report on Patentability for International Application No. PCT/GB2016/000051, Report issued Sep. 19, 2017, Mailed Sep. 28, 2017, 7 Pgs.
International Preliminary Report on Patentability for International Application No. PCT/GB2016/000065, issued Oct. 3, 2017, mailed Oct. 12, 2017, 8 pgs.
International Preliminary Report on Patentability for International Application No. PCT/IB2008/001909, Report issued Jan. 26, 2010, Mailed Jan. 26, 2010, 5 pgs.
International Preliminary Report on Patentability for International Application No. PCT/US2018/012227, Report issued Jul. 30, 2019, Mailed Aug. 8, 2019, 7 Pgs.
International Preliminary Report on Patentability for International Application No. PCT/US2018/037410, Report issued Jul. 14, 2020, Mailed Jul. 23, 2020, 7 pgs.
International Preliminary Report on Patentability for International Application No. PCT/US2018/048636, Report issued Jul. 14, 2020, Mailed Jul. 23, 2020, 9 pgs.
International Preliminary Report on Patentability for International Application No. PCT/US2018/062835, Report issued Jul. 14, 2020, Mailed Jul. 23, 2020, 7 pgs.
International Preliminary Report on Patentability for International Application No. PCT/US2019/012758, Report issued Jul. 14, 2020, Mailed Jul. 23, 2020, 4 Pgs.
International Preliminary Report on Patentability for International Application No. PCT/US2019/012759, Report issued Jul. 14, 2020, Mailed Jul. 23, 2020, 6 Pgs.
International Preliminary Report on Patentability for International Application PCT /US2018/015553, Report issued Jun. 4, 2019, Mailed Jun. 13, 2019, 6 pgs.
International Preliminary Report on Patentability for International Application PCT/GB2009/051676, issued Jun. 14, 2011, mailed Jun. 23, 2011, 6 pgs.
International Preliminary Report on Patentability for International Application PCT/GB2011/000349, issued Sep. 18, 2012, mailed Sep. 27, 2012, 10 pgs.
International Preliminary Report on Patentability for International Application PCT/GB2012/000331, issued Oct. 8, 2013, mailed Oct. 17, 2013, 8 pgs.
International Preliminary Report on Patentability for International Application PCT/GB2012/000677, issued Feb. 25, 2014, mailed Mar. 6, 2014, 5 pgs.
International Preliminary Report on Patentability for International Application PCT/GB2013/000005, issued Jul. 8, 2014, mailed Jul. 17, 2014, 12 pgs.
International Preliminary Report on Patentability for International Application PCT/GB2013/000210, issued Nov. 11, 2014, Mailed Nov. 20, 2014, 6 pgs.
International Preliminary Report on Patentability for International Application PCT/GB2014/000197, issued Nov. 24, 2015, mailed Dec. 3, 2015, 7 pgs.
International Preliminary Report on Patentability for International Application PCT/GB2014/000295, issued Feb. 2, 2016, mailed Feb. 11, 2016, 4 pgs.
International Preliminary Report on Patentability for International Application PCT/GB2015/000225, issued Feb. 14, 2017, mailed Feb. 23, 2017, 8 pgs.
International Preliminary Report on Patentability for International Application PCT/GB2015/000228, issued Feb. 14, 2017, mailed Feb. 23, 2017, 11 pgs.
International Preliminary Report on Patentability for International Application PCT/GB2015/000274, Issued Mar. 28, 2017, mailed Apr. 6, 2017, 8 pgs.
International Preliminary Report on Patentability for International Application PCT/GB2016/000003, issued Jul. 18, 2017, mailed Jul. 27, 2017, 11 pgs.

(56) References Cited

OTHER PUBLICATIONS

International Preliminary Report on Patentability for International Application PCT/GB2016/000014, issued Jul. 25, 2017, mailed Aug. 3, 2017, 7 pgs.
International Preliminary Report on Patentability for International Application PCT/GB2017/000015, Report Completed Aug. 7, 2018, Mailed Aug. 16, 2018, 7 pgs.
International Preliminary Report on Patentability for International Application PCT/GB2017/000040, Report issued Sep. 25, 2018, Mailed Oct. 4, 2018, 7 pgs.
International Preliminary Report on Patentability for International Application PCT/GB2017/000055, issued Oct. 16, 2018, Mailed Oct. 25, 2018, 9 pgs.
International Preliminary Report on Patentability for International Application PCT/US2014/011736, issued Jul. 21, 2015, mailed Jul. 30, 2015, 9 pgs.
International Preliminary Report on Patentability for International Application PCT/US2016/017091, issued Aug. 15, 2017, mailed Aug. 24, 2017, 5 pgs.
International Preliminary Report on Patentability for International Application PCT/US2018/012691, issued Jul. 9, 2019, Mailed Jul. 18, 2019, 10 pgs.
International Preliminary Report on Patentability for International Application PCT/US2018/048960, Report issued on Mar. 3, 2020, Mailed on Mar. 12, 2020, 7 pgs.
International Preliminary Report on Patentability for International Application PCT/US2018/056150, Report Issued on Apr. 21, 2020, Mailed on Apr. 30, 2020, 6 pgs.
International Preliminary Report on Patentability for International Application PCT/US2019/012764, Report issued Jul. 14, 2020, Mailed Jul. 23, 2020, 5 pgs.
International Preliminary Report on Patentability for International Application PCT/US2019/031163, Report issued Nov. 10, 2020, Mailed Nov. 19, 2020, 6 pgs.
International Preliminary Report on Patentability for International Application PCT/US2019/043496 Report issued Jan. 26, 2021, Mailed Feb. 4, 2021, 5 pgs.
International Preliminary Report on Patentability for International Application PCT/US2019/047097 issued Sep. 28, 2021, Mailed on Nov. 4, 2021, 7 pgs.
International Preliminary Report on Patentability for International Application PCT/US2019/064765, Report issued Oct. 19, 2020, Mailed Oct. 28, 2020, 27 pgs.
International Preliminary Report on Patentability for International Application PCT/US2019/065478, Report issued Jun. 8, 2021, mailed on Jun. 24, 2021, 9 pgs.
Trisnadi, "Speckle contrast reduction in laser projection displays", Proc. SPIE 4657, 2002, 7 pgs.
Tzeng et al., "Axially symmetric polarization converters based on photo-aligned liquid crystal films", Optics Express, Mar. 17, 2008, vol. 16, No. 6, pp. 3768-3775.
Upatnieks et al., "Color Holograms for white light reconstruction", Applied Physics Letters, Jun. 1, 1996, vol. 8, No. 11, pp. 286-287.
Urey, "Diffractive exit pupil expander for display applications", Applied Optics, Nov. 10, 2001, vol. 40, Issue 32, pp. 5840-5851.
Ushenko, "The Vector Structure of Laser Biospeckle Fields and Polarization Diagnostics of Collagen Skin Structures", Laser Physics, 2000, vol. 10, No. 5, pp. 1143-1149.
Valoriani, "Mixed Reality: Dalle demo a un prodotto", Disruptive Technologies Conference, Sep. 23, 2016, 67 pgs.
Van Gerwen et al., "Nanoscaled interdigitated electrode arrays for biochemical sensors", Sensors and Actuators, Mar. 3, 1998, vol. B 49, pp. 73-80.
Vecchi, "Studi ESR Di Sistemi Complessi Basati Su Cristalli Liquidi", Thesis, University of Bologna, Department of Physical and Inorganic Chemistry, 2004-2006, 110 pgs.
Veltri et al., "Model for the photoinduced formation of diffraction gratings in liquid-crystalline composite materials", Applied Physics Letters, May 3, 2004, vol. 84, No. 18, pp. 3492-3494.

Vita, "Switchable Bragg Gratings", Thesis, Universita degli Studi di Napoli Federico II, Nov. 2005, 103 pgs.
Vuzix, "M3000 Smart Glasses, Advanced Waveguide Optics", brochure, Jan. 1, 2017, 2 pgs.
Waldern et al., "Waveguide Optics for All Day Wearable Displays", Jun. 20, 2017, 35 pgs.
Wang et al., "Liquid-crystal blazed-grating beam deflector", Applied Optics, Dec. 10, 2000, vol. 39, No. 35, pp. 6545-6555.
Wang et al., "Optical Design of Waveguide Holographic Binocular Display for Machine Vision", Applied Mechanics and Materials, Sep. 27, 2013, vols. 427-429, pp. 763-769.
Wang et al., "Speckle reduction in laser projection systems by diffractive optical elements", Applied Optics, Apr. 1, 1998, vol. 37, No. 10, pp. 1770-1775.
Weber et al., "Giant Birefringent Optics in Multilayer Polymer Mirrors", Science, Mar. 31, 2000, vol. 287, pp. 2451-2456.
Webster, "Webster's Third New International Dictionary 433", (1986), 3 pages.
Wei An, "Industrial Applications of Speckle Techniques", Doctoral Thesis, Royal Institute of Technology, Department of Production Engineering, Chair of Industrial Metrology & Optics, Stockholm, Sweden 2002, 76 pgs.
Welde et al., "Investigation of methods for speckle contrast reduction", Master of Science in Electronics, Jul. 2010, Norwegian University of Science and Technology, Department of Electronics and Telecommunications, 127 pgs.
White, "Influence of thiol-ene polymer evolution on the formation and performance of holographic polymer dispersed liquid crystals", The 232nd ACS National Meeting, San Francisco, CA, Sep. 10-14, 2006, 1 pg.
Wicht et al., "Nanoporous Films with Low Refractive Index for Large-Surface Broad-Band Anti-Reflection Coatings", Macromol. Mater. Eng., 2010, 295, DOI: 10.1002/mame.201000045, 9 pgs.
Wilderbeek et al., "Photoinitiated Bulk Polymerization of Liquid Crystalline Thiolene Monomers", Macromolecules, 2002, vol. 35, pp. 8962-8969.
Wilderbeek et al., "Photo-Initiated Polymerization of Liquid Crystalline Thiol-Ene Monomers in Isotropic and Anisotropic Solvents", J. Phys. Chem. B, 2002, vol. 106, No. 50, pp. 12874-12883.
Wisely, "Head up and head mounted display performance improvements through advanced techniques in the manipulation of light", Proc. of SPIE, 2009, 10 pages, vol. 7327.
Wofford et al., "Liquid crystal bragg gratings: dynamic optical elements for spatial light modulators", Hardened Materials Branch, Survivability and Sensor Materials Division, AFRL-ML-WP-TP-2007-551, Air Force Research Laboratory, Jan. 2007, Wright-Patterson Air Force Base, OH, 17 pgs.
Yang et al., "Robust and Accurate Surface Measurement Using Structured Light", IEEE, Apr. 30, 2008, vol. 57, Issue 6, pp. 1275-1280, DOI:10.1109/TIM.2007.915103.
Yaqoob et al., "High-speed two-dimensional laser scanner based on Bragg grating stored in photothermorefractive glass", Applied Optics, Sep. 10, 2003, vol. 42, No. 26, pp. 5251-5262.
Yaroshchuk et al., "Stabilization of liquid crystal photoaligning layers by reactive mesogens", Applied Physics Letters, Jul. 14, 2009, vol. 95, pp. 021902-1-021902-3.
Ye, "Three-dimensional Gradient Index Optics Fabricated in Diffusive Photopolymers", Thesis, Department of Electrical, Computer and Energy Engineering, University of Colorado, 2012, 224 pgs.
Yemtsova et al., "Determination of liquid crystal orientation in holographic polymer dispersed liquid crystals by linear and non-linear optics", Journal of Applied Physics, Oct. 13, 2008, vol. 104, p. 073115-1-073115-4.
Yeralan et al., "Switchable Bragg grating devices for telecommunications applications", Opt. Eng., Aug. 2012, vol. 41, No. 8, pp. 1774-1779.
Yokomori, "Dielectric surface-relief gratings with high diffraction efficiency", Applied Optics, Jul. 15, 1984, vol. 23; No. 14, pp. 2303-2310.
Yoshida et al., "Nanoparticle-Dispersed Liquid Crystals Fabricated by Sputter Doping", Adv. Mater., 2010, vol. 22, pp. 622-626.

(56) References Cited

OTHER PUBLICATIONS

Youcef et al., "Phase Behavior Of Poly(N-Butyl Acrylate) And Poly(2-Ethylhexyl Acrylate) in Nematic Liquid Crystal E7", Macromol. Symp. 2011, vol. 303, pp. 10-16, doi: 10.1002/masy.201150502.

Zeller et al., "Laminated Air Structured and Fluid Infiltrated Polymer Waveguides", in IEEE Photonics Technology Letters, Nov. 2, 2011, vol. 23, Issue: 21, pp. 1564-1566, first published Aug. 12, 2011, DOI: 10.1109/LPT.2011.2164396.

Zhang et al., "Dynamic Holographic Gratings Recorded by Photopolymerization of Liquid Crystalline Monomers", J. Am. Chem. Soc., 1994, vol. 116, pp. 7055-7063.

Zhang et al., "Switchable Liquid Crystalline Photopolymer Media for Holography", J. Am. Chem. Soc., 1992, vol. 114, pp. 1506-1507.

Zhao et al., "Designing Nanostructures by Glancing Angle Deposition", Proc. of SPIE, Oct. 27, 2003, vol. 5219, pp. 59-73.

Zhao et al., "Diffusion Model of Hologram Formation in Dry Photopolymer Materials", Journal of Modern Optics, 1994. Vol. 41, No. 10, pp. 1929-1939, https://doi.org/10.1080/09500349414551831.

Zhao et al., "Extension of a diffusion model for holographic photopolymers", Journal of Modern Optics, 1995, vol. 42, No. 12, pp. 2571-2573, https://doi.org/10.1080/713824349.

Zheng et al., "Holographic Polymer-Dispersed Liquid Crystal Grating with Low Scattering Losses", Liquid Crystals, Mar. 2012, vol. 39, Issue 3, pp. 387-391, , http://dx.doi.org/10.1080/02678292.2012.656716.

Ziębacz, "Dynamics of nano and micro objects in complex liquids", Ph.D. dissertation, Institute of Physical Chemistry of the Polish Academy of Sciences, Warsaw 2011, 133 pgs.

Zou et al., "Functionalized nano interdigitated electrodes arrays on polymer with integrated microfluidics for direct bio-affinity sensing using impedimetric measurement", Sensors and Actuators A, Jan. 16, 2007, vol. 136, pp. 518-526, doi:10.1016/j.sna.2006.12.006.

Zyga, "Liquid crystals controlled by magnetic fields may lead to new optical applications", Nanotechnology, Nanophysics, Retrieved from http://phys.org/news/2014-07-liquid-crystals-magnetic-fields-optical.html, Jul. 9, 2014, 3 pgs.

Extended European Search Report for European Application No. 20755316.5, Search completed Nov. 17, 2022, Mailed Nov. 25, 2022, 09 pgs.

Extended European Search Report for European Application No. 20818304.6, Search completed Mar. 23, 2023, Mailed Mar. 31, 2023, 8 pgs.

International Preliminary Report on Patentability for International Application PCT/US2021/038542, Report issued Dec. 13, 2022, Mailed on Jan. 5, 2023, 8 pgs.

International Preliminary Report on Patentability for International Application PCT/US2021/072548, Report issued May 16, 2023, Mailed on Jun. 1, 2023, 05 pgs.

International Preliminary Report on Patentability for International Application PCT/US2022/070095, Report issued Jul. 4, 2023, Mailed on Jul. 20, 2023, 08 pgs.

Supplementary Partial European Search Report for European Application No. 18727645.6, Search completed Jul. 2, 2020, Mailed Jul. 13, 2020, 13 pgs.

Extended European Search Report for European Application No. 24158294.9, Search completed Apr. 25, 2024, Mailed May 6, 2024, 7 pgs.

* cited by examiner

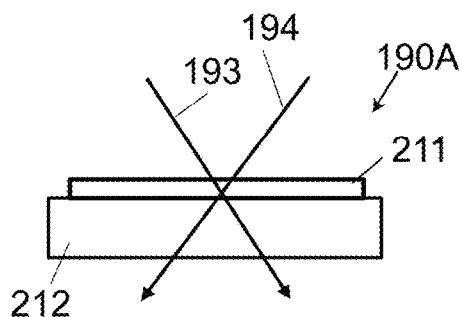
FIG.10A
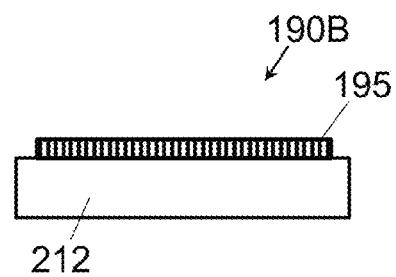
FIG.10B
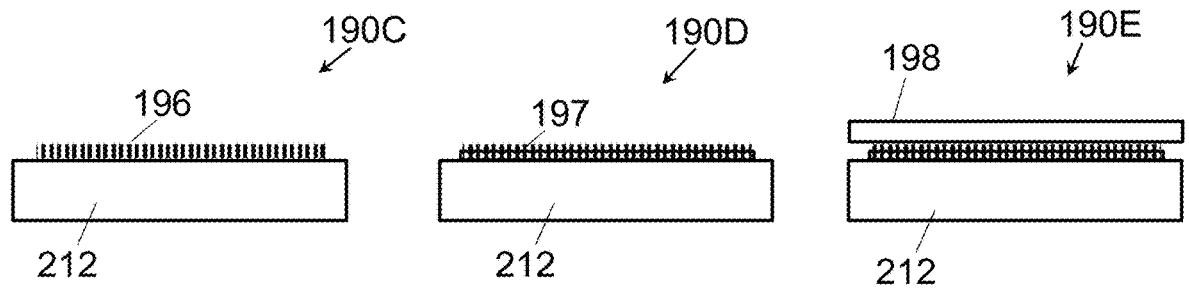
FIG.10C  FIG.10D  FIG.10E

GRATING STRUCTURES FOR COLOR WAVEGUIDES

CROSS-REFERENCE TO RELATED APPLICATIONS

This application claims the benefit of and priority under 35 U.S.C. § 119(e) to U.S. Provisional Patent Application Ser. No. 63/134,898, entitled "Grating Structures for Color Waveguides" and filed Jan. 7, 2021, which is incorporated herein by reference in its entirety for all purposes.

FIELD OF THE INVENTION

The present invention generally relates to grating structures for providing beam expansion and extracting light from a waveguide.

BACKGROUND

Waveguides can be referred to as structures with the capability of confining and guiding waves (e.g., restricting the spatial region in which waves can propagate). One subclass includes optical waveguides, which are structures that can guide electromagnetic waves, typically those in the visible spectrum. Waveguide structures can be designed to control the propagation path of waves using a number of different mechanisms. For example, planar waveguides can be designed to utilize diffraction gratings to diffract and couple incident light into the waveguide structure such that the incoupled light can proceed to travel within the planar structure via total internal reflection ("TIR").

Fabrication of waveguides can include the use of material systems that allow for the recording of holographic optical elements within the waveguides. One class of such material includes polymer dispersed liquid crystal ("PDLC") mixtures, which are mixtures containing photopolymerizable monomers and liquid crystals. A further subclass of such mixtures includes holographic polymer dispersed liquid crystal ("HPDLC") mixtures. Holographic optical elements, such as volume phase gratings, can be recorded in such a liquid mixture by illuminating the material with two mutually coherent laser beams. During the recording process, the monomers polymerize, and the mixture undergoes a photopolymerization-induced phase separation, creating regions densely populated by liquid crystal (LC) micro-droplets, interspersed with regions of clear polymer. The alternating liquid crystal-rich and liquid crystal-depleted regions form the fringe planes of the grating.

Waveguide optics, such as those described above, can be considered for a range of display and sensor applications. In many applications, waveguides containing one or more grating layers encoding multiple optical functions can be realized using various waveguide architectures and material systems, enabling new innovations in near-eye displays for Augmented Reality ("AR") and Virtual Reality ("VR"), compact Heads Up Displays ("HUDs") for aviation and road transport, and sensors for biometric and laser radar ("LIDAR") applications. As many of these applications are directed at consumer products, there is a growing requirement for efficient low cost means for manufacturing holographic waveguides in large volumes.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description will be more fully understood with reference to the following figures and data graphs, which are presented as various embodiment of the disclosure and should not be construed as a complete recitation of the scope of the disclosure, wherein:

FIG. 10A conceptually illustrates an apparatus that can be used in a step of a method for fabricating a hybrid surface relief/Bragg grating in accordance with an embodiment of the invention.

FIG. 10B conceptually illustrates an apparatus that can be used in a step of a method for fabricating a surface relief grating in accordance with an embodiment of the invention.

FIG. 10C conceptually illustrates an apparatus that can be used in a step of a method for fabricating a surface relief grating in accordance with an embodiment of the invention.

FIG. 10D conceptually illustrates an apparatus that can be used in a step of a method for fabricating a surface relief grating in which the surface relief grating formed in the step illustrated in FIG. 10C is partially refilled with liquid crystal in accordance with an embodiment of the invention.

FIG. 10E conceptually illustrates an apparatus that can be used in a step of a method for fabricating a surface relief grating in which the hybrid surface relief Bragg grating formed in the step illustrated in FIG. 10D is covered with a protective layer, in accordance with an embodiment of the invention.

SUMMARY OF THE DISCLOSURE

Figure 1A:
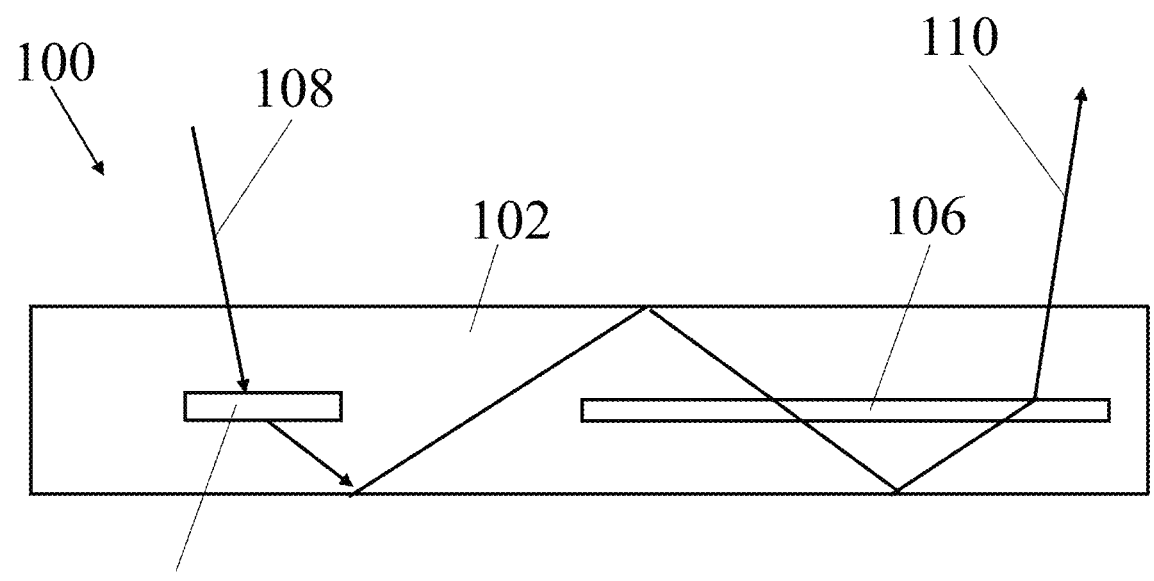
FIG. 1A illustrates a profile view of a waveguide-based display in accordance with an embodiment of the invention.

In many of the embodiments to be described there is provided A waveguide-based display device including: a waveguide; a source of image modulated light projected over a field of view; an input coupler for coupling said light into a total internal reflection (TIR) path within the waveguide; and a grating structure for providing beam expansion of the TIR light in at least one direction and extracting the TIR light from the waveguide, wherein the grating structure comprises a plurality of grating elements having at least two different grating prescriptions and at least one surface relief grating formed by a phase separation process.

In many embodiments, the plurality of grating elements are tiled in a repeating pattern. In many embodiments, the plurality of grating elements are tiled in a non-repeating pattern.

In many embodiments, the grating structure further includes a spatial refractive index modulation.

In many embodiments, the plurality of grating elements includes at least two different spectral responses.

In many embodiments, the plurality of grating elements includes at least two different angular responses.

In many embodiments, the plurality of grating elements includes at least two different birefringence characteristics.

In many embodiments, the plurality of grating elements includes at least two different polarization responses.

In many embodiments, the plurality of grating elements includes at least two different refractive index modulations.

In many embodiments, the plurality of grating elements includes an average refractive index including at least two different refractive indices.

In many embodiments, the plurality of grating elements includes at least two different grating thicknesses.

In many embodiments, the grating structure can comprise a plurality of grating elements having grating prescriptions selected from a group containing at least two different grating prescriptions.

In many embodiments, the plurality of grating elements includes at least two different K-vectors.

In many embodiments, the plurality of grating elements includes diffracting grating elements arrayed with non-diffracting grating elements.

In many embodiments, the plurality of grating elements is recorded in material containing at least two different materials.

In many embodiments, the plurality of grating elements is recorded in material having dispersion curves selected from a group containing at least two different dispersion curves.

In many embodiments, the plurality of grating elements is recorded in material having at least two different wavelength sensitivities.

In many embodiments, the plurality of grating elements is recorded in material having at least two different holographic exposure times.

In many embodiments, the plurality of grating elements is recorded in material having at least two different holographic exposure energies.

In many embodiments, the grating structure is configured to enable a plurality of ray path lengths within the grating structure that differ in length by a distance shorter than the coherence length of the source of image modulated light.

In many embodiments, the plurality of grating elements includes at least one grating pitch greater that a wavelength of the TIR light.

In many embodiments, the plurality of grating elements includes a spatially variation of at least one selected from the group consisting of: spatial variation of grating thickness, average refractive index, refractive index modulation, and birefringence.

In many embodiments, the grating structure includes at least one selected from a group consisting of: a rolled K-vector grating, a dual interaction grating, a multiplexed grating, a lossy grating, a sub wavelength grating, and a chirped grating.

In many embodiments, the at least one surface relief grating is formed by liquid crystal extraction from a grating recorded in holographic polymer dispersed liquid crystal (HPDLC).

In many embodiments, the at least one surface relief grating is formed by at least partially backfilling a surface relief grating formed by liquid crystal extraction from a holographic polymer dispersed liquid crystal (HPDLC) recorded grating with another material having a refractive index higher than that of the extracted liquid crystal.

In many embodiments, the at least one surface relief grating is formed by at least partially backfilling a surface relief grating formed by liquid crystal extraction from a holographic polymer dispersed liquid crystal (HPDLC) recorded grating with another material having a refractive index lower than that of the extracted liquid crystal.

In many embodiments, the grating structure includes at least one reflection grating. In many embodiments, the grating structure includes at least one transmission grating.

In many embodiments, the grating structure can be a switching grating.

In many embodiments, the grating structure can further comprise at least one selected from the group of a beam-splitter layer, an anti-reflection coating, an optical bandpass filter, a polarization modification layer, and/or an alignment layer.

In many embodiments, the grating structure provides beam expansion and extraction of red, green and blue image modulated light over a field of view. In many embodiments, the image modulated light is monochromatic.

In many embodiments, the grating structure is recorded into a material selected from the group of a mixture including at least one liquid crystal and at least one monomer, a mixture including at least one blue phase liquid crystal and at least one monomer.

In many embodiments, the input coupler can be a grating or a prism. In many embodiments the input coupler can include a plurality of gratings. In many embodiments, the input coupler can be a switching grating.

In many embodiments, the plurality of grating elements are spatially distributed elements.

In many embodiments, the at least one surface relief grating includes a grating modulation depth greater than a grating pitch.

In many of the embodiments to be described a waveguide can support at least one photonic crystal. For the purposes of explaining the invention a photonic crystal can be considered as a periodic optical nanostructure that affects the motion of photons. Photonic crystals can be fabricated for one, two, or three dimensions. An example of a one-dimensional photonic crystal is a grating structure formed from alternating layers of high refractive index and low refractive index materials. Such gratings are commonly referred to as Bragg or volume gratings. A two-dimensional photonic crystal is formed by a two-dimensional array of elements of a first refractive index immersed in a material of a second refractive index. Two-dimensional photonic crystals can be fabricated by photolithography, or by drilling holes in a suitable substrate. Fabrication methods for three-dimensional photonic crystal include drilling under different angles, stacking multiple 2-D layers on top of each other and direct laser writing. Another approach is forming a matrix of spheres or instigating self-assembly of spheres in a matrix and dissolving the sphere. In many cases, the regions of low refractive index are provided by air. Two-dimensional photonic crystals can be any of the 5 2-D Bravais lattices. Typically, photonic crystals have periodicity of around half the wavelength of the light to be diffracted. The low dielectric can be provided by air. Three-dimensional photonic crystals can provide any of the fourteen 3D Bravais lattices.

In many of the embodiments of the invention to be described below, a photonic crystal including a grating structure immersed at least partially in air can be formed from a mixture of liquid crystal and monomer materials using a phase separation process taking place under holographic exposure. After exposure is complete liquid crystal can be removed from the surface relief grating. In many embodiments, the grating structure can be refilled with a different material such as a LC of a different index and different other properties. In many embodiments, the grating structure can be partially backfilled to provide a hybrid surface relief and volume grating structure. In many embodiments, the grating structure can be refilled with an organic or inorganic material with a high refractive index. In many embodiments, the grating can have material properties varying spatially can varying depth. In many embodiments, the backfilling can be a diffusion process. In many embodiments, the grating structure can be backfilled with chemical components that are phase separated under a laser exposure process. In many embodiments, backfilling can be carried out in the presence of thermal, mechanical, chemical or electromagnetic stimuli for influencing annealing and alignment of the grating structure.

In some embodiments, the diffractive surface can be a metasurface, where for the purposes of discussing the invention a metasurface is defined as a surface structure supporting subwavelength in-plane features that are used to realize a desirable functionality by locally managing the interaction between the metasurface and incident electromagnetic fields. Metasurfaces are typically formed on sub-wavelength thickness substrates. However, much thicker substrates may be used. Metasurfaces may have diffractive features of nanometre-scale. This enables a much greater degree of wavefront phase and amplitude control than can be achieved using conventional diffractive optical elements (DOEs). In many applications, diffraction limited performance is a realistic goal for optical components (including lenses) made using metasurfaces. Conventional DOEs operate at the micron scale with feature heights that are significant fractions of visible band wavelengths, resulting in more limited capacity for wavefront amplitude and phase control, especially when manufacturing tolerances are taken into account.

In many embodiments, a photonic crystal provides an input grating. As will be discussed in the following paragraphs a photonic crystal formed by liquid crystal extraction offers potential benefits in terms of improving the angular bandwidth of a waveguide and can be used to control the polarization characteristics of waveguided light. The various embodiments to be discussed can be applied in HUDs for automotive applications, near eye displays and other waveguide display applications. In many embodiments, photonic crystal according to the principles of the invention can be used in single axis or in dual expansion waveguides. In some embodiments, photonic crystals can be used to provide beam expansion gratings. In some embodiments, photonic crystals can be used to provide output gratings. In some embodiments, photonic crystals can be used to diffract more than one primary color. In some embodiments, waveguides incorporating photonic crystals can be arranged in stacks of waveguides each having grating prescription for diffracting a unique spectral bandwidth.

DETAILED DESCRIPTION

Figure 1B:
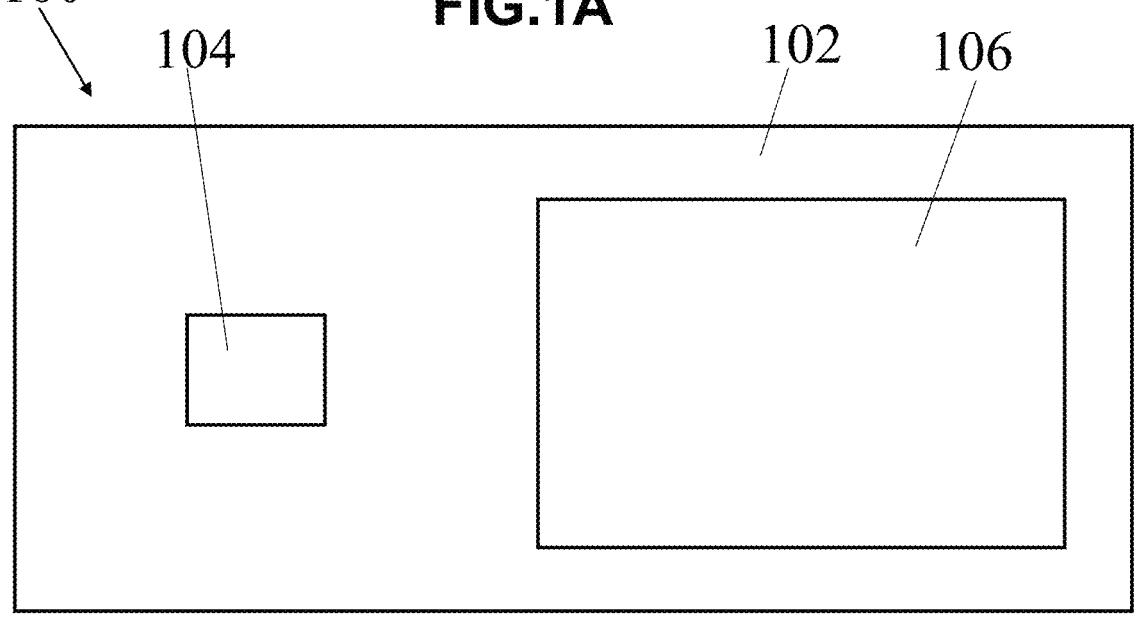
FIG. 1B shows a plan view of the waveguide shown in FIG. 1A.

FIG. 1A illustrates a profile view of a waveguide-based display in accordance with an embodiment of the invention. The waveguide-based display 100 includes a waveguide 102 including an input coupler 104 and an output coupler 106. Image containing light is incoupled by the input coupler 104 into total internal reflection (TIR) in the waveguide 102. The TIR light is then outcoupled by the output coupler 106 into outcoupled light 110. FIG. 1B shows a plan view of the waveguide shown in FIG. 1A.

Figure 1C:
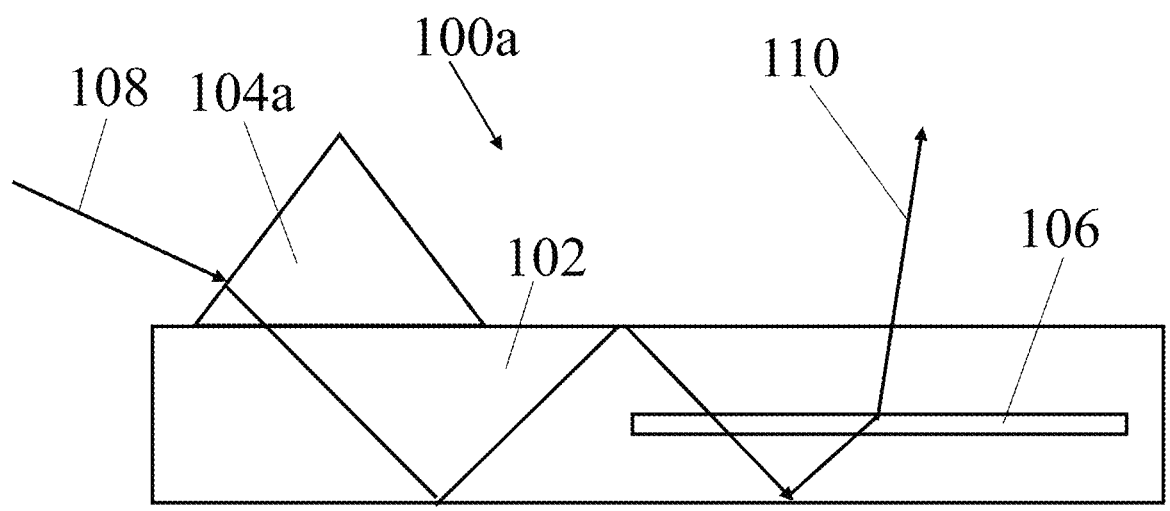
FIG. 1C shows a profile view of a waveguide-based display in accordance with an embodiment of the invention.

FIG. 1C shows a profile view of a waveguide-based display in accordance with an embodiment of the invention. The waveguide-based display 100a shares many components identically labelled with the waveguide-based display 100 of FIGS. 1A and 1B. The description of those components is applicable here and will not be repeated in detail. The waveguide-based display 100a includes an input prism 104a which operates to incouple image containing light 108 into TIR in the waveguide 102.

Figure 2A:
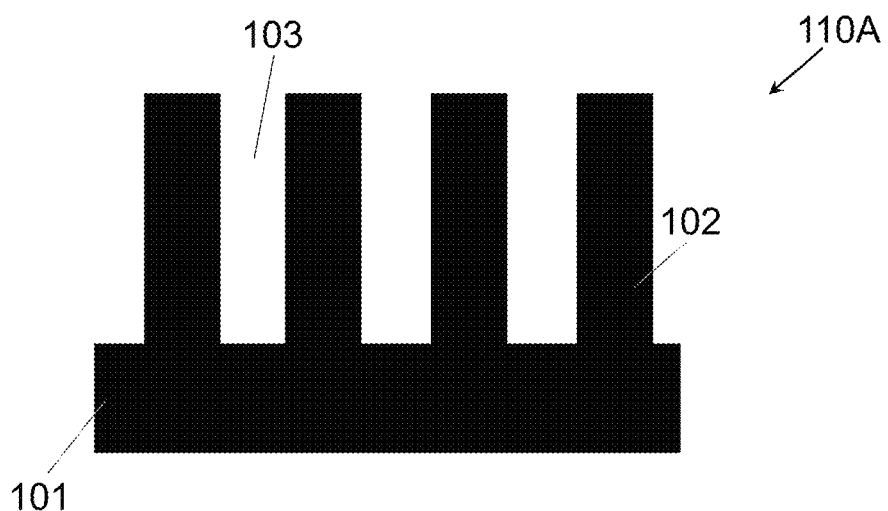
FIG. 2A illustrates a portion of a surface relief grating in accordance with an embodiment of the invention.

FIG. 2A illustrates a portion of a surface relief grating in accordance with an embodiment of the invention. The surface relief grating 110A includes an optical substrate 101 supporting grating elements 102 separated by air gaps 103.

Figure 2B:
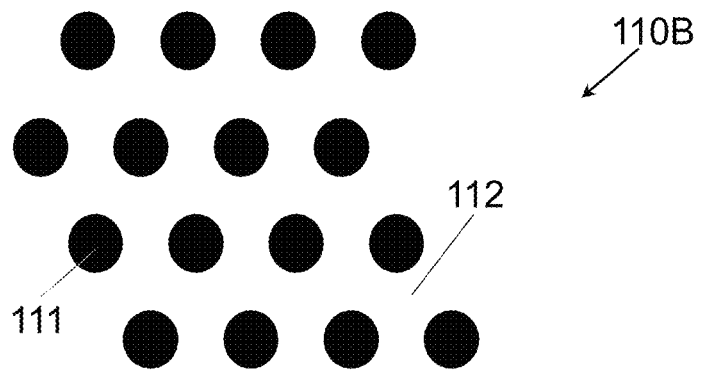
FIG. 2B illustrates a cross-sectional view of a photonic crystal in accordance with an embodiment of the invention.

FIG. 2B illustrates a cross-sectional view of a photonic crystal in accordance with an embodiment of the invention. The photonic crystal 110B includes a three-dimensional lattice elements including grating features 111 separated by air spaces 112. In some embodiments, the lattice elements can include air regions surround by an optical material. In some embodiments, the lattice can be one of the Bravais lattices. Photonic crystals are described in detail in PCT App. No. PCT/US2021/072548, entitled "Photonic Crystals and Methods for Fabricating the Same" and filed on Nov. 22, 2021, which is hereby incorporated by reference in its entirety.

Figure 3:
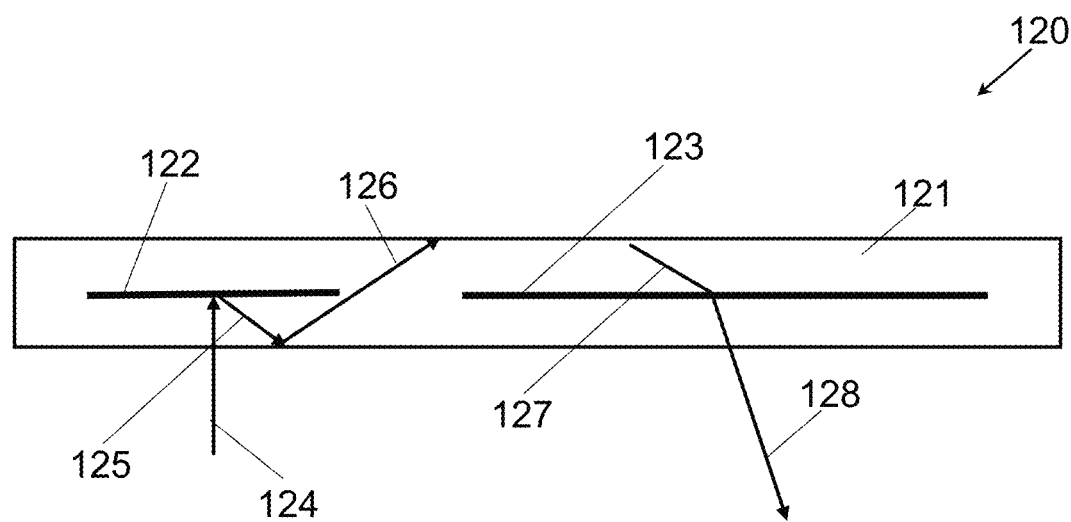
FIG. 3 conceptually illustrates a cross-sectional view of a waveguide-based display in accordance with an embodiment of the invention.

FIG. 3 conceptually illustrates a cross-sectional view of a waveguide-based display in accordance with an embodiment of the invention. The waveguide-based display 120 includes a waveguide 121 including a reflective input grating 122 and an output grating 123. Input light 124 from a picture generation unit (PGU) is coupled into the waveguide by the input grating 122 and propagates along a total internal reflection path indicated by the rays 125-127 before being extracted by the output grating 123 which provides one dimensional beam expansion into output light 128. In some embodiments, the waveguide further supports a fold grating.

Figure 4:
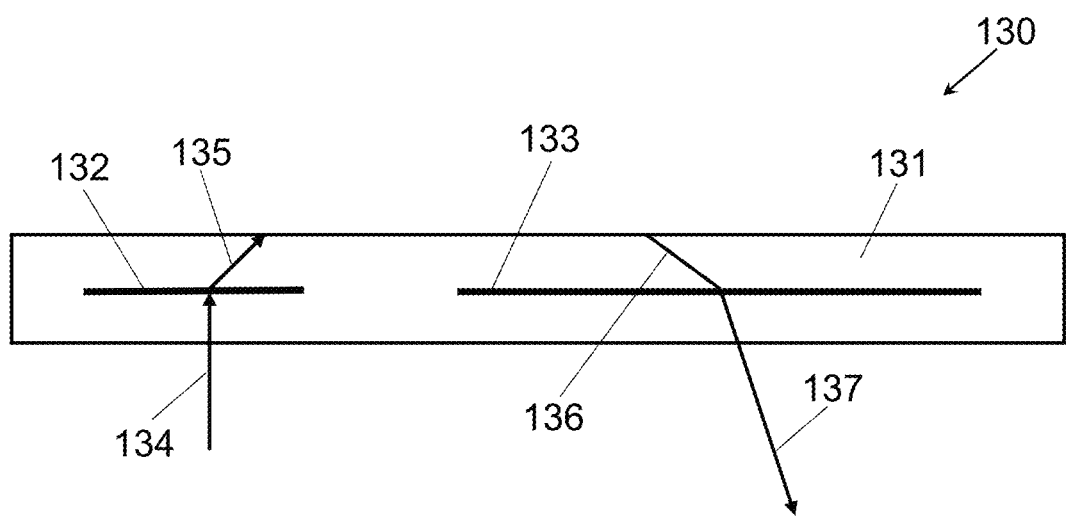
FIG. 4 conceptually illustrates a cross-sectional view of a waveguide-based display in accordance with an embodiment of the invention.

FIG. 4 conceptually illustrates a cross-sectional view of a waveguide-based display in accordance with an embodiment of the invention. The waveguide-based display 130 includes a waveguide 131 supporting an input grating 132 and an output grating 133. Input light 134 from a picture generation unit (PGU) is coupled into the waveguide 131 by the input grating 132 and propagates along a total internal reflection path indicated by the rays 135-136 before being extracted by the output grating 133 which provides one dimensional beam expansion. In many embodiments, at least one of the gratings is a photonic crystal formed using a liquid crystal extraction process.

Figure 5:
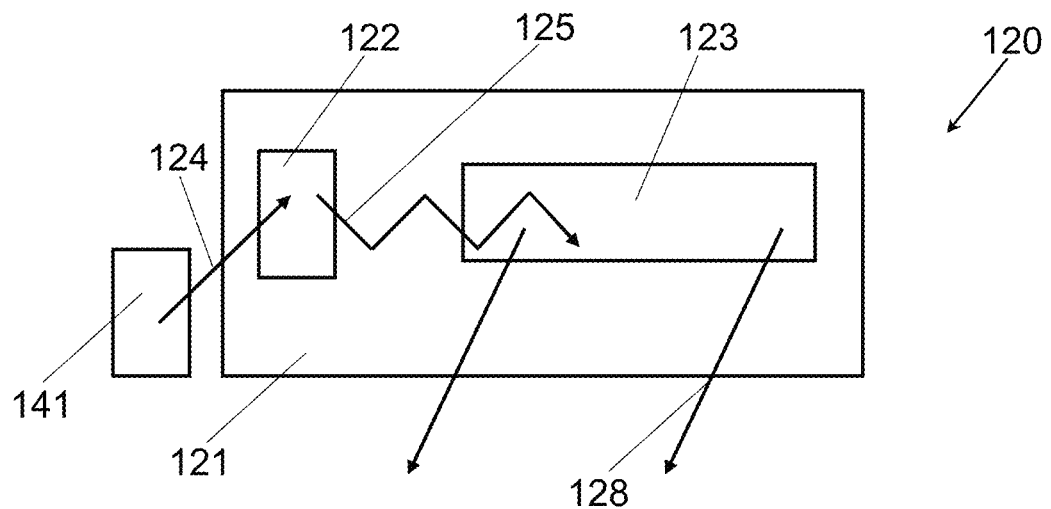
FIG. 5 conceptually illustrates a plan view of the waveguide-based display described in connection with FIG. 3.

FIG. 5 conceptually illustrates a plan view of the waveguide-based display 120 described in connection with FIG. 3. FIG. 5 further shows the PGU 141 which outputs image containing light 124 into the input grating 122.

Figure 6:
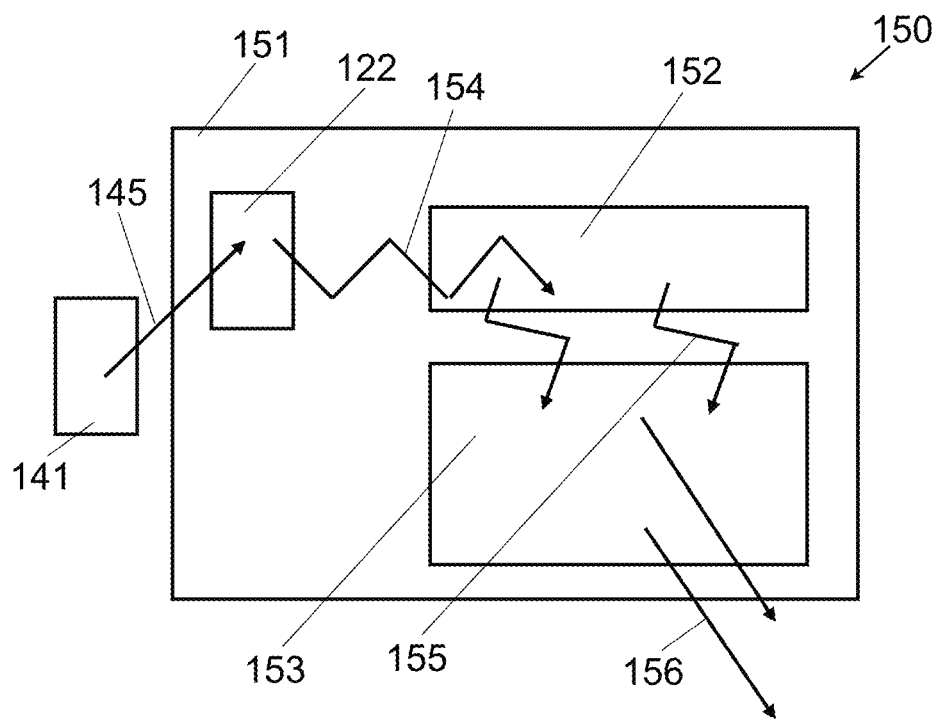
FIG. 6 conceptually illustrates in cross section a waveguide-based display in accordance with an embodiment of the invention.

FIG. 6 conceptually illustrates in cross section a waveguide-based display in accordance with an embodiment of the invention. The waveguide-based display 150 includes a waveguide 151 supporting a reflection input grating 122, a fold grating 152 which provides a first direction beam expansion, and an output grating 153. Input light 145 from a PGU 141 is coupled into the waveguide 151 by the input grating 122 and propagates along total internal reflection paths indicated by the rays 154,155 before being extracted 156 by the output grating 153 which provides a second beam expansion orthogonal to the first beam expansion. Rays in FIGS. 5-7 (such as rays 154,155) are in TIR between the reflection faces of the waveguide. The ray bounces illustrated would only be seen in the waveguide cross section.

In many embodiments, at least one of the gratings 122, 152,153 is a photonic crystal formed using a liquid crystal extraction process.

Figure 7:
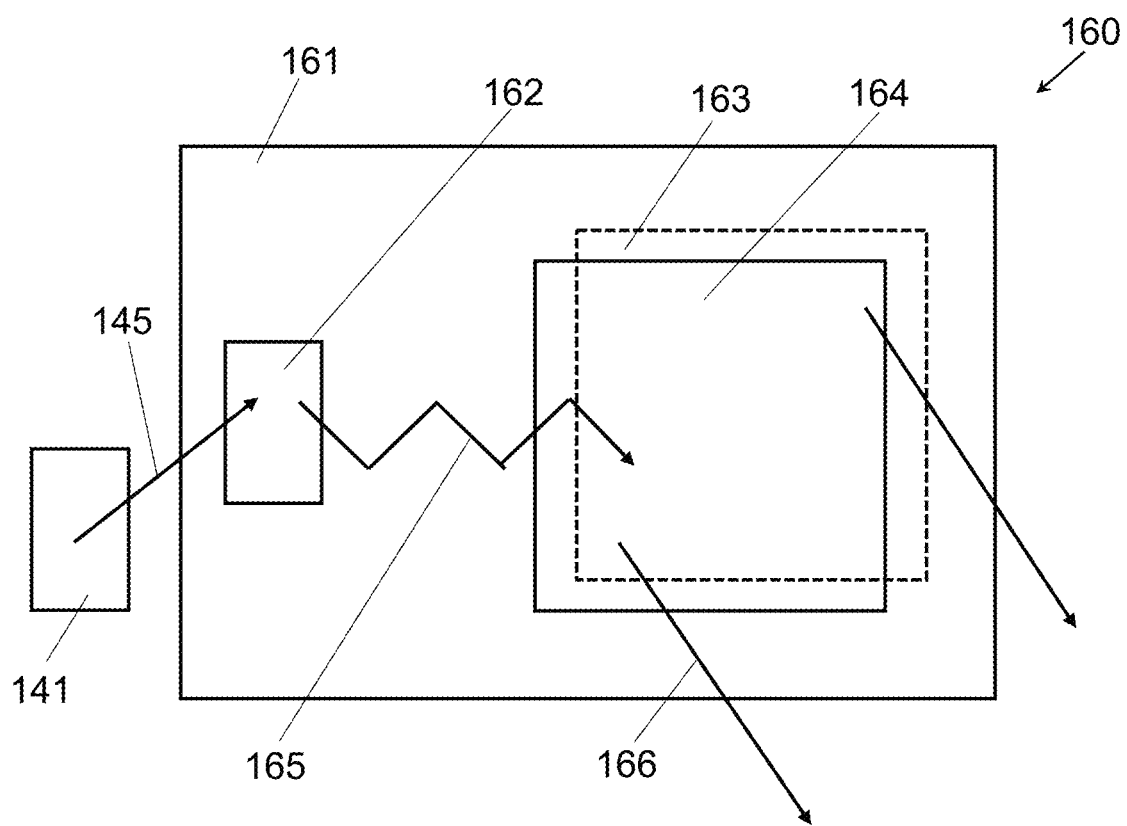
FIG. 7 conceptually illustrates a plan view of a waveguide-based display in accordance with an embodiment of the invention.

FIG. 7 conceptually illustrates a plan view of a waveguide-based display in accordance with an embodiment of the invention. The waveguide-based display 160 includes a waveguide 161 which supports an input grating 162, and a pair of overlapping or multiplexed fold gratings 163,164. A PGU 141 outputs image containing light 145 into the input grating 162. The multiplexed fold gratings 163,164 provide beam expansion in two orthogonal dimensions. The total internal reflection path from the input grating 162 to the fold gratings 163,164 and the pupil-expanded light extracted from the waveguide 161 by the overlapping fold gratings 163,164 are represented by the rays 165,166. In many embodiments at least one of the gratings 162,163,164 is a photonic crystal formed using a liquid crystal extraction process.

In some embodiments, LC can be extracted or evacuated from the SBG to provide an evacuated periodic grating (EPG). EPGs can be characterized as a surface relief grating (SRG) that has properties very similar to a Bragg grating due to the depth of the SRG structure (which is much greater than that practically achievable using surface etching and other conventional processes commonly used to fabricate SRGs). The LC can be extracted using a variety of different methods, including but not limited to flushing with isopropyl alcohol and solvents. In many embodiments, one of the transparent substrates of the SBG is removed, and the LC is extracted. In further embodiments, the removed substrate is replaced. The SRG can be at least partially backfilled with a material of higher or lower refractive index. Such gratings offer scope for tailoring the efficiency, angular/spectral response, polarization, and other properties to suit various waveguide applications. Examples of EPGs and methods for manufacturing EPGs are discussed in US Pat. Pub. No. 2021/0063634, entitled "Evacuating Bragg Gratings and Methods of Manufacturing" and filed Aug. 28, 2020 which is hereby incorporated by reference in its entirety for all purposes.

In many embodiments a photonic crystal formed by liquid crystal extraction provide an EPG which may be a deep surface relief grating (SRG). In many embodiments, a deep SRG formed using a liquid crystal extraction process can typically have a thickness in the range 1-3 micron with a Bragg fringe spacing 0.35 micron to 0.80 micron. In many embodiments, the condition for a deep SRG is characterized by a high grating depth to fringe spacing ratio. In some embodiments, the condition for the formation of a deep SRG is that the grating depth can be approximately twice the grating period. Modelling such SRGs using the Kogelnik theory can give reasonably accurate estimates of diffraction efficiency avoiding the need for more advanced modelling which typically entails the numerical solution of Maxwell's equations. The grating depths that can be achieved using liquid crystal removal from HPDLC gratings greatly surpass those possible using conventional nanoimprint lithographic methods, which do not achieve the condition for a deep SRG, typically providing only 250-300 nm. depth for grating periods 350-460 nm. (Pekka Äyräs, Pasi Saarikko, Tapani Levola, "Exit pupil expander with a large field of view based on diffractive optics", Journal of the SID 17/8, (2009), pp 659-664). Although deep SRGs may diffract S-polarization, deep SRGs can provide a range of polarization response characteristics depending on the thickness of the grating prescription and, in particular, the grating depth. Deep SRGs can also be used in conjunction with conventional Bragg gratings to enhance the color, uniformity and other properties of waveguide displays.

SRGs have been fabricated in glassy monomeric azobenzene materials using laser holographic exposure (O. Sakhno, L. M. Goldenberg, M. Wegener, J. Stumpe, "Deep surface relief grating in azobenzene-containing materials using a low intensity 532 nm laser", Optical Materials: X, 1, (2019), 100006, pp 3-7. The Sakhno reference also discloses how SRGs can be recorded in a holographic photopolymer using two linearly orthogonally polarized laser beams.

Deep SRG and Bragg gratings are also disclosed in Kiyoshi Yokomori, "Dielectric surface-relief gratings with high diffraction efficiency" Applied Optics; Vol. 23; Issue 14; (1984); pp. 2303-2310 which discloses the investigation of the diffraction properties of dielectric surface-relief gratings by solving Maxwell's equations numerically. The diffraction efficiency of a grating with a groove depth about twice as deep as the grating period was found to be comparable with the efficiency of a volume phase grating. The modelling by Yokomori predicted that dielectric surface-relief gratings interferometrically recorded in photoresist can possess a high diffraction efficiency of up to 94% (throughput efficiency 85%). The equivalence of deep SRGs and Bragg gratings is also discussed in another article by Golub (M. A. Golub, A. A. Friesem, L. Eisen "Bragg properties of efficient surface relief gratings in the resonance domain", Optics Communications; 235; (2004); pp 261-267). A further article by Gerritsen discusses the formation of Bragg-like SRGs in photoresist (Gerritsen H J, Thornton D K, Bolton S R; "Application of Kogelnik's two-wave theory to deep, slanted, highly efficient, relief transmission gratings" Applied Optics; Vol. 30; Issue 7; (1991); pp 807-814).

The invention provides a method for making a surface relief grating that can offer very significant advantages over nanoimprint lithographic process particle for slanted gratings. Bragg gratings of any complexity can be made using interference or master and contact copy replication. In some embodiments after removing the LC the SRG can be back filled with a material with different properties to the LC. This allows a Bragg grating with modulation properties that are not limited by the grating chemistry needed for grating formation. In some embodiments the deep SRG can be partially backfilled with LC to provide a hybrid SRG/Bragg grating. Alternatively, in some embodiments, the refill step can be avoided by removing just a portion of the LC from the LC rich regions of the HPDLC to provide a hybrid SRG/Bragg grating. The refill approach has the advantage that a different LC can be used to form the hybrid grating. In some embodiments, the backfill materials can be deposited using inkjet process.

Figure 8A:
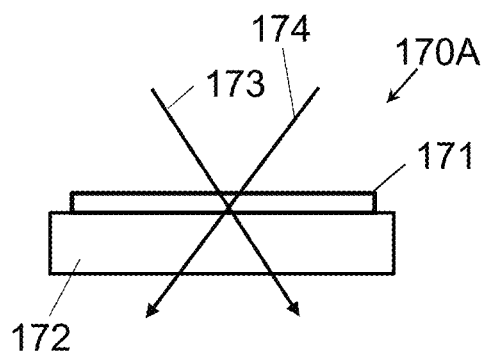
FIGS. 8A-8D illustrate a processing apparatus that can be used in a method for fabricating deep SRGs or EBGs in accordance with an embodiment.

FIGS. 8A-8D illustrate a processing apparatus that can be used in a method for fabricating deep SRGs or EBGs in accordance with an embodiment. FIG. 8A conceptually illustrates an apparatus 170A that can be used in a step of a method for fabricating a surface relief grating in which a mixture 171 of monomer and liquid crystal deposited on a transparent substrate 172 is exposed to holographic exposure beams 173,174, in accordance with an embodiment of the invention. In some examples, the mixture may also include at least one of a photoinitiator, a coinitiator, a multifunctional thiol, adhesion promoter, surfactant, and/or additional additives. In some embodiments, the monomer may be isocyanate-acrylate based or thiolene based. In some embodiments, the liquid crystal may be a full liquid crystal mixture or a liquid crystal single only including a portion of a full liquid crystal mixture. Various examples of liquid crystal singles include one or both of cyanobiphenyls or pentylcyanobiphenyls. In some embodiments, liquid crystal may be replaced with another substance that phase separates with the monomer during exposure to create polymer rich regions and substance rich regions. Advantageously, the substance and liquid crystal singles may be a cost-effective substitute to full liquid crystal mixtures which are removed at a later step as described below.

Figure 8B:
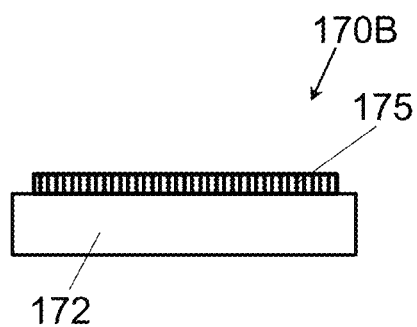

FIG. 8B conceptually illustrates an apparatus 170B that can be used in a step of a method for fabricating a surface relief grating from an HPDLC Bragg grating 175 formed on a transparent substrate using the holographic exposure beams, in accordance with an embodiment of the invention. The holographic exposure beams may transform the monomer into a polymer in some areas. The holographic exposure beams may include intersecting recording beams and include alternating bright and dark illumination regions. A polymerization-driven diffusion process may cause the diffusion of monomers and LC in opposite directions, with the monomers undergoing gelation to form polymer-rich regions (in the bright regions) and the liquid crystal becoming trapped in a polymer matrix to form liquid crystal rich regions (in the dark regions).

Figure 8C:
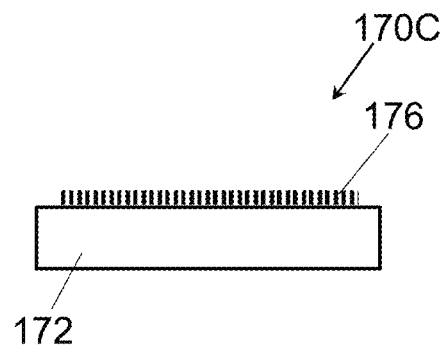
Figure 8D:
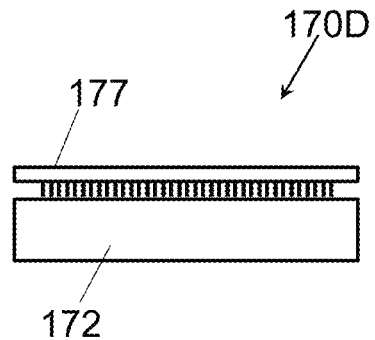

FIG. 8C conceptually illustrates an apparatus 170C that can be used in a step of a method for fabricating a deep polymer surface relief grating 176 or EBG in which liquid crystal is removed from an HPDLC Bragg grating of FIG. 1B to form a polymer surface relief grating in accordance with an embodiment of the invention. Advantageously, a polymer surface relief grating 176 may include a large depth with a comparatively small grating period in order to form a deep SRG. The liquid crystal may be removed by washing with a solvent such as isopropyl alcohol (IPA). The solvent should be strong enough to wash away the liquid crystal but weak enough to maintain the polymer. In some embodiments, the solvent may be chilled below room temperature before washing the grating. FIG. 8D conceptually illustrates an apparatus 170D that can be used in a step of a method for fabricating a polymer surface relief grating in which the polymer surface relief grating is covered with a protective layer 177 in accordance with an embodiment of the invention.

Figure 9:
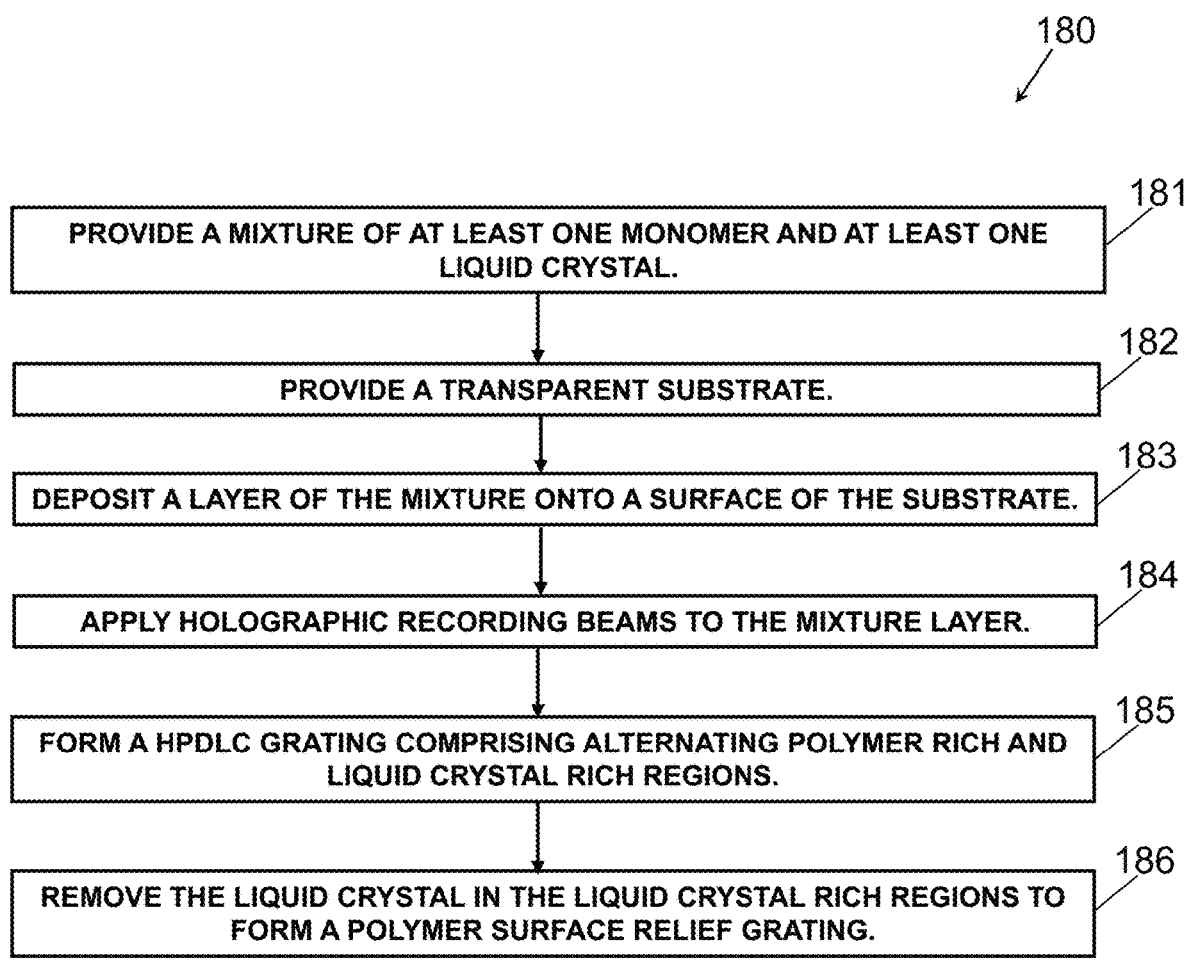
FIG. 9 conceptually illustrates a method for forming a surface relief grating from a HPDLC Bragg grating formed on a transparent substrate in accordance with an embodiment of the invention.

FIG. 9 conceptually illustrates a method for forming a surface relief grating from a HPDLC Bragg grating formed on a transparent substrate in accordance with an embodiment of the invention. As shown, the method 180 of forming a surface relief grating is provided. Referring to the flow diagram, method 180 includes providing (181) a mixture of at least one monomer and at least one liquid crystal. A transparent substrate can be provided (182). A layer of the mixture can be deposited (183) onto a surface of the substrate. Holographic recording beams can be applied (184) to the mixture layer. A HPDLC grating comprising alternating polymer rich and liquid crystal rich regions can be formed (185). The liquid crystal in the liquid crystal in the liquid crystal rich regions can be removed (186) to form a polymer surface relief grating.

As discussed above, in many the embodiments, the invention also provides a method for fabricating a hybrid surface relief/Bragg grating. FIG. 10A conceptually illustrates apparatus 190A that can be used in a step of a method for fabricating a hybrid surface relief/Bragg grating in which a mixture 191 of monomer and liquid crystal deposited on a transparent substrate 212 is exposed to holographic exposure beams 193,194, in accordance with an embodiment of the invention. FIG. 10B conceptually illustrates apparatus 190B that can be used in a step of a method for fabricating a surface relief grating from a HPDLC Bragg grating 195 formed on the transparent substrate using the holographic exposure beams in accordance with an embodiment of the invention. FIG. 10C conceptually illustrates apparatus 190C that can be used in a step of a method for fabricating a surface relief grating in which liquid crystal is removed from the HPDLC Bragg grating to form a surface relief grating 196 in accordance with an embodiment of the invention. FIG. 10D conceptually illustrates apparatus 190D that can be used in a step of a method for fabricating a surface relief grating in which the surface relief grating formed in the step illustrated in FIG. 10C is partially refilled with liquid crystal to form a hybrid surface relief/Bragg grating 197 in accordance with an embodiment of the invention. FIG. 10E conceptually illustrates apparatus 190E that can be used in a step of a method for fabricating a surface relief grating in which the hybrid surface relief Bragg grating formed in the step illustrated in FIG. 10D is covered with a protective layer 198, in accordance with an embodiment of the invention.

Figure 11:
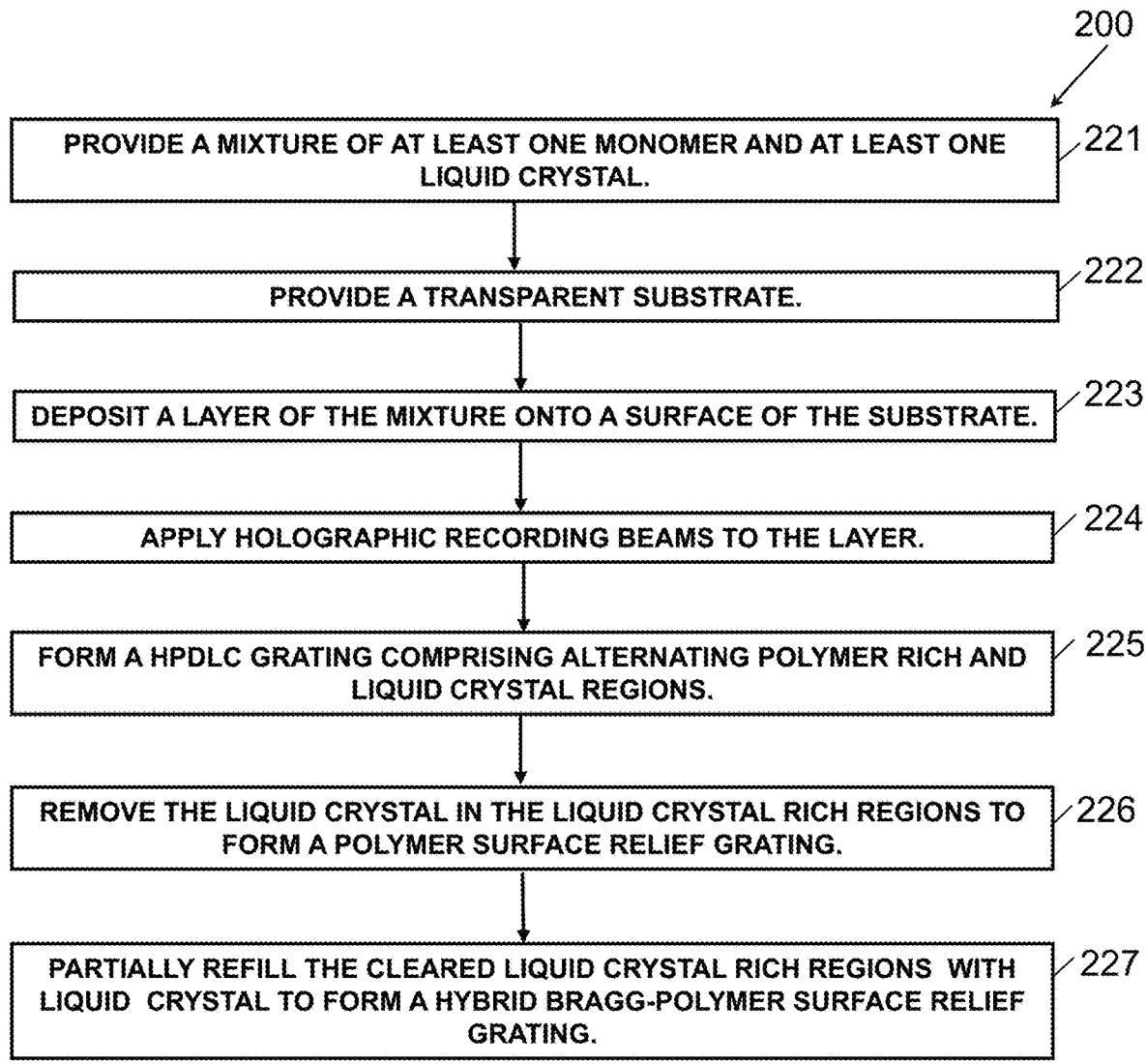
FIG. 11 is a flowchart showing an exemplary method for forming a hybrid surface relief-Bragg grating from a HPDLC Bragg grating formed on a transparent substrate in accordance with an embodiment of the invention.

FIG. 11 is a flowchart showing an exemplary method for forming a hybrid surface relief-Bragg grating from a HPDLC Bragg grating formed on a transparent substrate in accordance with an embodiment of the invention. As shown, the method 220 of forming hybrid surface relief-Bragg grating is provided. Referring to the flow diagram, method 220 includes providing (221) a mixture of at least one monomer and at least one liquid crystal. The at least one monomer may include an isocyanate-acrylate monomer. Providing the mixture of the monomer and the liquid crystal may also include mixing one or more of the following with the at least one monomer and the liquid crystal: photoinitiator, coinitiator, multifunctional thiol, and/or additional additives. This mixture may be allowed to rest in order to allow the coinitiator to catalyze a reaction between the monomer and the thiol. The rest period may occur in a dark space or a space with red light (e.g. infrared light) at a cold temperature (e.g. 20° C.) for a period of approximately 8 hours. After resting, additional monomers may be mixed into the monomer. This mixture may be then strained or filtered through a filter with a small pore size (e.g. 0.45 µm pore size). After straining this mixture may be stored at room temperature in a dark space or a space with red light before coating.

Next, a transparent substrate can be provided (222). In certain embodiments, the transparent substrate may be a glass substrate or a plastic substrate. A non-stick coating may be applied to the transparent substrate before the mixture is coated on the substrate. A layer of the mixture can be deposited (223) onto a surface of the substrate. In some embodiments, the mixture is sandwiched between the transparent substrate and another substrate using glass spacers to maintain internal dimensions. Holographic recording beams can be applied (224) to the mixture layer. The holographic recording beams may be a two-beam interference pattern which may cause phase separation of the LC and the polymer. After applying the holographic recording beams, the mixture may be cured. The curing process may include leaving the mixture under low-intensity white light for a period of time under the mixture fully cures. The low intensity white light may also cause a photo-bleach dye process to occur. Thus, an HPDLC grating having alternating polymer rich and liquid crystal rich regions can be formed (225). In some embodiments, the curing process may occur in 2 hours or less. After curing, one of the substrates may be removed exposing the HPDLC grating.

HPDLC grating may include alternating sections of liquid crystal rich regions and polymer regions. The liquid crystal in the liquid crystal rich regions can be removed (226) to form polymer surface relief gratings or EBGs which is a form of deep SRGs. The liquid crystal may be removed by gently immersing the grating into a solvent such as isopropyl alcohol (IPA). The IPA may be kept at a lower temperature while the grating is immersed in the IPA. The grating is them removed from the solvent and dried. In some embodiments, the grating is dried using a high flow air source such as compressed air. After the LC is removed from the grating, a polymer-air surface relief Bragg grating is formed. The steps 221-226 of FIG. 11 roughly correspond to the steps described in connection with FIG. 10 in creating a polymer-air SRG and thus these descriptions are applicable to FIG. 11.

Further, method 220 includes at least partially refilling (227) cleared liquid crystal rich regions with liquid crystal to form hybrid SRGs. The refilled liquid crystal may be of different consistency to the previously removed liquid crystal that was previously removed in step 226. Further, it is appreciated that the liquid crystal removed in step 226 may only be partially removed in an alternative method to forming hybrid SRGs. Advantageously, hybrid SRGs may provide the ability to tailor specific beneficial characteristics of the SRGs. One particular characteristic that may be improved by the inclusion of at least some liquid crystal within the SRGs is a decrease in haze properties.

As shown in FIG. 10E, the formed surface relief grating can further be covered with a protective layer. In some instances, the protective layer may be a moisture and oxygen barrier with scratch resistance capabilities. In some instances, the protective layer may be a coating that does not fill in air gap regions where LC that was removed once existed. The coating may be deposited using a low temperature process. In some implementations, the protective layer may have anti-reflective (AR) properties. The coating may be a silicate or silicon nitride. The coating process may be performed by a plasma assisted chemical vapor deposition (CVD) process such as a plasmatreat nanocoating process. The coating may be a parylene coating. The protective layer may be a glass layer. A vacuum or inert gas may fill the gaps where LC that was removed once existed before the protective layer is implemented. In some embodiments, the coating process may be integrated with the LC removal process (226). For example, a coating material may be mixed with the solvent which is used to wash the LC from the grating. In some implementations, the coating material may be a material with a lower or higher refractive index than the polymer and fill the spaces between adjacent polymer portions. The refractive index difference between the polymer and the coating material may allow the polymer SRGs to continue to diffract. Hybrid SRG/Bragg gratings suffer from the shallowness of the SRG structure which leads to low SRG diffraction efficiencies. The method disclosed in the present application allows more effective SRG structures to be formed by optimised the depth of the liquid crystal in the liquid crystal rich regions such that the SRG has a high depth to grating pitch ratio while allowing the Bragg grating to be sufficiently thick for efficient diffraction. In many embodiments the Bragg grating component of the hybrid grating can have a thickness in the range 1-3 micron. In many embodiments, the SRG component of the hybrid grating can have a thickness in the range 0.25-3 micron. The initial HPDLC grating would have a thickness of equal to the sum of the final SRG and Bragg grating components. The thickness ratio of the two grating components depends on the waveguide application.

In many embodiments, the refill depth of the liquid crystal regions of the grating can be varied across the grating to provides spatially varying relative SRG/Bragg grating strengths. In many embodiments, as an alternative to liquid crystal removal and refill, the liquid crystal in the liquid crystal rich grating regions can be totally or partially removed. In many embodiments, the liquid crystal used to refill or partially refill the liquid crystal-cleared regions can have a different chemical composition to the liquid crystal used to form the HPDLC grating. In some embodiments, a first liquid crystal with phase separation properties compatible with the monomer can be specified to provide a HPDLC grating with optimal modulation and grating definitions while a second refill liquid crystal can be specified to provide desired index modulation properties in the final hybrid grating. In many embodiments, the Bragg portion of the hybrid grating can be switchable with electrodes applied to surfaces of the substrate and the cover layer. In many embodiments the refill liquid crystals can contain additives for improving switching voltage, switching time, polarization, transparency, and other parameters. A hybrid grating formed using a refill process would have the further advantages that the LC would be form a continuum (rather than an assembly of LC droplets) thereby reducing haze.

In many embodiments, a deep SRG can provide a means for controlling polarization in a waveguide. SBGs are normally P-polarization selective leading to a 50% efficiency loss with unpolarized light sources such as OLEDs and LEDs. Hence combining S-polarization diffracting and P-polarization diffracting gratings as discussed above can provide a theoretical 2× improvement over waveguides using P-diffracting gratings only. In some embodiments a S-polarization diffracting grating can be provided by a Bragg grating formed in a conventional holographic photopolymer. In some embodiments an S-polarization diffracting grating can be provided by a Bragg grating formed in a HPDLC with birefringence altered using an alignment layer or other process for realigning the liquid crystal directors. In some embodiments an S-polarization diffracting grating can be formed using liquid crystals, monomers and other additives that naturally organize into S-diffracting gratings under phase separation. In many embodiments, an S-polarization diffracting grating can be provided by a surface relief grating (SRG). The inventors have discovered by experimentation that a deep SRG exhibiting high S-diffraction efficiency (up to 99%) and low P-diffraction efficiency can be formed by removing the liquid crystal from an SBG formed from holographic phase separation of a liquid crystal and monomer mixture.

Figure 12:
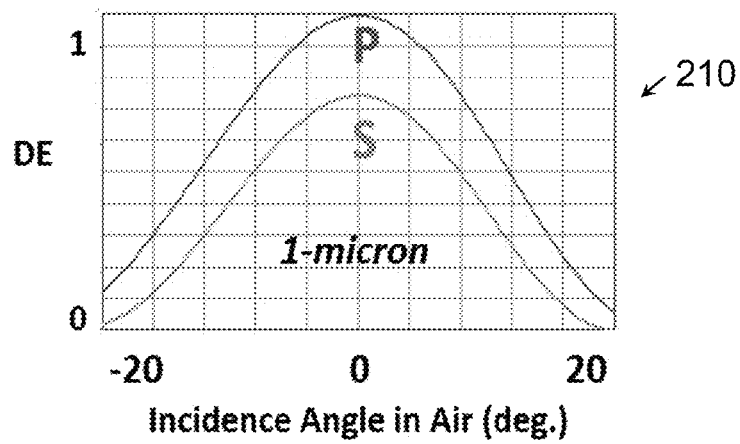
FIG. 12 is a graph showing calculated P-polarized and S-polarized diffraction efficiency versus incidence angle for a 1-micron thickness deep surface relief grating demonstrating that in this case high S and P response can be achieved.
Figure 13:
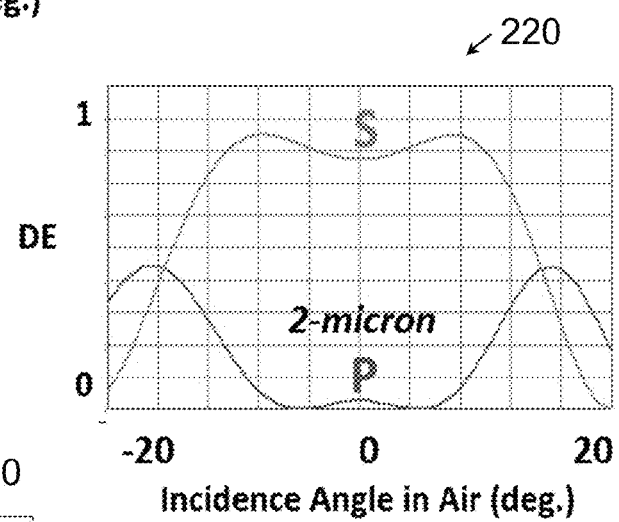
FIG. 13 is a graph showing calculated P-polarized and S-polarized diffraction efficiency versus incidence angle for a 2-micron thickness deep surface relief grating, demonstrating that in this case the S-polarization response is dominant over most of the angular range of the grating.
Figure 14:
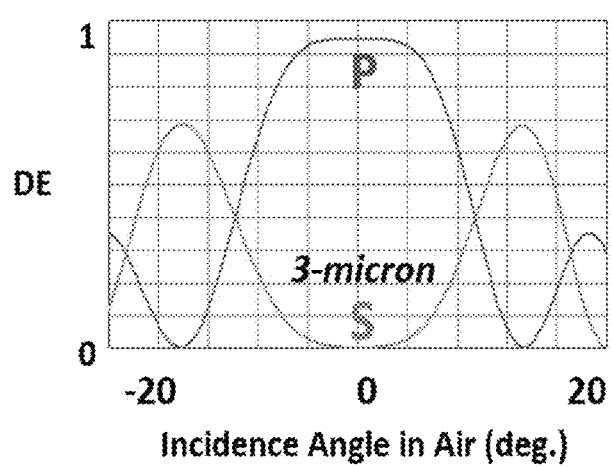
FIG. 14 is a graph showing calculated P-polarized and S-polarized diffraction efficiency versus incidence angle for a 3-micron thickness, demonstrating that in this case the P-polarization response is dominant over a substantial portion of the angular range of the grating.

Deep SRGs can also provide other polarization response characteristics. Several prior art theoretical studies such as an article by Moharam (Moharam M. G. et al. "Diffraction characteristics of photoresist surface-relief gratings", Applied Optics, Vol. 23, page 3214, Sep. 15, 1984) point to deep surface relief gratings having both S and P sensitivity with S being dominant. In many embodiments, the thickness of the SRG can be adjusted to provide a variety of S and P diffraction characteristics. In some embodiments, diffraction efficiency can be high for P across a spectral bandwidth and angular bandwidth and low for S across the same spectral bandwidth and angular bandwidth. In some embodiments, diffraction efficiency can be high for S across the spectral bandwidth and angular bandwidth and low for P across the same spectral bandwidth and angular bandwidth. In some embodiments, high efficiency for both S and P polarized light can be provided. Analysis of a SRG of refractive index 1.6 immersed in air (hence providing an average grating index of 1.3) of period 0.48 micron, with a 0 degrees incidence angle and 45 degree diffracted angle for a wavelength of 0.532 micron have been performed. FIG. 12 is a graph 210 showing calculated P-polarized and S-polarized diffraction efficiency versus incidence angle for a 1-micron thickness deep surface relief grating demonstrating that in this case high S and P response can be achieved. FIG. 13 is a graph 220 showing calculated P-polarized and S-polarized diffraction efficiency versus incidence angle for a 2-micron thickness deep surface relief grating, demonstrating that in this case the S-polarization response is dominant over most of the angular range of the grating. FIG. 14 is a graph 230 showing calculated P-polarized and S-polarized diffraction efficiency versus incidence angle for a 3-micron thickness, demonstrating that in this case the P-polarization response is dominant over a substantial portion of the angular range of the grating.

In many embodiments, the photonic crystal can be a reflection Bragg grating formed by a LC extraction process. A reflection Bragg grating made using phase separation followed by LC subtraction can enable wide angular and spectral bandwidth. In many embodiments replacing the current input SBG with a reflection photonic crystal can be used to reduce the optical path from the PGU to the waveguide. In some embodiments, the PGU pupil and the waveguide can be in contact. In many embodiments, the reflection Bragg grating can be approximately 3 microns in thickness. The diffracting properties of an LC extracted Bragg grating mainly result from the index gap between the polymer and air (not from the depth of the grating as in the case of a SRG).

Figure 15A:
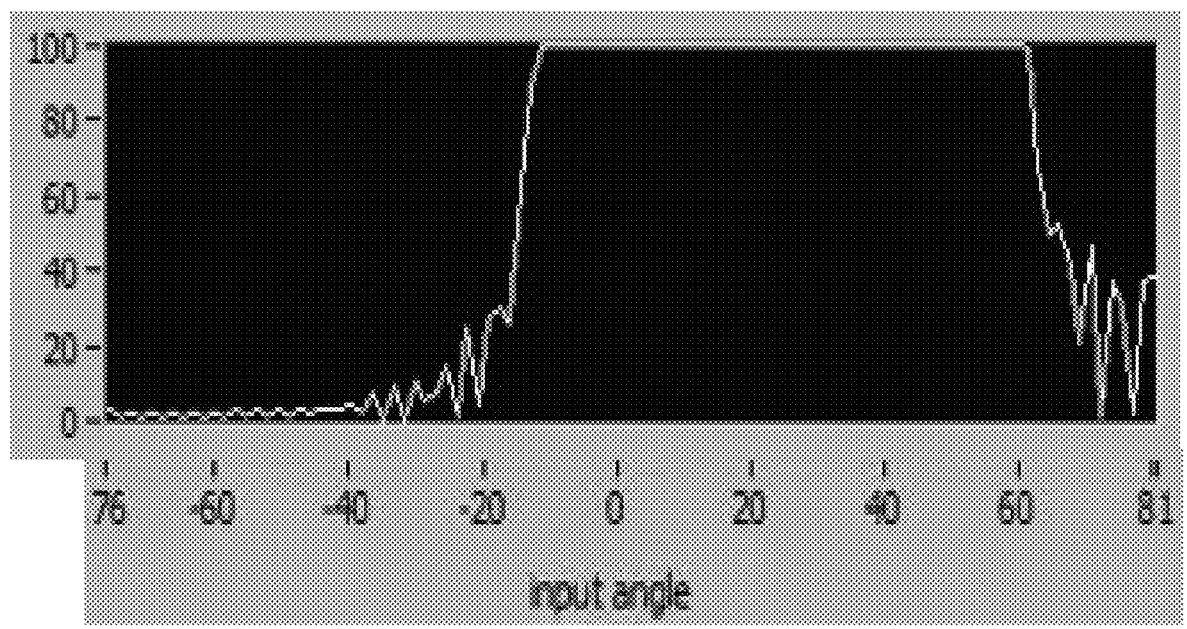
FIGS. 15A-15B shows a plot of calculated angular and spectral diffraction efficiency characteristics for a reflection structure formed from a HPDLC in accordance with an embodiment of the invention.
Figure 15B:
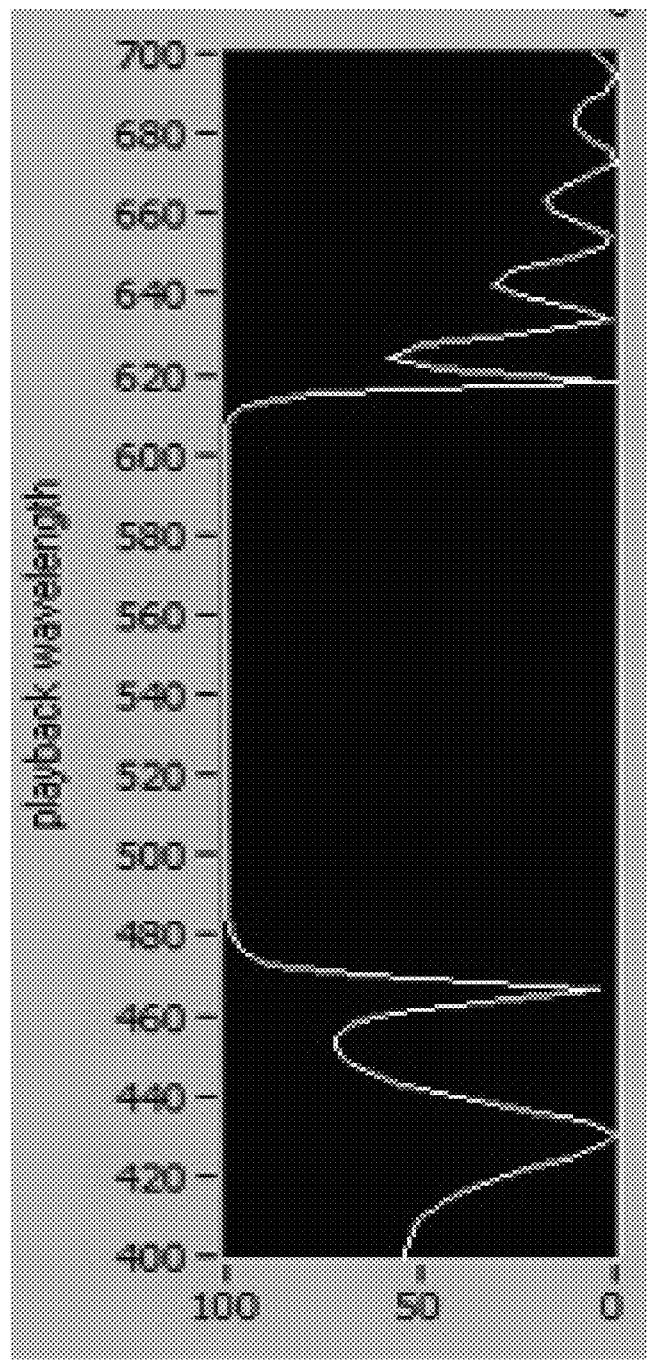

FIGS. 15A-15B shows a plot of calculated angular and spectral diffraction efficiency characteristics for a reflection structure formed from a HPDLC in accordance with an embodiment of the invention. The input and diffracted beam angles are 0° and 45° and the grating thickness is 3 microns. The refractive index of the polymer component of the grating is 1.6 and the refractive index modulation (polymer/air) is 0.3. The average index is obtained by taking the average of the refractive indices of the polymer and air (1.6+1.0/2=1.3). FIG. 15A shows the diffraction efficiency versus input angle in air. FIG. 15B shows the diffractive efficiency versus wavelength.

Figure 16A:
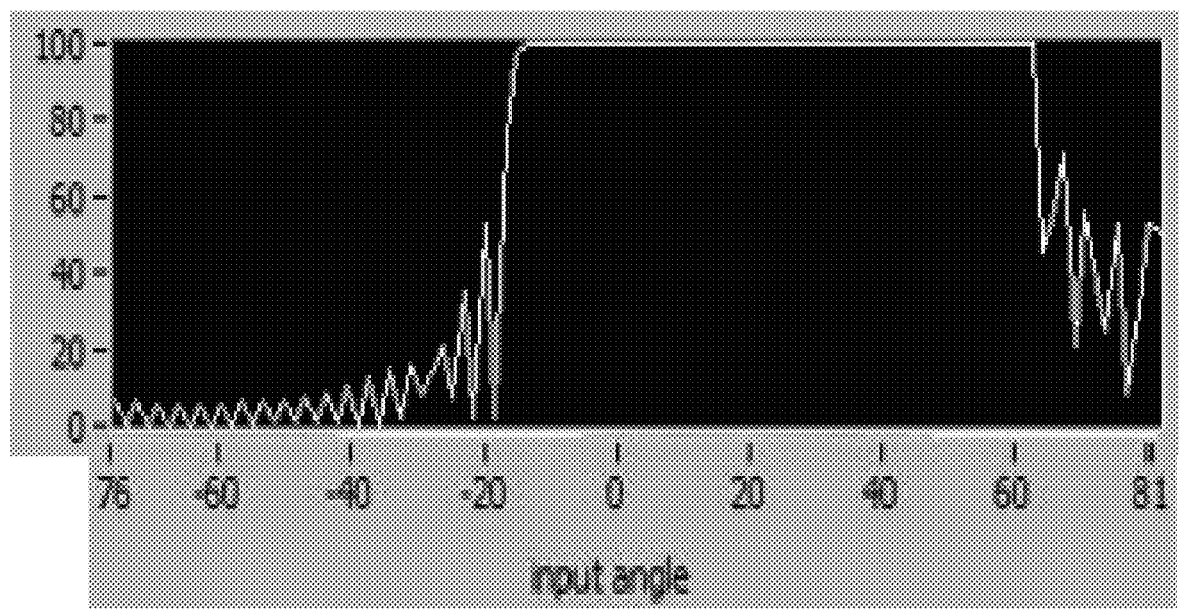
FIGS. 16A-16B shows the corresponding diffraction efficiency characteristics of a grating formed from a polymer of index 1.8 (refractive index modulation 0.4) for the same beam angles in accordance with an embodiment of the invention.
Figure 16B:
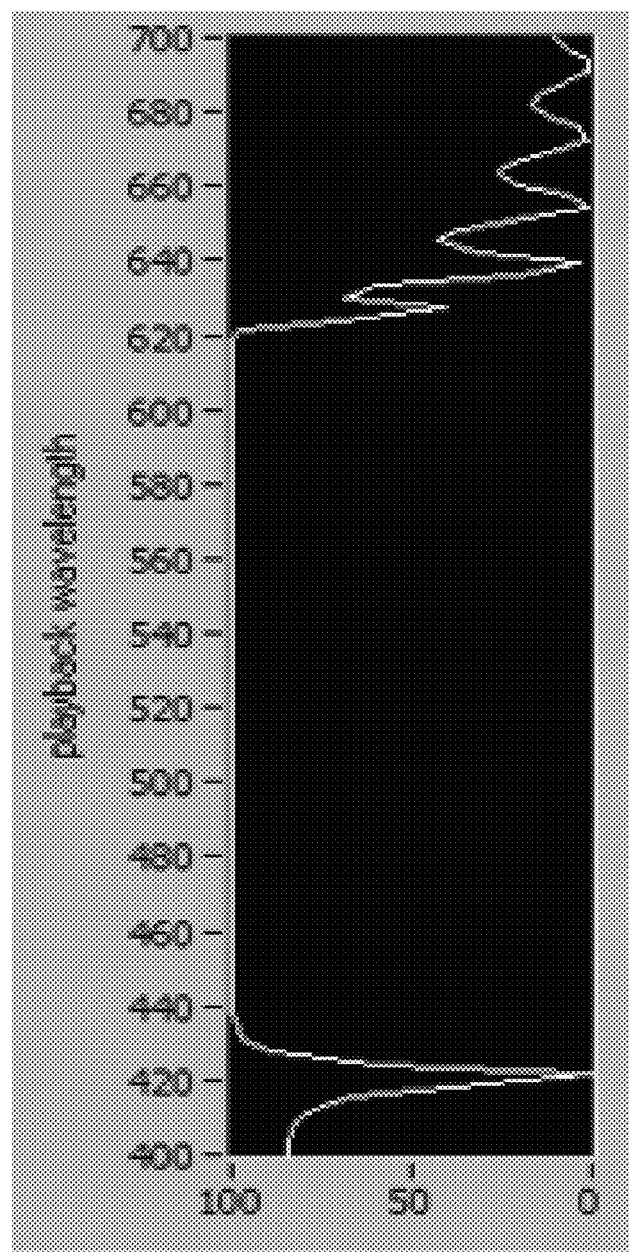
Figure 17A:
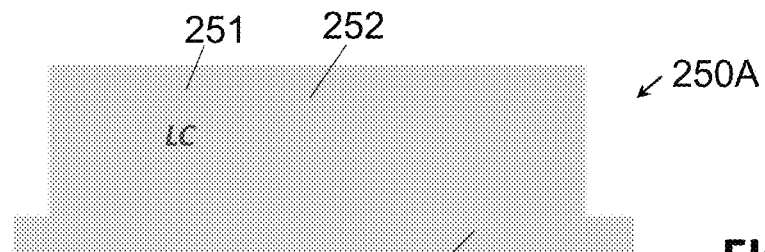
FIGS. 17A-17E illustrate the step in fabricating such a reflection Bragg grating incorporating polymer scaffolding in accordance with an embodiment of the invention.
Figure 17B:
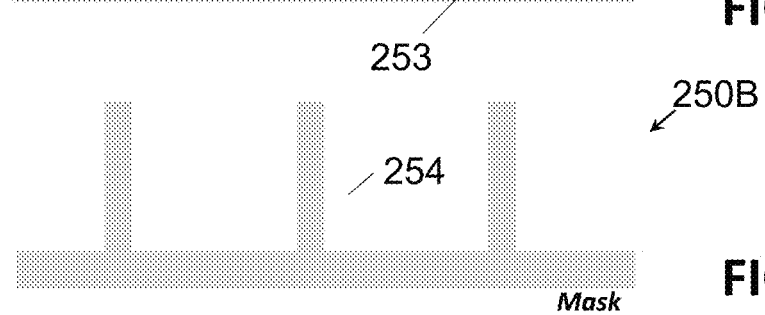
Figure 17C:
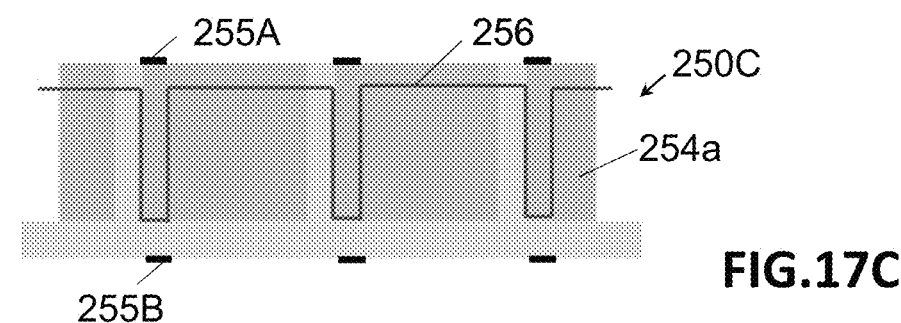
Figure 17D:
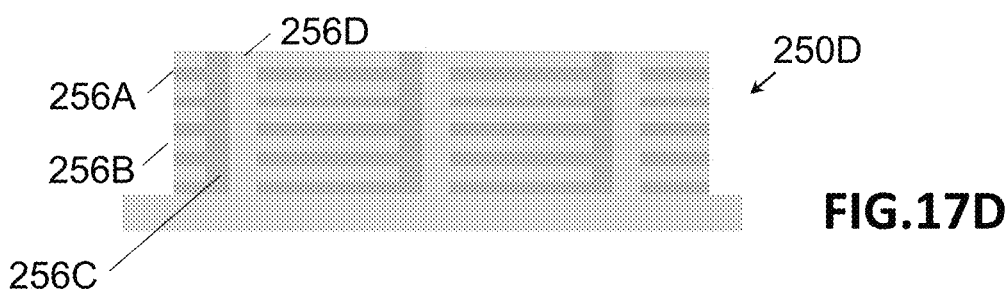
Figure 17E:
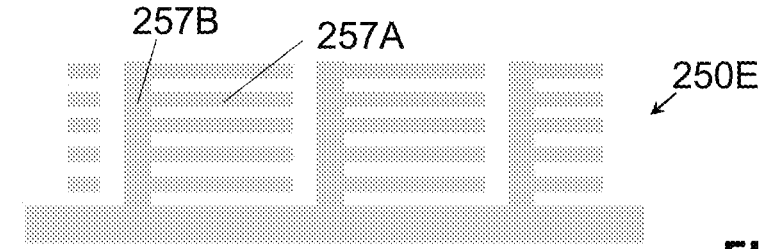

FIGS. 16A-16B shows the corresponding diffraction efficiency characteristics of a grating formed from a polymer of index 1.8 (refractive index modulation 0.4) for the same beam angles in accordance with an embodiment of the invention. The higher index polymer results in an increase in the spectral bandwidth of the grating. The angular bandwidth (near 100%) covers all waveguiding angles. From consideration of the diffraction efficiency plots it should be apparent that the spectral bandwidth of the grating covers most of visible band. By considering the diffraction efficiency obtained for S and P polarized light the inventors have found that the DE characteristics do not vary significantly with polarization. Calculations also indicate that, in contrast to LC-extracted transmission gratings, neither the angular bandwidth nor the spectral bandwidth are affected by grating thickness.

Reflection Bragg gratings with K-vectors substantially normal to the waveguide substrates may present problems in the flushing out of LC since the extraction will need to take place through the edges of the grating. Such a grating will also be structurally unstable due the polymer regions not being supported. In many embodiments directed at providing waveguide-based displays, the reflection grating may be slanted allowing LC extraction to take place through the upper and lower faces of the grating. In some embodiments with K-vectors substantially normal to the waveguide substrates, the reflection Bragg grating can incorporate polymer scaffolding. FIGS. 17A-17E illustrate the step in fabricating such a reflection Bragg grating incorporating polymer scaffolding in accordance with an embodiment of the invention. In a first step conceptually illustrated in FIG. 17A, a grating structure 250A including alternating LC regions 252 and polymer regions 251 supported by a substrate 253 may be fabricated using a holographic exposure process as discussed above. Alternatively, a mask exposure process can be used. In a second step conceptually illustrated in FIG. 17B, the LC is extracted to provide the surface relief grating structure 250B in which the LC regions are now air-filled regions 254. In a third step conceptually illustrated in FIG. 17C, the grating can be refilled with a liquid crystal and monomer mixture 254a to produce a hybrid grating. In a fourth step conceptually illustrated in FIG. 17C, a multiplexed grating 250C combining a reflection grating (having K-vectors substantially normal to the substrate) and a transmission grating (having K-vectors substantially parallel to the plane of the substrate) is recorded into to the mixture through an upper mask 255A and a lower mask 255B mask. The exposure illumination modulated by the masks is indicated by 256. Other arrangements of masks and illumination profiles can be used depending on the grating structures to be recorded. The exposed grating 250D conceptually illustrated in FIG. 17D includes horizontal LC regions 256A, horizontal polymer regions 256B, vertical LC regions 256C, and vertical polymer regions 256D which provide scaffolding for the horizontal polymer regions. In a final step conceptually illustrated in FIG. 17E, the LC is flushed out of the grating structure to form the finished grating 250E including the horizontal polymer grating elements 257A and vertical polymer grating elements 257B that have principal optical surfaces in contact with air and are supported by vertical polymer scaffolding elements 257C. In many embodiments, the reflection grating can have a thickness in the range 1-3 micron.

Figure 18:
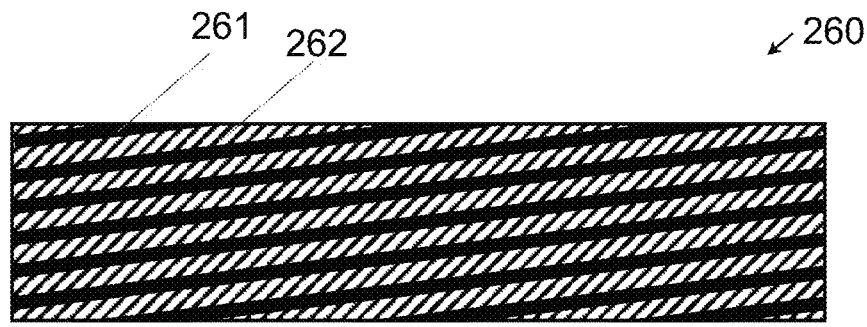
FIG. 18 conceptually illustrates a reflection grating in accordance with an embodiment of the invention.
Figure 19:
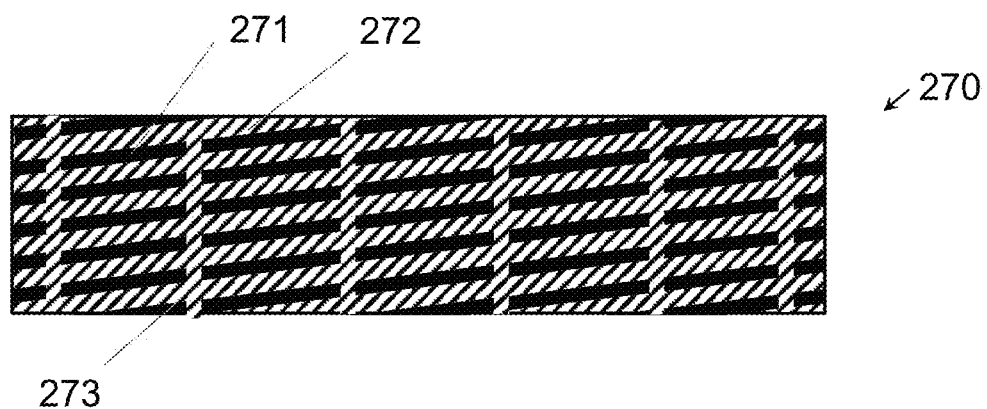
FIG. 19 conceptually illustrates a reflection grating in accordance with an embodiment of the invention.
Figure 20:
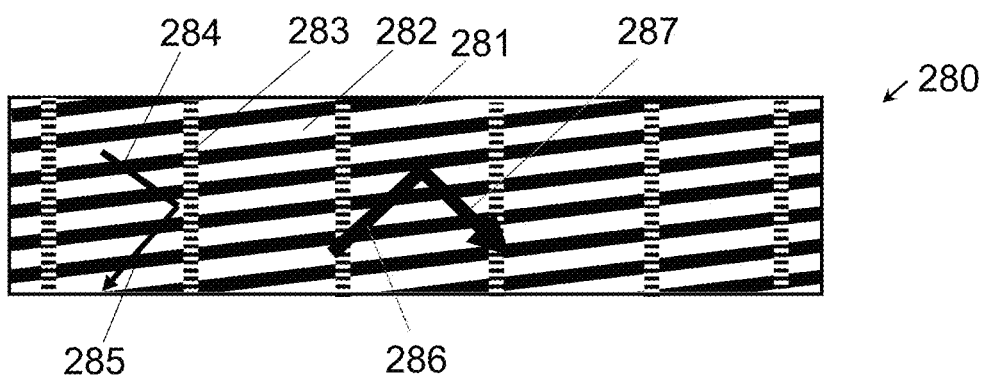
FIG. 20 conceptually illustrates a combination reflection and transmission grating in accordance with an embodiment of the invention.

The process described in connection with FIGS. 17A-17E may produce various grating structures as illustrated in FIGS. 18-20.

FIG. 18 conceptually illustrates a reflection grating in accordance with an embodiment of the invention. The reflection grating 260 includes alternating first refractive index regions 261 and second refractive index regions 262.

FIG. 19 conceptually illustrates a reflection grating in accordance with an embodiment of the invention. The reflection grating 270 includes alternating first refractive index regions 271 and second refractive index regions 272. The reflection grating 270 further includes substantially vertical regions 273 of the second refractive index material.

FIG. 20 conceptually illustrates a combination reflection and transmission grating in accordance with an embodiment of the invention. The combination reflection and transmission grating 280 includes a reflection grating and a transmission grating. The combination grating 280 includes alternating first refractive index regions 281 and second refractive index regions 282. The combination grating 280 further includes approximately vertical regions 283 of a third refractive index material. The transmission grating is formed by the average of the first refractive index regions 281, second refractive index regions 282, vertical regions 283 of a third refractive index material. The diffraction of the transmission grating is represented by the rays 284,285. The reflection grating formed by the first refractive index regions 281 and second refractive index regions 282. The diffraction of the reflection grating is represented by the rays 286,287.

In many of the embodiments to be described below there is provided a waveguide-based display device including: a waveguide; a source of image modulated light projected over a field of view; an input coupler for coupling said light into a total internal reflection path within said waveguide; and a grating structure for providing beam expansion in at least one direction. The waveguide display can incorporate many of the embodiments discussed in the preceding paragraphs.

Figure 21:
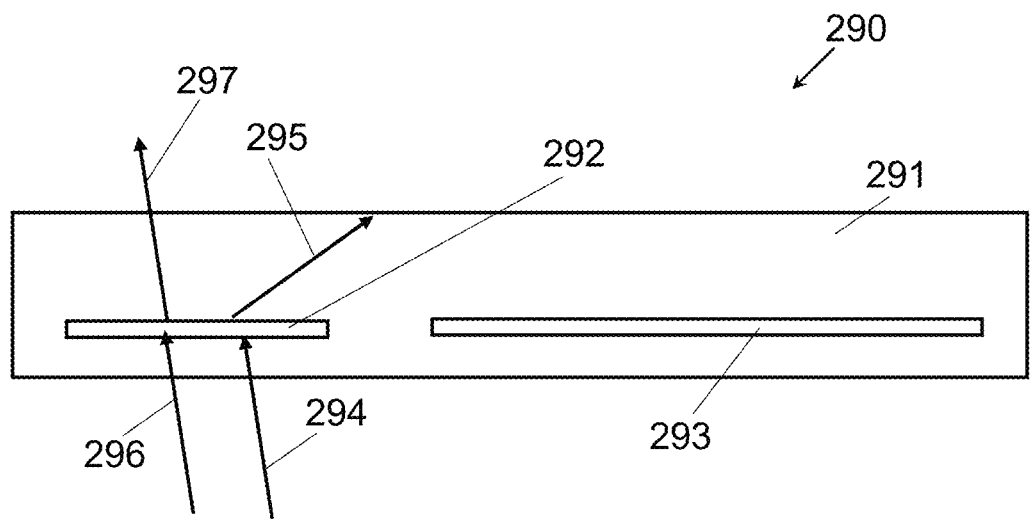
FIG. 21 conceptually illustrates a waveguide-based display in accordance with an embodiment of the invention.

FIG. 21 conceptually illustrates a waveguide-based display in accordance with an embodiment of the invention. The waveguide-based display 290 includes a waveguide 291 supporting an input grating 292 and a grating structure 293. Input light 294 having a wavelength less than or equal to a predefined threshold value is diffracted into a TIR path 295 while input light 296 having wavelength greater than the threshold value is not diffracted and emergence from the input grating without substantial deviation or attenuations as the zero-order light 297. In some embodiments, the grating structure 293 can be designed to only diffract light below a threshold wavelength. The input grating 292 may include a short grating period that enables coupling of light below a threshold wavelength. In some embodiments, such as for example waveguide-based displays including layers operating on different primary colors, this feature can be used to limit color crosstalk between layers.

Figure 22:
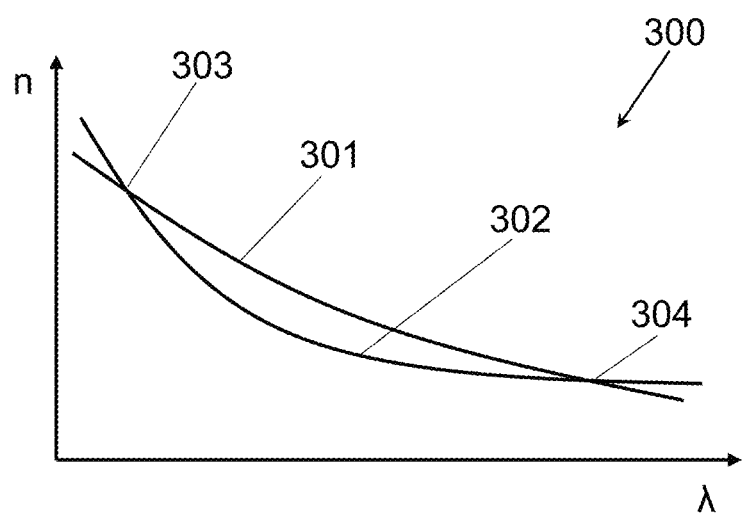
FIG. 22 illustrates a plot of different materials that have different dispersion (n-λ) curves which overlap at two or more points.
Figure 23:
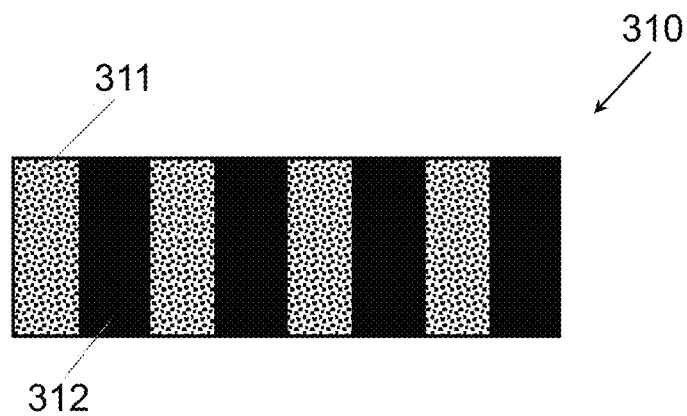
FIG. 23 conceptually illustrates a portion of a Bragg grating formed from different dispersion materials in accordance with an embodiment of the invention.

In many embodiments, a waveguide can support Bragg gratings including alternating regions formed from two different materials. FIG. 22 illustrates a plot 300 of different materials that have different dispersion (n-A) curves 301, 302 which overlap at two or more points 303,304. FIG. 23 conceptually illustrates a portion of a Bragg grating 310 formed from different dispersion materials 311,312 in accordance with an embodiment of the invention. The Bragg gratings may be used as the input grating 292 described in connection with FIG. 21 to provide waveguide selectivity. In some embodiments, the wavelength selectivity may be implemented in other gratings (e.g. fold gratings and output gratings) used in the waveguide to minimise the effects of cross talk between stacked RGB waveguides.

Figure 24:
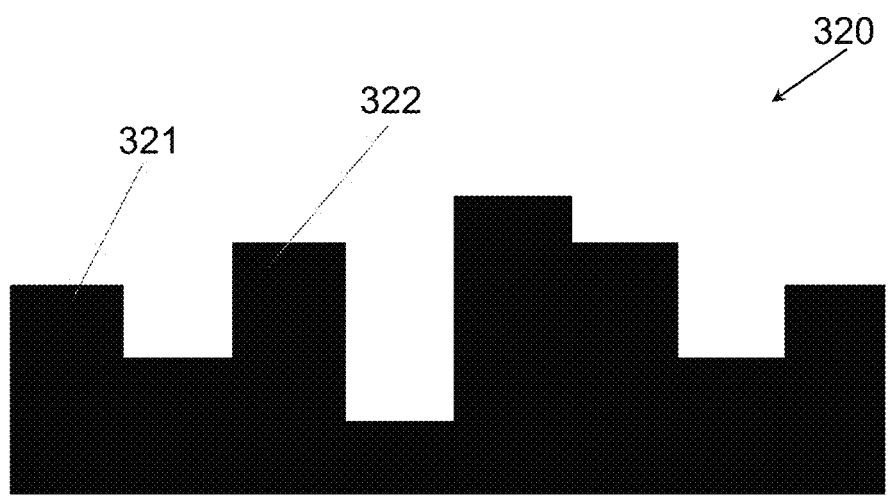
FIGS. 24-27 conceptually illustrate waveguide gratings with spatially varying diffraction efficiency in accordance with an embodiment of the invention.

FIGS. 24-27 conceptually illustrate waveguide gratings with spatially varying diffraction efficiency in accordance with an embodiment of the invention. The gratings can be implemented as Bragg gratings, as SRGs, or as hybrid Bragg/SRG structures according to the principles discussed above. In many embodiments, the diffraction efficiency can be controlled by varying the grating depth and fill factor as a function of wavelength. FIG. 24 conceptually illustrates a grating in accordance with an embodiment of the invention. The grating 320 may include spatially varying modulation 321,322 at different positions.

Figure 25:
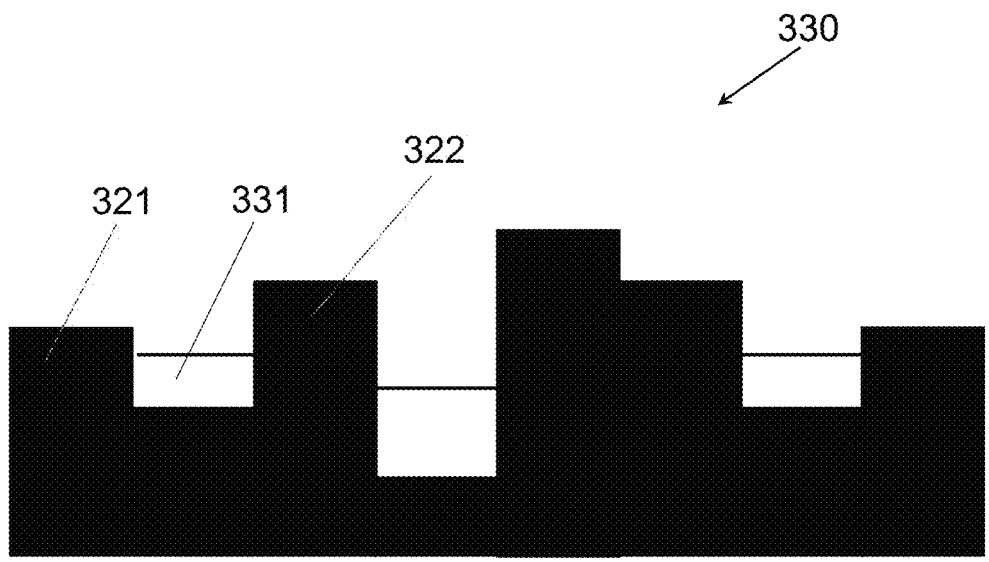

FIG. 25 conceptually illustrates a SRG in accordance with an embodiment of the invention. The SRG 330 includes spatially varying modulation 321,322 as the grating 320 described in connection with FIG. 24. The SRG 330 further includes at least partial backfilling with a backfilling material 331 of refractive index different to that of the previous grating 320. As discussed above the SRG 330 can be formed by extracting liquid crystal from a HPDLC grating and then refilling with the backfill material 331.

Figure 26:
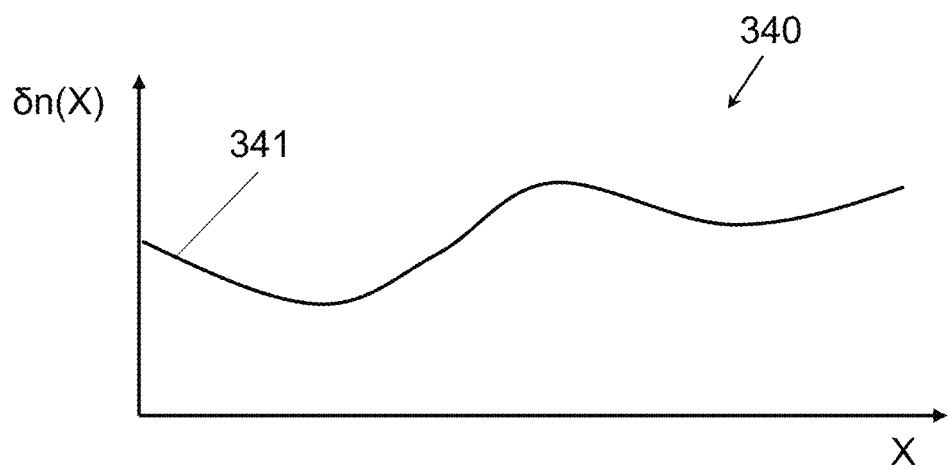
Figure 27:
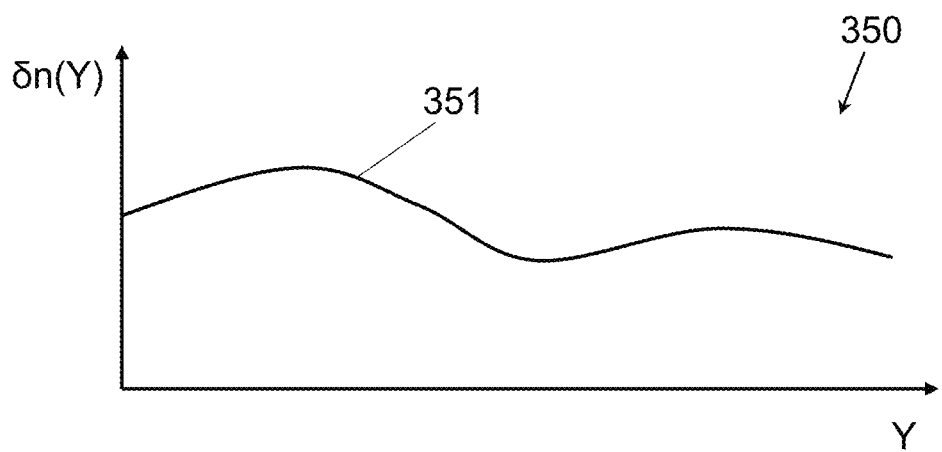

FIGS. 26-27 conceptually illustrates various plots disclosing the spatial variation of the refractive index modulation: δn(X), δn(Y) 340,350, along orthogonal directions (X,Y) for a grating designed to provide continuous spatial variation of index modulation 341,351.

Figure 28:
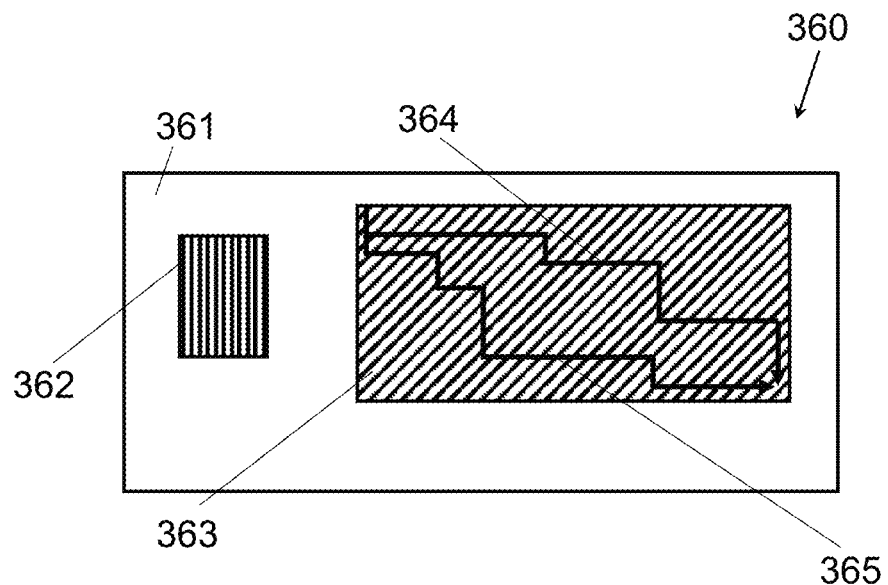
FIG. 28 conceptually illustrates a waveguide apparatus in accordance with an embodiment of the invention.

FIG. 28 conceptually illustrates a waveguide apparatus in accordance with an embodiment of the invention. The waveguide apparatus 360 including a waveguide 361 supporting an input grating 362 and a grating structure including a fold grating 363 configured such that ray paths 364,365 within the fold grating 363 have substantially the same geometrical path length in some embodiments. By designing the grating so that the path differences between the ray paths 364,365 are greater than the coherence length and the rays 364,365 can be summed incoherently to eliminate fringing and other illumination artefacts such as might occur in laser illuminated waveguides.

Figure 29:
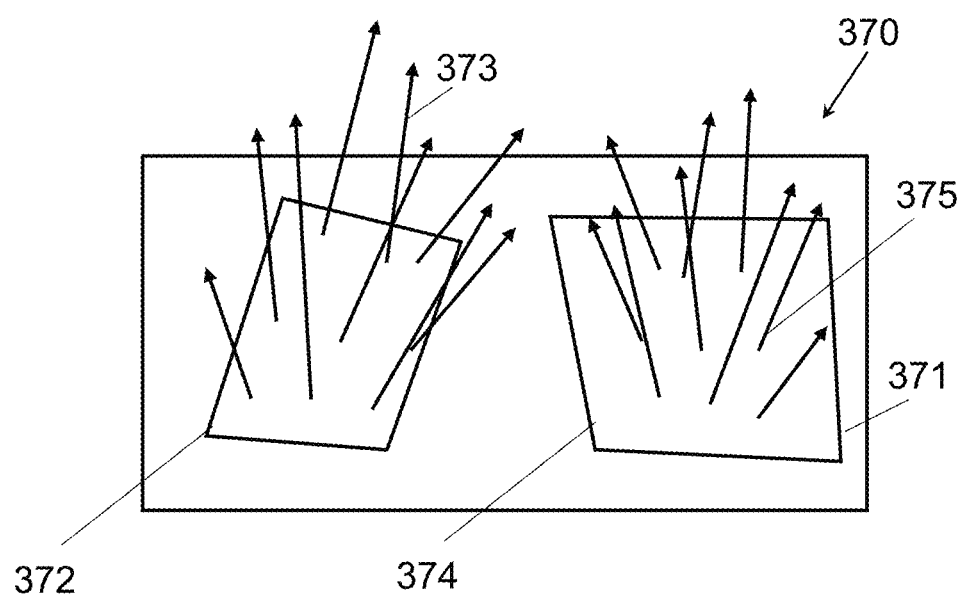
FIG. 29 conceptually illustrates a waveguide apparatus in accordance with an embodiment of the invention.

FIG. 29 conceptually illustrates a waveguide apparatus in accordance with an embodiment of the invention. The waveguide apparatus 370 includes a waveguide 371 supporting an input grating 372 having a spatially varying distribution of K-vectors 373 and a grating structure 374 having a spatially varying distribution of K-vectors 375 in some embodiments.

Figure 30:
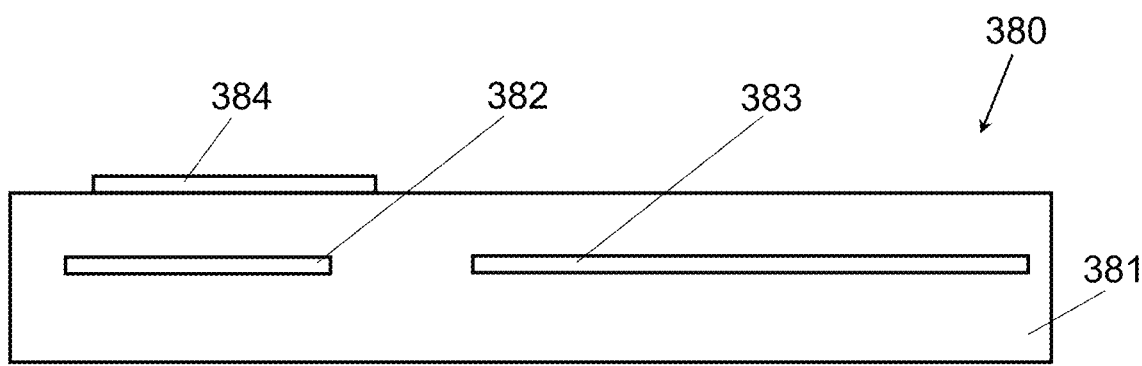
FIG. 30 conceptually illustrates a waveguide apparatus in accordance with an embodiment of the invention.

FIG. 30 conceptually illustrates a waveguide apparatus in accordance with an embodiment of the invention. The waveguide apparatus 380 comprising a waveguide 381 supporting an input grating 382, a grating structure 383 (e.g. a fold grating), and at least one partially reflective coating 384. In many embodiments the coating 384 can at least partially overlap the input grating 382. In many embodiments, the coating 384 can at least partially overlap the grating structure 383. In other embodiments, the coating 384 can at least partially overlap both of the input grating 382 and the grating structure 383. One purpose of the coating 384 may be to overcome interference fringe formation in a laser illuminated waveguide.

Figure 31:
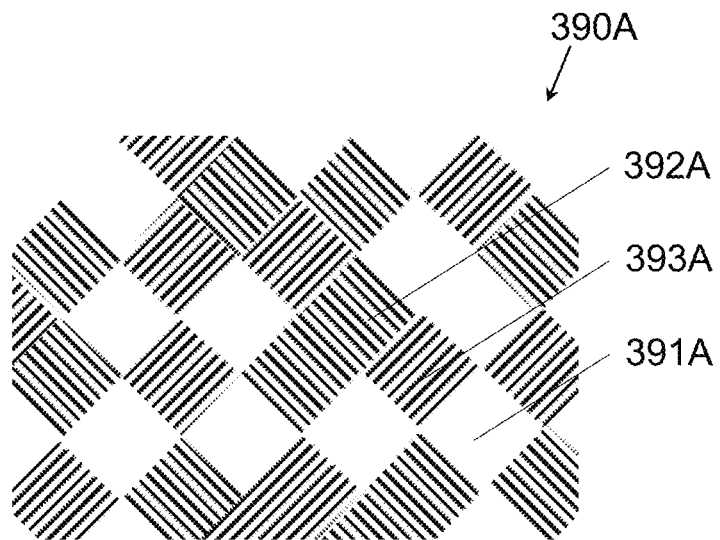
FIG. 31 conceptually illustrates a portion of a grating structure in accordance with an embodiment of the invention.

FIG. 31 conceptually illustrates a portion of a grating structure in accordance with an embodiment of the invention. The grating structure 390A includes non-diffracting regions 391A, gratings of a first prescription 392A, and gratings of a second prescription 393A disposed in a non-repeating pattern.

Figure 32:
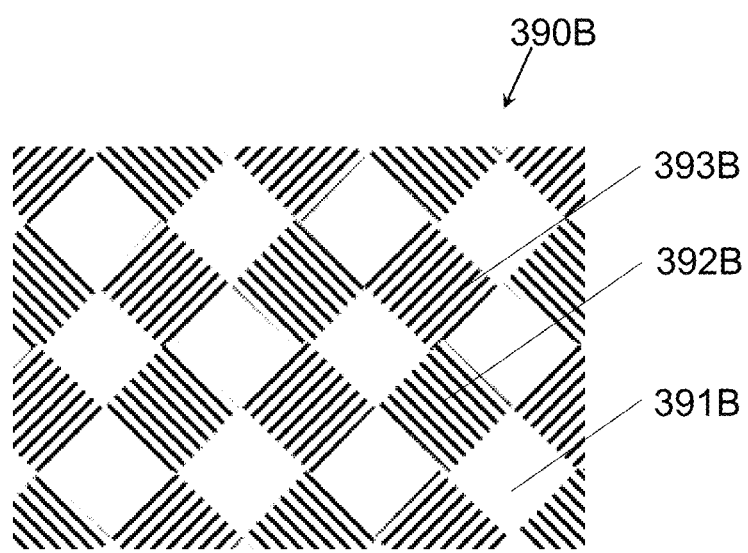
FIG. 32 conceptually illustrates a portion of a grating structure in accordance with an embodiment of the invention.

FIG. 32 conceptually illustrates a portion of a grating structure in accordance with an embodiment of the invention. The grating structure 390B includes a non-diffracting regions 391B, gratings 392B of a first prescription, and gratings 393B of a second prescription disposed in a repeating pattern. The grating structures of FIGS. 31-32 can be used to provide two-dimensional beam expansion and uniform light extraction from a waveguide.

Figure 33:
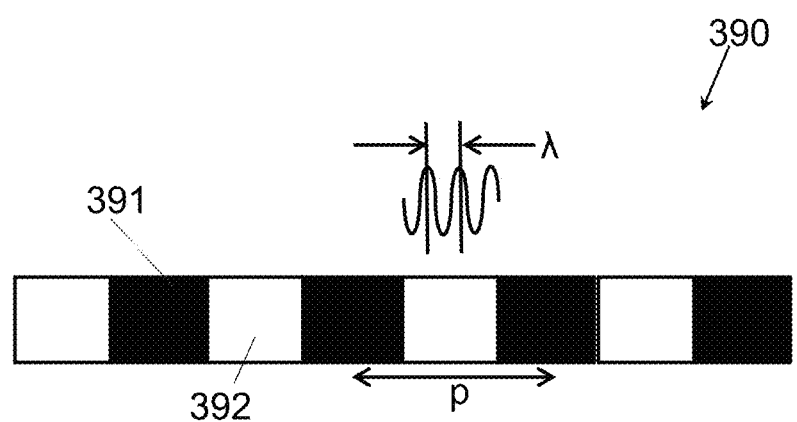
FIG. 33 conceptually illustrates a portion of a grating structure in accordance with an embodiment of the invention.

FIG. 33 conceptually illustrates a portion of a grating structure in accordance with an embodiment of the invention. The grating structure 390 includes alternating high index regions 391 and low index regions 392 with a grating pitch (p). As illustrated, the grating pitch p may be the distance between the peaks or centres of successive low index and high index regions. In many embodiments, the grating pitch p can be much greater than a wavelength A to enable a wide field of view and low dispersion. In many embodiments, the grating pitch p can be in the range 5-1000 microns. The large pitch value results in many diffracted orders which can be used for optimising field of view and color dispersion, enabling single layer wide FOV full color waveguides. In many embodiments the high index regions and low index regions may have different widths.

Figure 34:
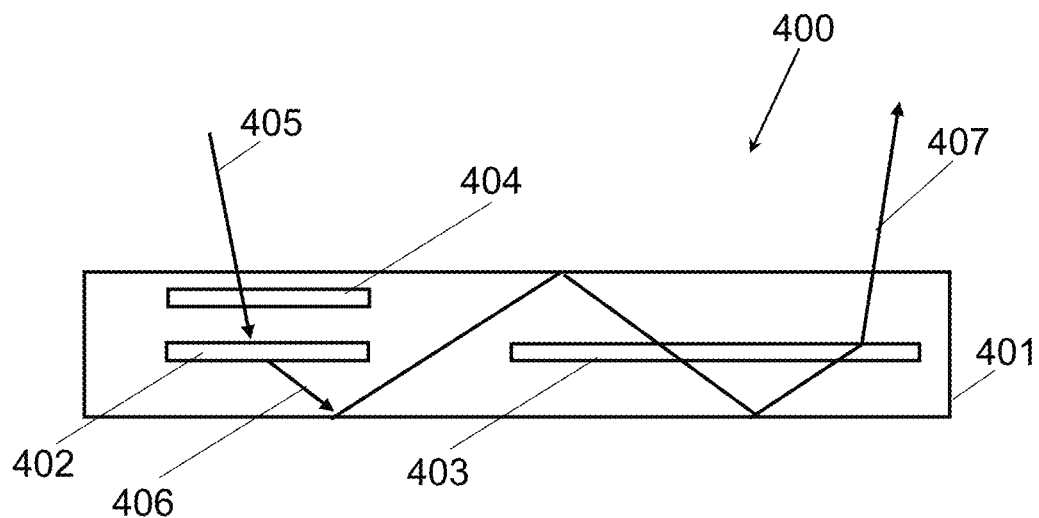
FIG. 34 conceptually illustrates a waveguide apparatus in accordance with an embodiment of the invention.

FIG. 34 conceptually illustrates a waveguide apparatus 400 in accordance with an embodiment of the invention. The waveguide apparatus 400 includes a ray multiplying element 404 disposed before an input coupler for debanding in accordance with an embodiment of the invention. In many embodiments, the input coupler 402 is a grating. In some embodiments, the ray multiplying element 404 can be disposed after the input coupler 402. The waveguide apparatus 400 includes a waveguide 401 supporting an input grating 402, a grating structure 403, and a ray multiplying element 404 for controlling beam width. An optical path through the waveguide in some embodiments is illustrates by the rays 405-407. In many embodiments, the ray multiplying element 404 can include mirrors, gratings and can have angle dependence and different beam width multiplying factors matched to different beam incidence angles and source exit pupils.

Figure 35:
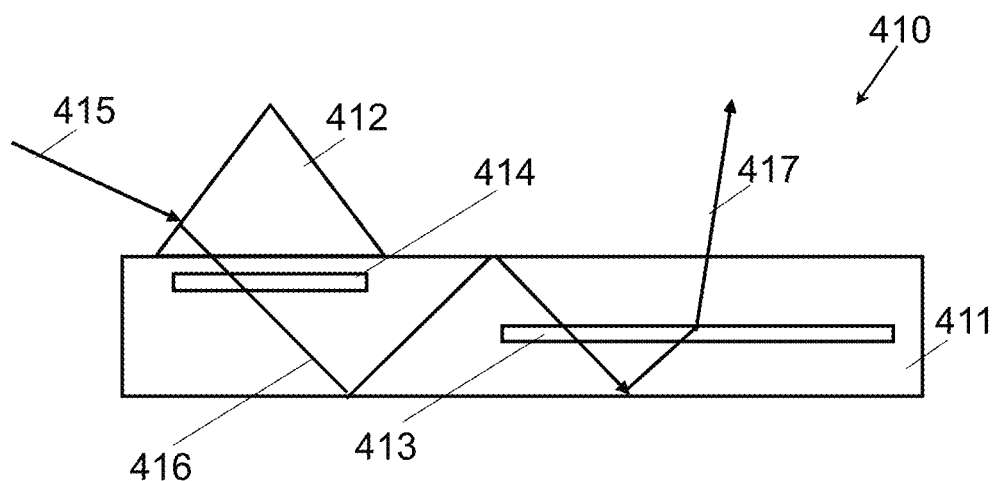
FIG. 35 conceptually illustrates a waveguide apparatus in accordance with an embodiment of the invention.

FIG. 35 conceptually illustrates a waveguide apparatus in accordance with an embodiment of the invention. The waveguide apparatus 410 uses a ray multiplying element 414 for debanding and an input prism coupler 412. The waveguide apparatus 410 includes a waveguide 411, a prism coupler 412, a grating structure 413, and a ray multiplying element 414. As illustrated, the ray multiplying element 414 may be positioned below the input prism coupler 412. An optical path through the waveguide 411 is illustrated by the rays 415-417.

Figure 36A:
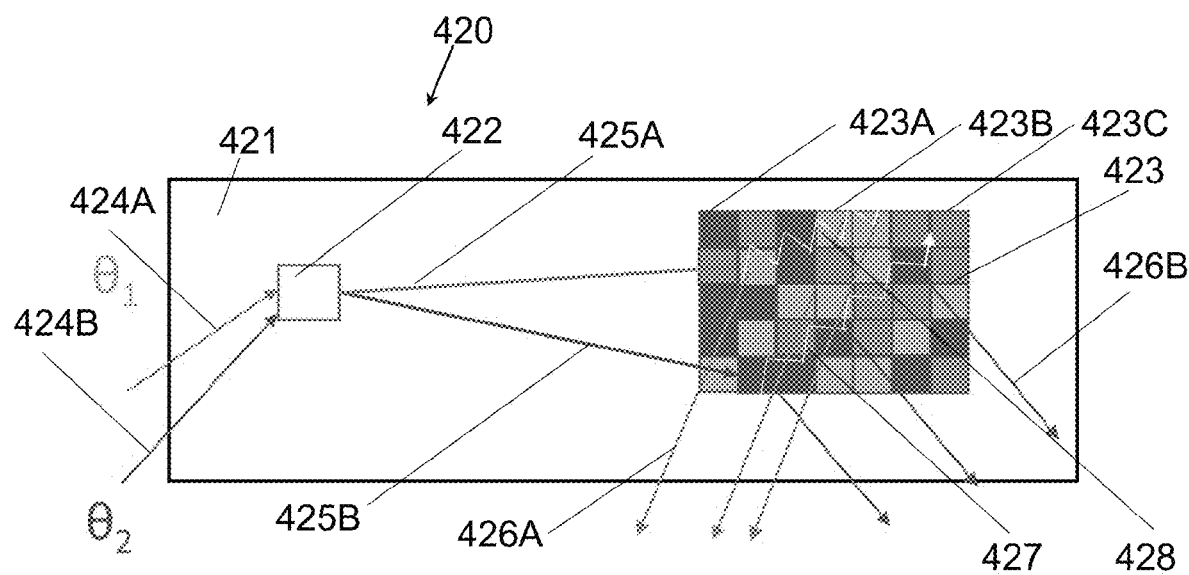
FIG. 36A conceptually illustrates a waveguide-based display in accordance with an embodiment of the invention.

FIG. 36A conceptually illustrates a plan view of a waveguide-based display in accordance with an embodiment of the invention. The display 420 uses a grating structure 423 including an array of grating elements 423A,423B,423C. The display 420 includes a waveguide 421 supporting an input coupler 422 and a grating structure 423 for beam expansion and extraction including an array of grating elements 423A,423B. The array of grating elements include elements 423A for diffracting a first wavelength, elements 423B for diffracting a second wavelength and elements 423C for diffracting a third wavelength. In many embodiments, the gratings elements 423A,423B,423C of each wavelength can have different K-vectors. In many embodiments, the K-vectors can be selected from a group of two different K-vectors. In many embodiments, the K-vectors can be selected from a group of two opposing K-vectors. In some embodiments, in which the grating structure operates on red, green and blue light and requires two different K-vectors for performing two-dimensional beam expansion and extraction, a total of six different grating prescriptions are required. In several embodiments, the array may include non-diffracting regions. Input light can be directed into the waveguide 421 at different angle 81, 82. Examples of optical paths through the waveguide are illustrated by the rays 424A-426A and 424B-426B. The ray paths shown can, in some embodiments, represent light of different wavelengths. Light of a given input direction may undergo multiple grating interactions within the grating structure 423, undergoing diffraction only at gratings for which the incident ray lies within the spectral or angular bandwidth of the grating. Examples of optical paths through the grating structure is illustrated by the TIR ray 427,428.

In some embodiments, the red, green and blue gratings can be exposed using a spatial light modulator array mask, illuminating the separate RGB array pattern on the patterned mask time sequentially to avoid crosstalk during exposure.

In many embodiments, angle and wavelength Bragg selectivity, spatial variations of modulation, thickness etc can be used to mitigate cross talk, control uniformity and minimise the effects of grating edge interactions.

In many embodiments the grating elements can be approximately 30 microns in size.

Figure 36B:
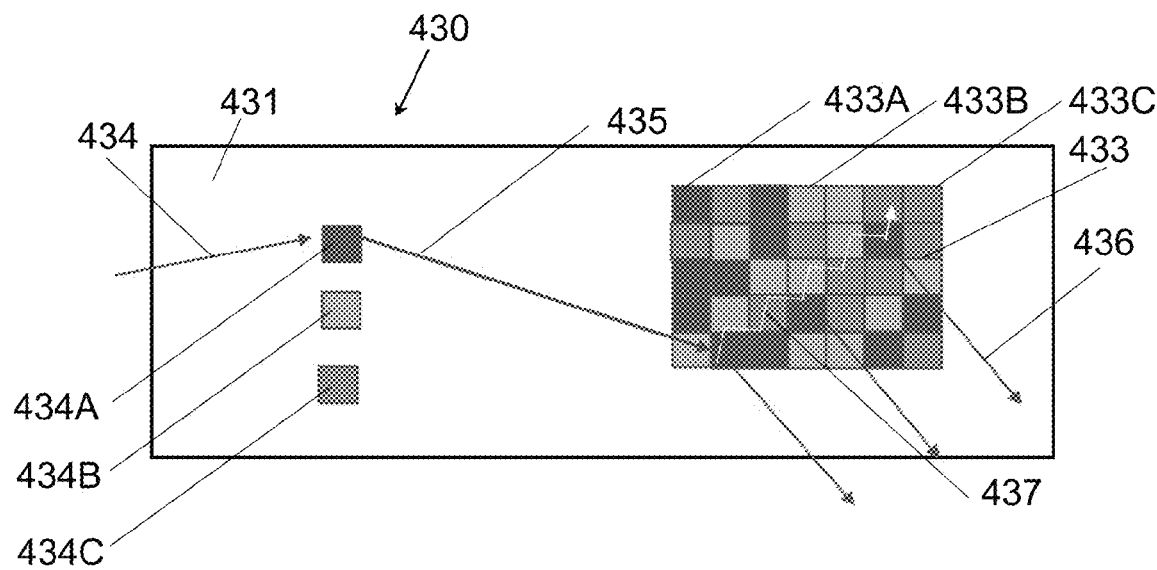
FIG. 36B conceptually illustrates a waveguide-based display in accordance with an embodiment of the invention.

FIG. 36B conceptually illustrates a plan view of a waveguide-based display in accordance with an embodiment of the invention. The waveguide-based display 430 uses a grating structure including an array of grating elements 433A,433B,433C in accordance with an embodiment of the invention. The waveguide-based display 430 includes a waveguide substrate 431 supporting three input coupler gratings 434A,434B,434C and a grating structure 433 for beam expansion and extraction including an array of grating elements. The array of grating elements includes elements 433A for diffracting a first wavelength, elements 433B for diffracting a second wavelength and elements 433C for diffracting a third wavelength. In many embodiments, the input couplers 434A,434B,434C diffract said first, second and third wavelengths respectively. An example of an optical paths through the grating structure is illustrated by the TIR ray 437. For example, the optical path of light coupled into the waveguide by the coupler 434A is illustrated by the rays 434-436.

Figure 36C:
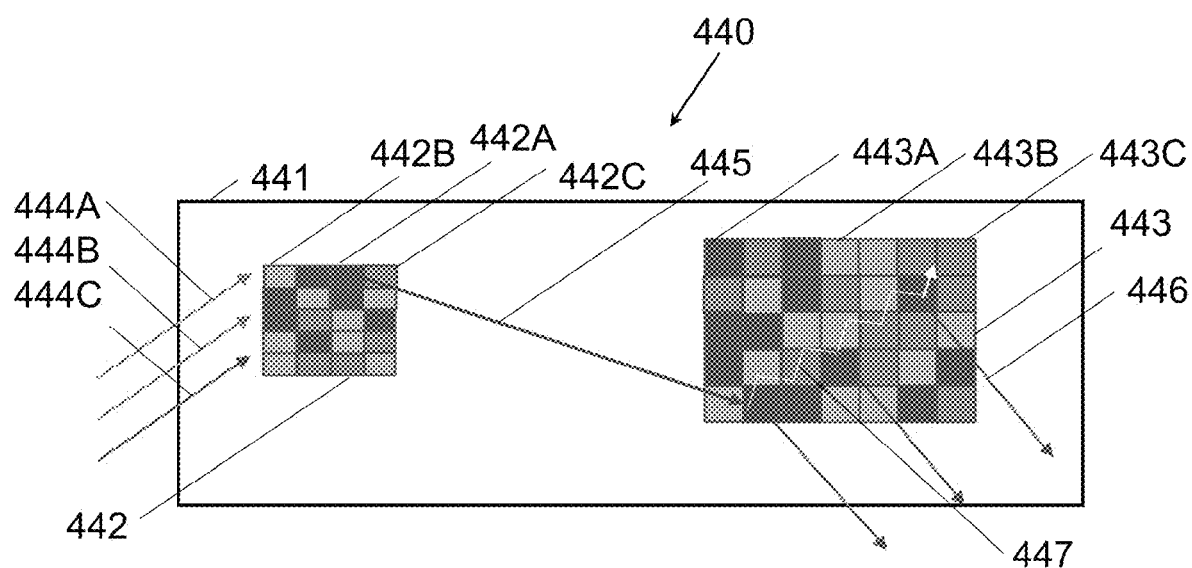
FIG. 36C conceptually illustrates a waveguide-based display in accordance with an embodiment of the invention.

FIG. 36C conceptually illustrates a plan view of a waveguide-based display in accordance with an embodiment of the invention. The waveguide-based display 440 includes a grating structure 443 including an array of grating elements 443A,443B,443C. The waveguide-based display 440 includes a waveguide substrate 441 supporting an input coupler grating array 442 including grating elements 444A, 444B,444C for coupling first, second and third wavelength light into TIR paths within the waveguide, and a grating structure 443 for beam expansion and extraction including an array of grating elements including, in many embodiments, elements 443A for diffracting the first wavelength, elements 443B for diffracting the second wavelength and elements 443C for diffracting the third wavelength. An example of an optical paths through the grating structure is illustrated by the TIR ray 447. The optical path of light coupled into the waveguide is illustrated by the rays 445-446.

Figure 37:
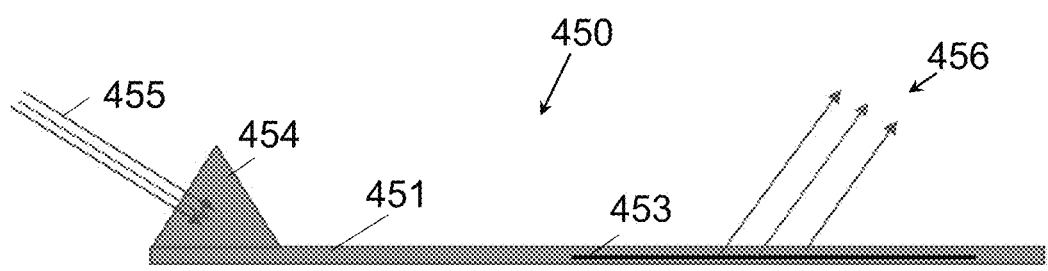
FIG. 37 conceptually illustrates a side elevation view of a waveguide-based display based on the embodiments of FIGS. 36A,36B,36C.
Figure 38:
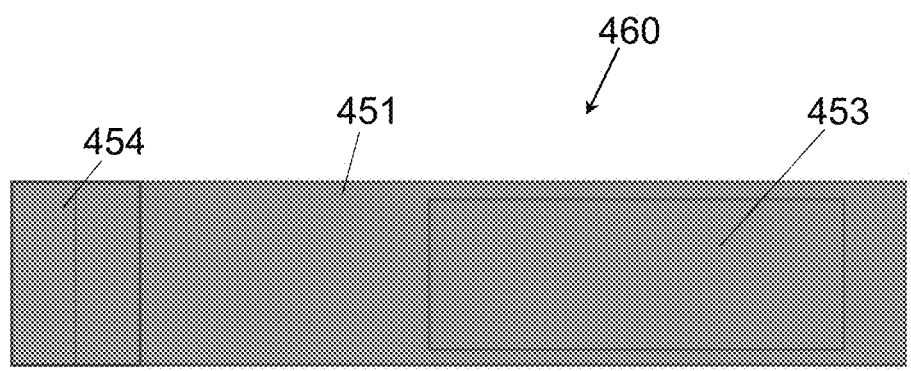
FIG. 38 illustrates a plan view of the waveguide-based display described in connection with FIG. 37.

FIG. 37 conceptually illustrates a side elevation view of a waveguide-based display 450 based on the embodiments of FIGS. 36A,36B,36C. The waveguide-based display 450 includes a waveguide 451 with an input coupler provided by a prism 454 in accordance with an embodiment of the invention. The waveguide-based display 450 further includes a grating structure 453. The prism 454 couples incident light 455 into TIR paths within the waveguide. The grating structure 453 performs beam expansion and extracts the light 456. FIG. 38 illustrates a plan view of the waveguide-based display described in connection with FIG. 37.

Figure 39:
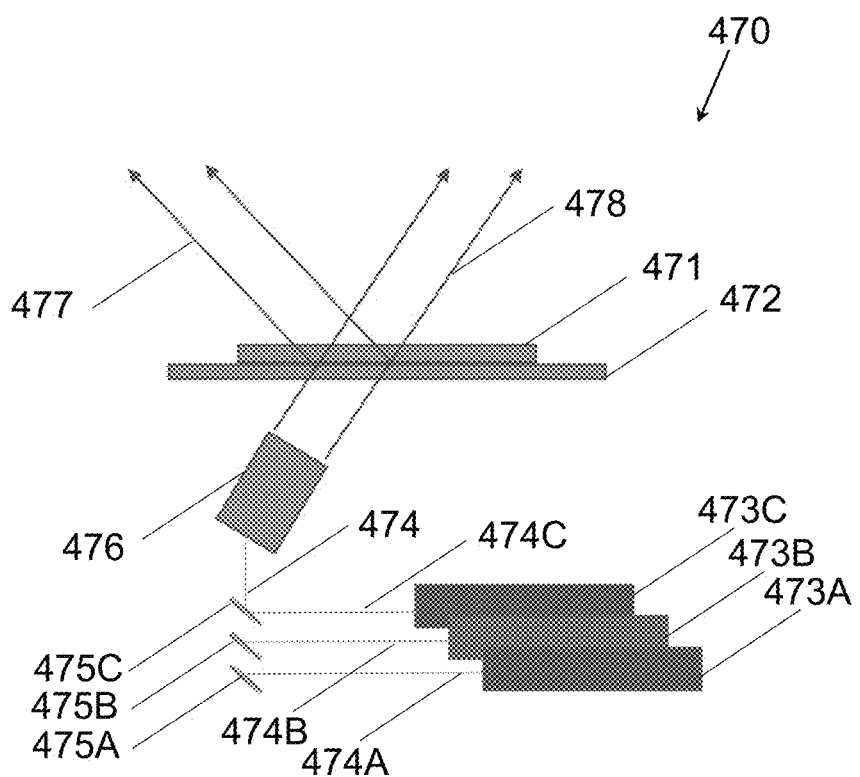
FIG. 39 conceptually illustrates an apparatus for recording a grating structure including a grating array in accordance with an embodiment of the invention.

FIG. 39 conceptually illustrates an apparatus 470 for recording a grating structure including a grating array in accordance with an embodiment of the invention. The apparatus 470 includes a substrate 471 supporting a layer of holographic recording material, a master grating 472, red, green and blue lasers 473A,473B,473C emitting beams 474A,474B,474C, which can be combined by a stack of dichroic filters 475A,475B,475C into the common beam direction into the collimating/beam expansion optics 476. The expanded beam may be diffracted by the master grating 472 to form a diffracted beam 477 and a zero-order beam 478 used for copying the master grating 472 into the holographic material layer. Many other configurations for combining, collimating and beam expanding the laser beams should be apparent to those skilled in the art. For example, holographic recording material with red, green, or blue sensitized dyes can be deposited onto areas designated the red, green and blue gratings respectively. In many embodiments, the holographic recording material is a HPDLC material system. In many embodiments, the grating regions are coated using an inkjet printer. In many embodiments, the grating regions can be coated with a spatial resolution of 30 microns. In many embodiments the gratings have rolled K-vectors. In many embodiments, the gratings are recorded use rapid pulse laser exposure so that complete red green and blue gratings exposure occurs within substantially the same time window. In many embodiments, the master grating 472 supports a hard coat to allow it to be positioned close to the recording material layer. In many embodiments, a 10 nm hard coat can be used for this purpose. In many embodiments, the master grating 472 is coated with a 50-micron cover glass or polymer overcoating. In many embodiments, the principles of the embodiment of FIG. 39 can be applied in a two-color band (blue-green and red, for example) waveguide.

In many embodiments, the grating structure can include a plurality of grating elements tiled in a repeating pattern. In many embodiments, the grating structure can include a plurality of grating elements tiled in a non-repeating pattern. In many embodiments, the grating structure can include grating elements of non-rectangular shape. In many embodiments, the grating structure can have a spatially varying refractive index modulation. In many embodiments, the grating structure can include a plurality of grating elements with spectral response selected from a group containing at least two different spectral responses. In many embodiments, the grating structure can include a plurality of grating elements with angular response selected from a group containing at least two different angular responses. In many embodiments, the grating structure can include a plurality of grating elements with birefringence including at least two different birefringence characteristics. In many embodiments, the grating structure can include a plurality of grating elements with polarization response including at least two different polarization responses. In many embodiments, the grating structure can include a plurality of grating elements with refractive index modulation including at least two different refractive index modulations. In many embodiments, the grating structure can include a plurality of grating elements with average refractive index including at least two different refractive indices. In many embodiments, the grating structure can include a plurality of grating elements with grating thickness including at least two different grating thicknesses. In many embodiments, the grating structure can include a plurality of grating elements having grating prescriptions including at least two different grating prescriptions. In many embodiments, the grating structure can include a plurality of grating elements having K-vectors including at least two different K-vectors. In many embodiments, the grating structure can include a plurality of grating elements including diffracting grating elements arrayed with non-diffracting grating elements. In many embodiments, the grating structure can include a plurality of grating elements recorded in material including at least two different materials. In many embodiments, the grating structure can include a plurality of grating elements recorded in material having dispersion curves including at least two different dispersion curves. In many embodiments, the grating structure can include a plurality of grating elements recorded in material having wavelength sensitivity selected from a group including at least two different wavelength sensitivities. In many embodiments, the grating structure can include a plurality of grating elements recorded in material having holographic exposure time including at least two different holographic exposure times. In many embodiments, the grating structure can include a plurality of grating elements recorded in material having holographic exposure energy including at least two different holographic exposure energies. In many embodiments, the grating structure is configured to support ray paths differing by a distance shorter than the coherence length of the source. In many embodiments, the grating structure can include at least one grating having a grating pitch much greater that a wavelength of light. In many embodiments, the grating structure can include at least one grating having a spatially variation of: spatial variation of grating thickness; average refractive index; refractive index modulation, or birefringence. In many embodiments, the grating structure can include rolled K-vector grating, a dual interaction grating, a multiplexed grating, a lossy grating, a sub wavelength grating, and/or a chirped grating. In many embodiments, the grating structure can include at least one surface relief grating formed by liquid crystal extraction from a grating recorded in HPDLC. In many embodiments, the grating structure can include at least one grating formed by at least partially backfilling a surface relief grating formed by liquid crystal extraction from a HPDLC recorded grating with another material having a refractive index higher than that of the extracted liquid crystal. In many embodiments, the grating structure can include at least one grating formed by at least partially backfilling a surface relief grating formed by liquid crystal extraction from a HPDLC recorded grating with another material having a refractive index lower than that of the extracted liquid crystal. In many embodiments, the grating structure can include at least one reflection grating. In many embodiments, the grating structure can include at least one transmission grating. In many embodiments, the grating structure can be a switching grating. In many embodiments, the grating structure can further include the group of a beamsplitter layer, an anti-reflection coating, an optical bandpass filter, a polarization modification layer, and/or an alignment layer. In many embodiments, the grating structure can provide beam expansion and extraction of red, green and blue image modulated light over a field of view. In many other embodiments, the image modulated light is monochromatic. In many embodiments, the grating structure can be recorded into a material including a mixture including a liquid crystal and at least one monomer. The mixture may include at least one blue phase liquid crystal and at least one monomer. In many embodiments, the input coupler can be a grating or a prism. In many embodiments, the input coupler can include a plurality of gratings. In many embodiments, the input coupler can be a switching grating.

Figure 40:
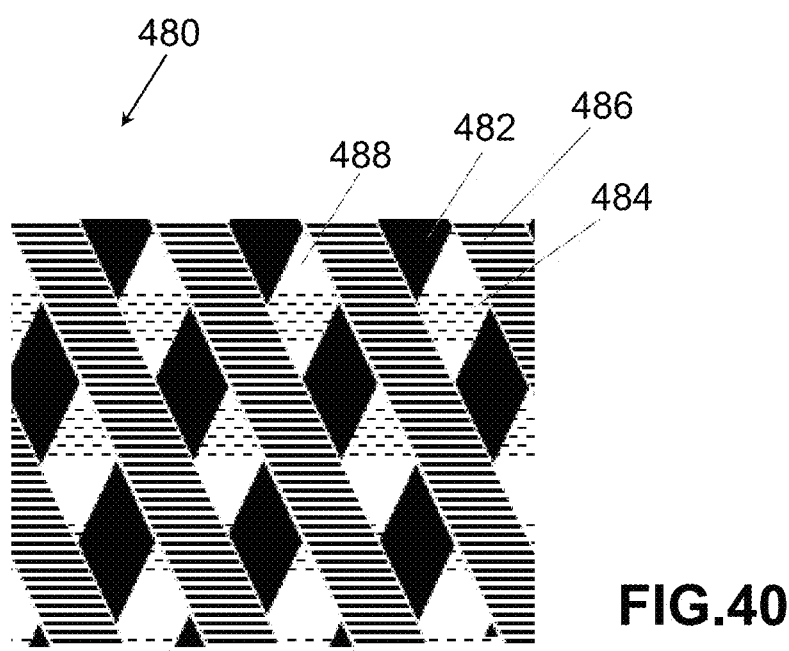
FIG. 40 illustrates a multiplexed grating structure in accordance with an embodiment of the invention.

In many embodiments, a photonic crystal formed by liquid crystal extraction may be used to form a multiplexed grating. FIG. 40 illustrates a multiplexed grating structure in accordance with an embodiment of the invention. The multiplexed grating may be manufactured using a method. In a first step, a first mixture of liquid crystal is provided. A first grating 482 including alternating liquid crystal and polymer regions can be formed in the first mixture using a holographic exposure. The LC regions can be flushed to form a first set of polymer regions separated by air. A second mixture of liquid crystal can be provided in the air regions of the first grating. A second grating 484 including alternating liquid crystal and polymer regions can be formed in the second mixture using a holographic exposure. The LC regions can be flushed to form polymer regions separated by air. A third mixture of liquid crystal can be provided in the air regions formed by the first and second gratings. A third grating 486 comprising alternating liquid crystal and polymer regions can be formed in the second mixture using a holographic exposure. The LC regions can be flushed to form polymer regions separated by air. FIG. 40 shows the final grating structure formed by the above process. The first grating 482, the second grating 484, and the third grating 486 represent the polymer regions of the final grating. In many embodiments, the three superimposed gratings 482, 484,486 may have the same refractive index. Air spaces 488 remaining after the above process has been completed. The structure of FIG. 40 multiplexes three gratings 482,484,486. In some embodiments, the three gratings 482,484,486 may be formed from different monomers to provide a required spatial refractive index modulation variation. In some embodiments, the air regions 488 can be backfilled with an optical material for providing a desired refractive index contrast. It should be apparent from consideration of the embodiment of FIG. 40 that a similar process can be applied to multiplexing any number of grating structures subject to material and process limitations.

One important advantage of the LC evacuated gratings is that they will not clear at elevated temperature so have advantage for automotive use, or any other higher temperature environment use. The LC evacuated grating principle can be applied to gratings of any scale. In some embodiments, the LC evacuated grating has spatially varying diffraction efficiency. The application of multiplexing, spatial varying thickness, k-vector directions, and diffraction efficiency in the present invention is based on the embodiments, drawings and teachings provided.

In one embodiment the gratings are recorded in uniform modulation liquid crystal-polymer material system such as the ones disclosed in United State Patent Application Publication No.: US2007/0019152 by Caputo et al. and PCT Application No.: PCT/EP2005/006950 by Stumpe et al. both of which are incorporated herein by reference in their entireties. Uniform modulation gratings are characterized by high refractive index modulation (and hence high diffraction efficiency) and low scatter.

Figure 41A:
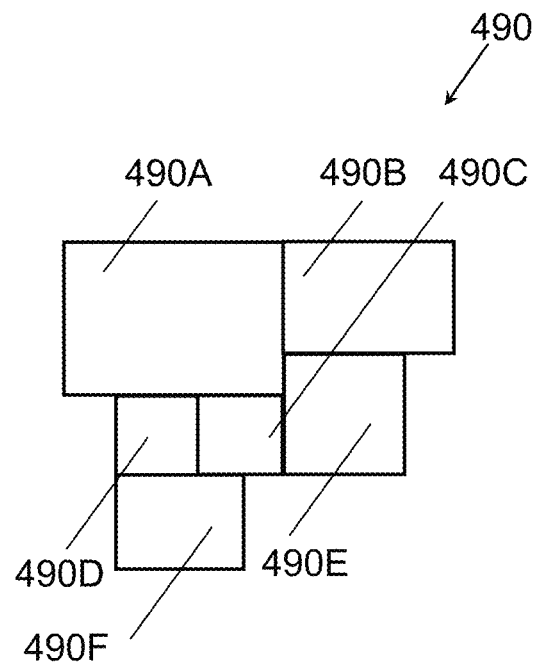
FIG. 41A conceptually illustrates a portion of a grating element pattern including rectangular elements of differing size and aspect ratio for use in an emissive display panel in accordance with an embodiment of the invention.
Figure 41B:
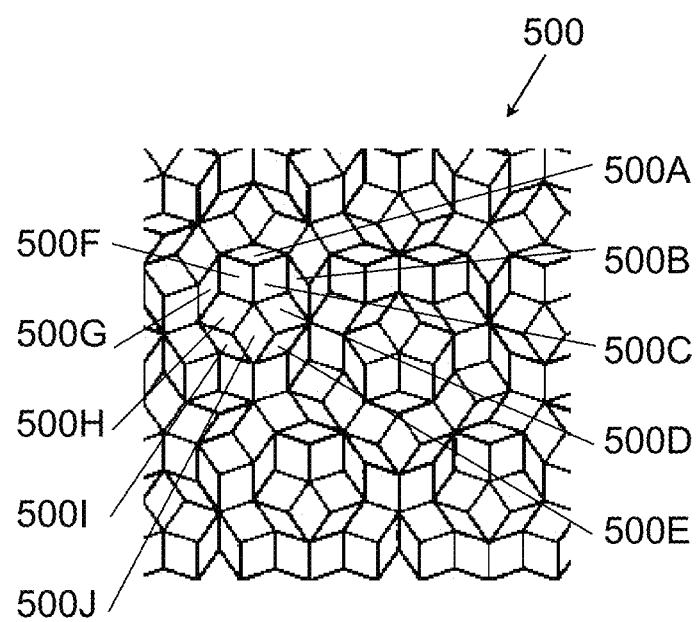
FIG. 41B conceptually illustrates a portion of a grating element pattern including Penrose tiles in accordance with an embodiment of the invention.

The invention can be applied using grating arrays made up of grating elements of many different geometries that are limited only by geometrical constraints and the practical issues in implementing the arrays. In many embodiments, the grating array can include grating elements that are aperiodic (non-repeating). In such embodiments, the asymmetry in the geometry and the distribution of the grating elements can be used to produce uniformity in the output illumination from the waveguide. The optimal grating elements sizes and geometries can be determined using reverse vector raytracing from the eyebox though the output and input gratings (and fold gratings, if used) onto the grating array. A variety of asymmetric grating element patterns can be used in the invention. For example, FIG. 41A conceptually illustrates a portion 490 of a grating element pattern including rectangular elements 490A-490F of differing size and aspect ratio for use in an emissive display panel in accordance with an embodiment of the invention. In some embodiments, the grating element array can be based a non-repeating pattern based on a finite set of polygonal base elements. FIG. 41B conceptually illustrates a portion 500 of a grating element pattern including Penrose tiles 500A-500J in accordance with an embodiment of the invention. The tiles can be based on the principles disclosed in U.S. Pat. No. 4,133,152 by Penrose entitled "Set of tiles for covering a surface" which is hereby incorporated by reference in its entirety. Patterns occurring in nature, of which honeycombs are well known examples, can also be used in many embodiments.

Figure 41C:
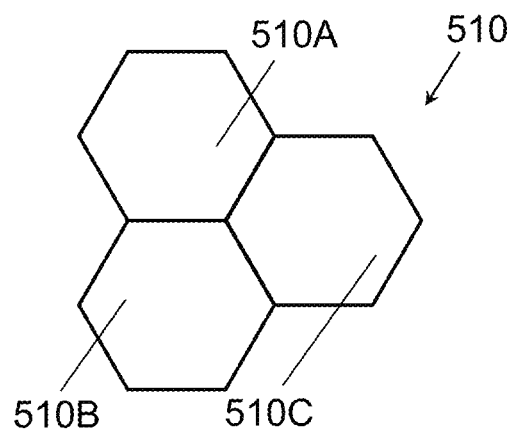
FIG. 41C conceptually illustrates a portion of a grating element pattern including hexagons in accordance with an embodiment of the invention.
Figure 41D:
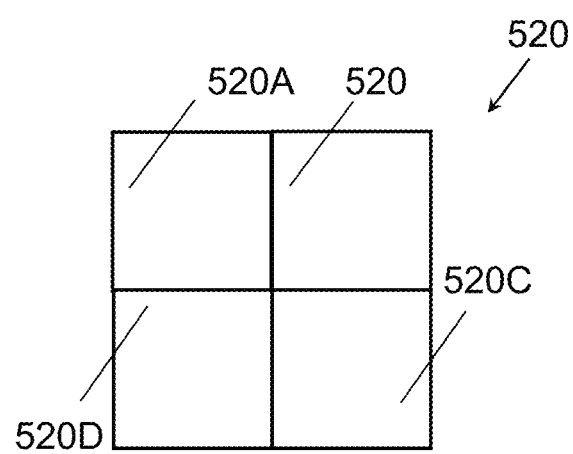
FIG. 41D conceptually illustrates a portion of a grating element pattern including squares in accordance with an embodiment of the invention.
Figure 41E:
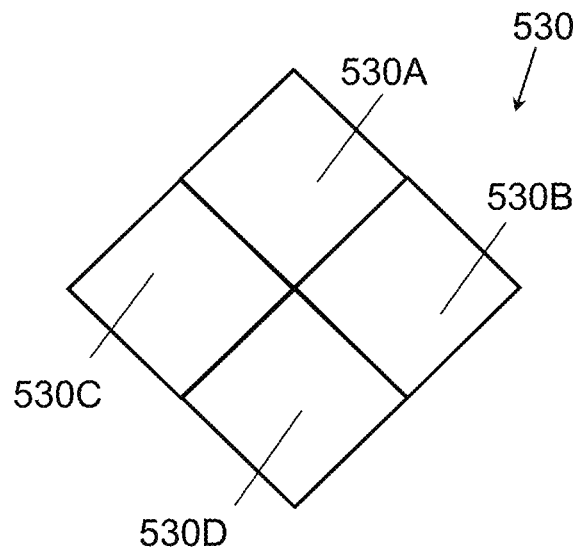
FIG. 41E conceptually illustrates a portion of a grating element pattern comprising diamond-shaped elements in accordance with an embodiment of the invention.
Figure 41F:
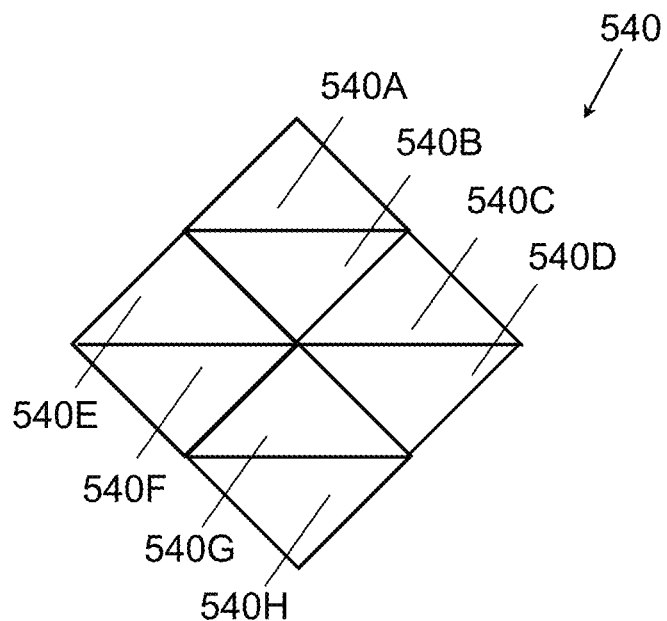
FIG. 41F conceptually illustrates a portion of a grating element pattern including isosceles triangles in accordance with an embodiment of the invention.

In many embodiments, the grating element can be configured in arrays of identical regular polygons. For example, FIG. 41C conceptually illustrates a portion 510 of a grating element pattern including hexagons 510A-510C in accordance with an embodiment of the invention. FIG. 41D conceptually illustrates a portion 520 of a grating element pattern including squares 520A-520C in accordance with an embodiment of the invention. FIG. 41E conceptually illustrates a portion 530 of a grating element pattern comprising diamond-shaped elements 530A-530D in accordance with an embodiment of the invention. FIG. 41F conceptually illustrates a portion 540 of a grating element pattern including isosceles triangles 540A-540H in accordance with an embodiment of the invention.

Figure 41G:
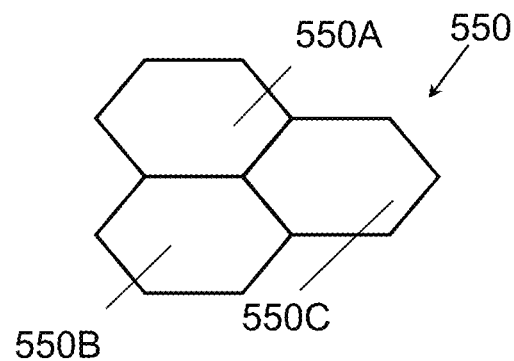
FIG. 41G conceptually illustrates a portion of a grating element pattern including hexagons of horizontally biased aspect ratio in one embodiment.
Figure 41H:
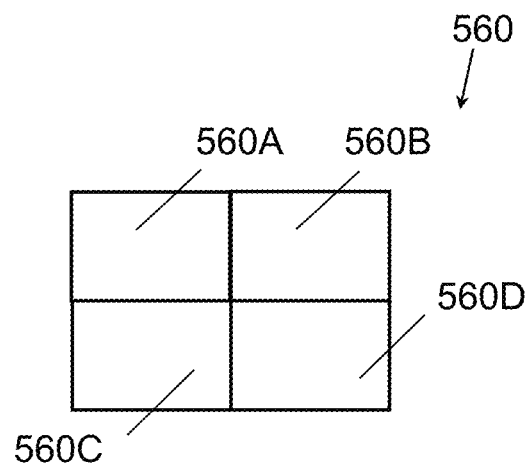
FIG. 41H conceptually illustrates a portion of a grating element pattern including rectangles of horizontally biased aspect ratio in accordance with an embodiment of the invention.
Figure 41I:
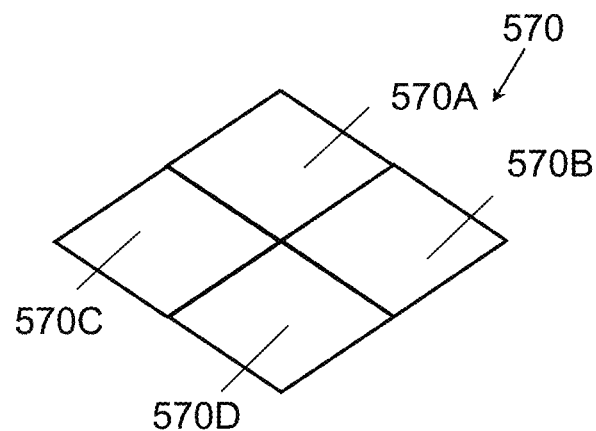
FIG. 41I conceptually illustrates a portion of a grating element pattern including diamond shaped elements of horizontally biased aspect ratio in accordance with an embodiment of the invention.
Figure 41J:
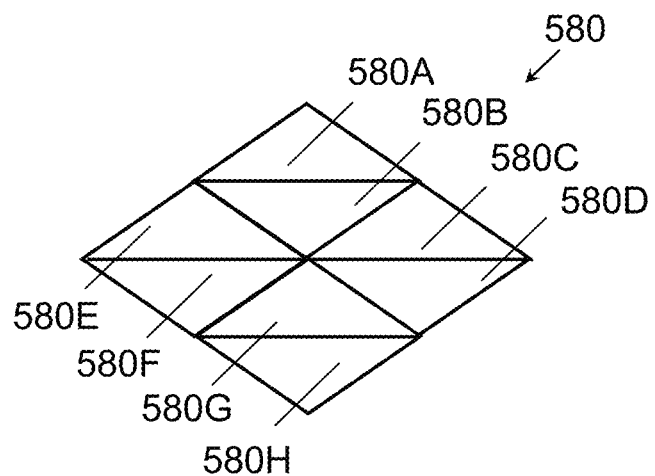
FIG. 41J conceptually illustrates a portion of a grating element pattern including triangles of horizontally biased aspect ratio in accordance with an embodiment of the invention.

In many embodiments, the grating elements can have vertically or horizontally biased aspect ratios. FIG. 41G conceptually illustrates a portion 550 of a grating element pattern including hexagons 550A-550C of horizontally biased aspect ratio in one embodiment. FIG. 41H conceptually illustrates a portion 560 of a grating element pattern including rectangles 560A-560D of horizontally biased aspect ratio in accordance with an embodiment of the invention. FIG. 41I conceptually illustrates a portion 570 of a grating element pattern including diamond shaped elements 570A-570D of horizontally biased aspect ratio in accordance with an embodiment of the invention. FIG. 41J conceptually illustrates a portion 580 of a grating element pattern including triangles 580A-580H of horizontally biased aspect ratio in accordance with an embodiment of the invention.

In many embodiments, using the grating element configurations discussed above, the grating elements can have differing spectral response. In many embodiments, using the grating element configurations discussed above, the grating elements can have differing angular response. In many embodiments, using the grating element configurations discussed above, the grating elements can have differing polarization response. In many embodiments, the grating element can have spectral, angular, and/or polarization response varying spatially across the grating element array. In many embodiments, grating elements of different sizes and geometries and different spectral, angular and polarization response can be arranged to provide a spatial emission variation for controlling uniformity in the final image.

Figure 42:
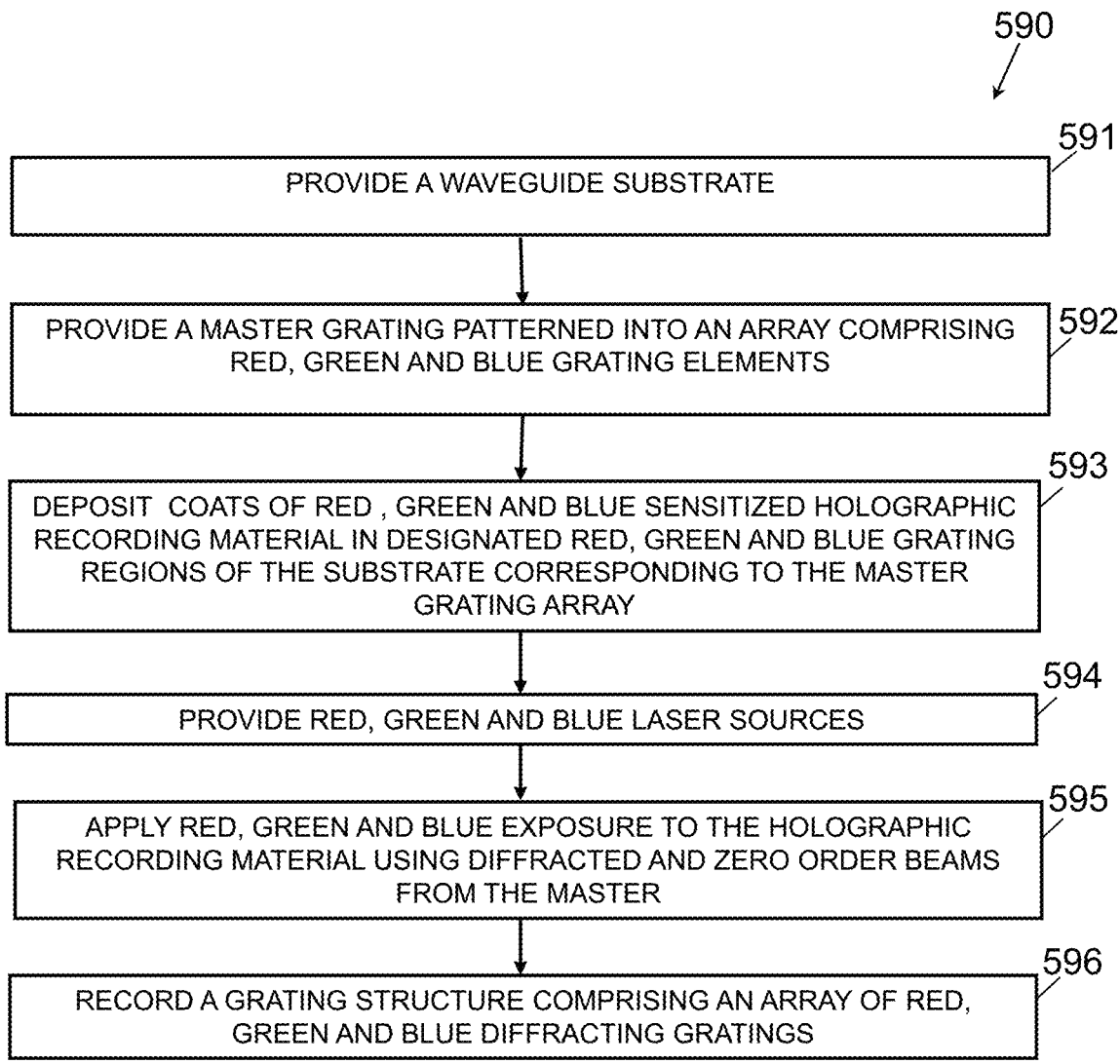
FIG. 42 conceptually illustrates a method for forming a waveguide color grating structure in accordance with an embodiment of the invention.

FIG. 42 conceptually illustrates a method for forming a waveguide color grating structure in accordance with an embodiment of the invention. As shown, the method 590 of forming a grating structure is provided. Referring to the flow diagram, the method 590 includes providing (591) a waveguide substrate. A master grating patterned into an array comprising red, green and blue diffracting grating elements can be provided (592). Coats of red, green and blue sensitized holographic recording material can be provided in the designated red, green and blue grating regions of the substrate correspond to the master grating array can be deposited (593). Red, green and blue laser sources can be provided (594). Red, green and blue exposure can be applied (595) to the holographic recording material using diffracted and zero order beams from the master. A grating structure comprising an array of red, green and blue differing gratings can be recorded (596).

In many embodiments, the holographic recording material can be a mixture of at least one liquid crystal and at least one monometer. In many embodiments, the holographic recording material can further include at least one component selected from the group of a photoinitiator, a dye, a nano particle, a surfactant, a blue phase liquid crystal and a reactive mesogen.

In many embodiments, the master is an amplitude grating with a hard overcoat. In many embodiments, the coated substrate is protected by a thin cover glass or a polymer layer. In many embodiments, the distance from the amplitude grating to the holographic recording plane is in the range 1-50 micron to avoid trichromatic pixel exposure overlap. In many embodiments, the grating elements thickness is approximately 2 microns. In many embodiments, the grating elements are printed with a resolution and accuracy of approximately 30 microns.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A waveguide-based display device comprising:
   a waveguide;
   a source of image modulated light projected over a field of view;
   an input coupler for coupling said light into a total internal reflection (TIR) path within the waveguide; and
   a grating structure for providing beam expansion of the TIR light in at least one direction and extracting the TIR light from the waveguide, wherein the grating structure comprises a plurality of grating elements having at least two different grating prescriptions and at least one surface relief grating formed by a phase separation process;
   wherein the grating structure is configured to enable a plurality of ray path lengths within the grating structure that differ in length by a distance shorter than a coherence length of the source of image modulated light.

2. The waveguide-based display device of claim 1, wherein the plurality of grating elements is tiled in a repeating pattern or non-repeating pattern.

3. The waveguide-based display device of claim 1, wherein the grating structure further comprises a spatial refractive index modulation.

4. The waveguide-based display device of claim 1, wherein the plurality of grating elements comprises at least two different spectral responses, at least two different angular responses, at least two different birefringence characteristics, at least two different polarization responses, at least two different refractive index modulations, an average refractive index including at least two different refractive indices, at least two different grating thicknesses, and at least two different K-vectors.

5. The waveguide-based display device of claim 1, wherein the plurality of grating elements comprises diffracting grating elements arrayed with non-diffracting grating elements.

6. The waveguide-based display device of claim 1, wherein the plurality of grating elements is recorded in material containing at least two different materials.

7. The waveguide-based display device of claim 1, wherein the plurality of grating elements are recorded in material having dispersion curves selected from a group containing at least two different dispersion curves.

8. The waveguide-based display device of claim 1, wherein the plurality of grating elements is recorded in material having at least two different wavelength sensitivities, at least two different holographic exposure times, or at least two different holographic exposure energies.

9. The waveguide-based display device of claim 1, wherein the plurality of grating elements comprises at least one grating pitch greater that a wavelength of the TIR light.

10. The waveguide-based display device of claim 1, wherein the plurality of grating elements comprises a spatially variation of at least one selected from the group consisting of: spatial variation of grating thickness, average refractive index, refractive index modulation, and birefringence.

11. The waveguide-based display device of claim 1, wherein the grating structure comprises at least one selected from a group consisting of: a rolled K-vector grating, a dual interaction grating, a multiplexed grating, a lossy grating, a sub wavelength grating, and a chirped grating.

12. The waveguide-based display device of claim 1, wherein the at least one surface relief grating is formed by liquid crystal extraction from a grating recorded in holographic polymer dispersed liquid crystal (HPDLC).

13. The waveguide-based display device of claim 1, wherein the at least one surface relief grating is formed by at least partially backfilling a surface relief grating formed by liquid crystal extraction from a holographic polymer dispersed liquid crystal (HPDLC) recorded grating with another material having a refractive index higher than or lower than that of the extracted liquid crystal.

14. The waveguide-based display device of claim 1, wherein the grating structure comprises at least one reflection grating or at least one transmission grating.

15. The waveguide-based display device of claim 1, wherein the grating structure provides beam expansion and extraction of red, green and blue image modulated light over a field of view.

16. The waveguide-based display device of claim 1, wherein the grating structure is recorded into a material selected from the group of a mixture comprising at least one liquid crystal and at least one monomer, a mixture comprising at least one blue phase liquid crystal and at least one monomer.

17. The waveguide-based display device of claim 1, wherein the input coupler is a grating or a prism.

18. The waveguide-based display device of claim 1, wherein the at least one surface relief grating comprises a grating modulation depth greater than a grating pitch.

19. The waveguide-based display device of claim 1, further comprising an alignment layer.

* * * * *